(12) United States Patent
Gurule

(10) Patent No.: US 11,741,707 B2
(45) Date of Patent: Aug. 29, 2023

(54) SYSTEMS AND METHODS FOR A CHRONOLOGICAL-BASED SEARCH ENGINE

(71) Applicant: Enviropedia, Inc., Philadelphia, PA (US)

(72) Inventor: Donn M. Gurule, Philadelphia, PA (US)

(73) Assignee: Enviropedia, Inc., Philadelphia, PA (US)

( * ) Notice: Subject to any disclaimer, the term of this patent is extended or adjusted under 35 U.S.C. 154(b) by 0 days.

(21) Appl. No.: 18/079,156

(22) Filed: Dec. 12, 2022

(65) Prior Publication Data

US 2023/0103581 A1 Apr. 6, 2023

Related U.S. Application Data

(63) Continuation of application No. 16/467,382, filed as application No. PCT/US2017/064749 on Dec. 5, 2017, now Pat. No. 11,551,441.

(60) Provisional application No. 62/556,916, filed on Sep. 11, 2017, provisional application No. 62/430,584, filed on Dec. 6, 2016.

(51) Int. Cl.
| | |
|---|---|
| *G06V 20/00* | (2022.01) |
| *G06V 20/20* | (2022.01) |
| *G06F 16/9038* | (2019.01) |
| *G02B 27/00* | (2006.01) |
| *G02B 27/01* | (2006.01) |
| *G06T 19/00* | (2011.01) |

(52) U.S. Cl.
CPC ......... *G06V 20/20* (2022.01); *G02B 27/0093* (2013.01); *G02B 27/017* (2013.01); *G06F 16/9038* (2019.01); *G06T 19/006* (2013.01)

(58) Field of Classification Search
None
See application file for complete search history.

(56) References Cited

U.S. PATENT DOCUMENTS

| | | |
|---|---|---|
| 8,886,655 B1 | 11/2014 | Nandy et al. |
| 9,288,533 B1 | 3/2016 | DiBernardo et al. |
| 10,254,546 B2 | 4/2019 | Poulos et al. |
| 10,540,575 B1 | 1/2020 | Brody |
| 2003/0103670 A1 | 6/2003 | Schoelkopf et al. |
| 2004/0258306 A1 | 12/2004 | Hashimoto |

(Continued)

*Primary Examiner* — Martin Mushambo
(74) *Attorney, Agent, or Firm* — Dinsmore & Shohl LLP

(57) ABSTRACT

Certain aspects of the present disclosure provide techniques for providing a chronologically-based search engine. Example methods includes presenting, on a display of an end-user device, live image data being captured by a camera of the end-user device, determining a pose of the end-user device, and sending the pose of the device to a server. The method also includes receiving location specific data from the server, the location specific data based on the pose of the end-user device, the location specific data including a first topic, and superimposing, on the live image data, based on the location specific data, (i) at least one highlighted area of an object associated with the first topic, and (ii) a query panel associated with the first topic superimposed proximate the object, the at least one highlighted area and the query panel being interactive elements associated with the first topic.

20 Claims, 27 Drawing Sheets

(56) References Cited

U.S. PATENT DOCUMENTS

| | | |
|---|---|---|
| 2004/0258314 A1 | 12/2004 | Hashimoto |
| 2005/0108026 A1 | 5/2005 | Brierre et al. |
| 2008/0192116 A1 | 8/2008 | Tamir et al. |
| 2010/0191459 A1 | 7/2010 | Carter et al. |
| 2011/0199479 A1 | 8/2011 | Waldman |
| 2013/0016123 A1 | 1/2013 | Skarulis |
| 2013/0083173 A1 | 4/2013 | Geisner et al. |
| 2013/0339904 A1 | 12/2013 | Geithner |
| 2014/0100996 A1 | 4/2014 | Klein et al. |
| 2014/0168056 A1 | 6/2014 | Swaminathan et al. |
| 2014/0225918 A1 | 8/2014 | Mittal et al. |
| 2014/0225978 A1 | 8/2014 | Saban et al. |
| 2014/0280199 A1 | 9/2014 | Bare et al. |
| 2015/0015784 A1 | 1/2015 | Minnick et al. |
| 2015/0029222 A1 | 1/2015 | Hofmann |
| 2015/0053067 A1 | 2/2015 | Goldstein |
| 2015/0109462 A1 | 4/2015 | Anantwar |
| 2015/0116355 A1 | 4/2015 | Hofmann et al. |
| 2015/0186532 A1 | 7/2015 | Agarwal et al. |
| 2015/0221133 A1 | 8/2015 | Groten et al. |
| 2015/0277552 A1 | 10/2015 | Wilairat et al. |
| 2016/0044383 A1 | 2/2016 | Bonvolanta et al. |
| 2016/0147891 A1 | 5/2016 | Chhichhia et al. |
| 2016/0182924 A1 | 6/2016 | Todd |
| 2016/0182971 A1 | 6/2016 | Ortiz et al. |
| 2016/0247539 A1 | 8/2016 | Hundemer |
| 2016/0330430 A1 | 11/2016 | Jin et al. |
| 2018/0027189 A1 | 1/2018 | Feldman et al. |
| 2018/0095635 A1* | 4/2018 | Valdivia ................ G06F 3/0482 |
| 2018/0136745 A1* | 5/2018 | Li ........................... G06F 3/011 |
| 2020/0302689 A1 | 9/2020 | Li et al. |
| 2020/0302692 A1 | 9/2020 | Li et al. |
| 2020/0344172 A1 | 10/2020 | Lawrence et al. |
| 2020/0344319 A1 | 10/2020 | Lawrence et al. |

* cited by examiner

SYSTEMS AND METHODS FOR A CHRONOLOGICAL-BASED SEARCH ENGINE

RELATED APPLICATIONS

This application is a continuation of U.S. application Ser. No. 16/467,382, filed Jun. 6, 1019, which is a U.S. National Stage Entry of International Application No. PCT/US2017/064749 filed Dec. 5, 2017, which claims the benefit of U.S. Provisional Application No. 62/430,584, filed Dec. 6, 2016 and U.S. Provisional Application No. 62/556,916, filed Sep. 11, 2017, each of which are incorporated by reference in their entirety.

TECHNICAL FIELD

The present disclosure generally relates to configuring computing devices to provide, organize, and present search engine results and, more specifically, systems and methods for a chronological-based search engine.

BACKGROUND

Search engines index content (e.g., text, images, videos, etc.) stored in databases and/or at network addresses (such as websites on the World Wide Web). The indexing process parses and stores metadata associated with the content along with a location (sometimes referred to as a Uniform Resource Identifier (URI)) at which to retrieve the content. Search engines provide an interface to facilitate users searching for content of interest by entering words or phrases into a search box. The search engine searches the metadata generated for the index content to determine which one(s) of the index content is/are relevant to the entered words or phrases. The search engine provides the user with the URI of the relevant content. Often, the URI are presented to the used based on a relevancy score generated while the search engine searches the metadata.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example embodiment includes presenting, on a display of an end-user device, live image data being captured by a camera of the end-user device. The example embodiment also includes determining a pose of the end-user device and sending the pose of the device to a server. The pose includes a location of the user-device and an orientation of the camera. The embodiment includes receiving location specific data from the server, the location specific data based on the pose of the end-user device. The location specific data includes a first topic. The embodiment includes superimposing, on the live image data, based on the location specific data, (i) at least one highlighted area of an object associated with the first topic, and (ii) a query panel associated with the first topic superimposed proximate the object, the at least one highlighted area and the query panel being interactive elements associated with the first topic. Further, the embodiment includes, in response to receiving a selection of one of the interactive elements, receiving query data from the server based on the first topic, and superimposing, on the live image data, a scrubber track, a scrubber and at least two event points; wherein manipulating the scrubber between the at least two event points changes content of the query panel related to the first topic.

An example method includes generating records for entries from a plurality of database content providers, the records identifying topics included in the entries and dates associated with the entries. The example method also includes analyzing the entries from the plurality of database content providers to determine affinities between the topics. In response to receiving a query that includes a search topic from an end-user device, the example method includes (a) retrieving, from a database, records identifying the search topic and related topics that have affinity with the search topic, (b) organizing the records into chronological categories based on the dates associated with the corresponding entries, each one of the chronological categories representing a different period of time, (c) for each of the chronological categories, generating a query result with the processor, the query result organizing the records into hierarchies based on attributes of the entries associated with the records, and (d) sending the query result to the end-user device.

An example method includes presenting, on a display of an end-user device, a first map associated with a first topic included in a query sent to an augmented reality platform entity. The example method also includes highlighting areas of interest on the first map. The areas of interest associated are associated with second topics. Additionally, the example method includes presenting a scrubber track, a scrubber, and a plurality of event points. The event points indicate second maps related to the first topic. The second maps are associated with different dates than the first map. In response to receiving, with an input device, a selection of one of the areas of interest, the example method includes sending a query to the augmented reality platform entity that includes the corresponding second topic.

An example method includes presenting, on a display of an end-user device, map geometry data. The example method also includes highlighting objects of interest in the displayed map geometry data. The objects of interest are each associated with a topic. In response to receiving, with an input device, a selection of one of the objects of interest, the example method includes sending a query to an augmented reality platform entity that includes the corresponding topic. Additionally, in response to receiving a query result from the augmented reality platform entity, the method includes (a) presenting a scrubber track, a scrubber, and a plurality of event points, and (b) displaying a first hierarchy of a plurality of hierarchies associated with records included in the query result associated with one of the chronological categories selected by a position of the scrubber on the scrubber track corresponding to an associated one of the plurality of event points. The plurality of event points each indicate a chronological category associated with the query result.

An example method includes presenting, on a display of an end-user device, live image data being captured by a camera of the end-user device. The example method also includes highlighting objects of interest in the displayed live image data being captured by the camera. The objects of interest are each associated with a topic. In response to receiving, with an input device, a selection of one of the objects of interest, the example method includes sending a query to the augmented reality platform entity that includes the corresponding topic. Additionally, in response to receiving a query result from the augmented reality platform entity, the method includes (a) presenting a scrubber track, a scrubber, and a plurality of event points, and (b) displaying a first hierarchy of a plurality of hierarchies associated with records included in the query result associated with one of the chronological categories selected by a position of the scrubber on the scrubber track corresponding to an associated one of the plurality of event points. The plurality of event points each indicate a chronological category associated with the query result.

An example method includes presenting, on a display of an end-user device, live image data being captured by a camera of the end-user device. The example method also includes determining a pose of the end-user device. The pose includes a location of the end-user device. Additionally, the example method includes sending the pose of the end-user device to an augmented reality platform entity. The example method includes receiving closed captioning data from the augmented reality platform entity, the closed captioning data based on the location of the end-user device. The close caption data includes indications of first topics within the closed captioning data. The method of claim 1 includes superimposing the closed captioning data onto the live image data.

In one embodiment of the present application, a method includes the steps of presenting, on a display of an end-user device, live image data being captured by a camera of the end-user device, determining a pose of the end-user device, the pose including a location of the end-user device, sending the pose of the end-user device to an augmented reality platform entity, receiving closed captioning data from the augmented reality platform entity, the closed captioning data based on the location of the end-user device and including an indication of a first topic embedded within the closed captioning data, and superimposing the closed captioning data incorporating an interactive element associated with the first topic onto the live image data.

In some embodiments, the method includes the step of highlighting objects of interest in the displayed live image data being captured by the camera, the objects of interest associated with a topic. In other embodiments, the step of highlighting the objects of interest in the displayed live image data being captured by the camera includes the steps of sending the pose of the end-user device to an augmented reality platform entity, the pose including the location and orientation of the end-user device, and receiving the objects of interest from the augmented reality platform entity based on the pose of the end-user device. In still further embodiments, superimposing the closed captioning data onto the live image data includes superimposing the closed captioning data onto one of the objects of interest. In other embodiments, the method includes the step of, in response to receiving a selection of one of the objects of interest associated with second topics, sending a query to the augmented reality platform entity that includes the corresponding one of the second topics.

In another embodiment, the method includes the step of, in response to receiving a selection of the interactive element within the displayed closed captioning data, sending a query to the augmented reality platform entity that includes the corresponding first topic. In some embodiments, the method includes the steps of, in response to receiving a query result from the augmented reality platform entity, presenting a scrubber track, a scrubber, and a plurality of event points, the plurality of event points indicative chronological categories associated with the query result, and displaying a first hierarchy of a plurality of hierarchies associated with records included in the query result associated with one of the chronological categories selected by a position of the scrubber on the scrubber track corresponding to an associated one of the plurality of event points.

In another embodiment of the present application, an end-user device includes memory with an application and a processor communicatively coupled to the memory. The application, when executed, causing the processor to present, on a display, live image data being captured by a camera of the end-user device, determine a pose of the end-user device, the pose including a location of the end-user device, send the pose of the end-user device to an augmented reality platform entity, receive closed captioning data from the augmented reality platform entity, the closed captioning data based on the location of the end-user device and including an indication of a first topic embedded within the closed captioning data, and superimpose the closed captioning data incorporating an interactive element associated with the first topic onto the live image data.

In some embodiments, the application, when executed, causes the processor to highlight objects of interest in the displayed live image data being captured by the camera, the objects of interest associated with a topic. In other embodiments, to highlight the objects of interest in the displayed live image data being captured by the camera, the application, when executing, causes the processor to send the pose of the end-user device to an augmented reality platform entity, the pose including the location and orientation of the end-user device, and receive the objects of interest from the augmented reality platform entity based on the pose of the end-user device. In still further embodiments, to superimpose the closed captioning data onto the live image data, the application, when executing, causes the processor to superimpose the closed captioning data onto one of the objects of interest. In another embodiment, the application, when executing, causes the processor to, in response to receiving a selection of one of the objects of interest associated with second topics, send a query to the augmented reality platform entity that includes the corresponding one of the second topics.

In yet another example, the application, when executing, causes the processor to, in response to receiving a selection of interactive element within the displayed closed captioning data, send a query to the augmented reality platform entity that includes the corresponding first topic. In some embodiments, the application, when executing, causes the processor to, in response to receiving a query result from the augmented reality platform entity present a scrubber track, a scrubber, and a plurality of event points, the plurality of event points indicative chronological categories associated with the query result, and display a first hierarchy of a plurality of hierarchies associated with records included in the query result associated with one of the chronological categories selected by a position of the scrubber on the scrubber track corresponding to an associated one of the plurality of event points.

In a further embodiment of the present application, a tangible computer readable medium includes instructions that, when executed, cause an end-user device to present, on a display of an end-user device, live image data being captured by a camera of the end-user device, determine a pose of the end-user device, the pose including a location of the end-user device, send the pose of the end-user device to an augmented reality platform entity, receive closed captioning data from the augmented reality platform entity, the closed captioning data based on the location of the end-user device and including an indication of a first topic embedded within the closed captioning data, and superimpose the closed captioning data incorporating an interactive element associated with the first topic onto the live image data.

In some embodiments, the instructions, when executed, cause the end-user device to highlight objects of interest in the displayed live image data being captured by the camera, the objects of interest associated with a topic. In other embodiments, to highlight the objects of interest in the displayed live image data being captured by the camera, the instructions, when executed, cause the end-user device to send the pose of the end-user device to an augmented reality platform entity, the pose including the location and orientation of the end-user device and receive the objects of interest from the augmented reality platform entity based on the pose of the end-user device. In still further embodiments, superimposing the closed captioning data onto the live image data includes superimposing the closed captioning data onto one of the objects of interest. In another embodiment, the instructions, when executed, cause the end-user device to, in response to receiving a selection of the interactive element within the closed captioning data, send a query to the augmented reality platform entity that includes the corresponding first topic. In another embodiment, the instructions, when executed, cause the end-user device to, in response to receiving a query result from the augmented reality platform entity present a scrubber track, a scrubber, and a plurality of event points, the plurality of event points indicative chronological categories associated with the query result, and display a first hierarchy of a plurality of hierarchies associated with records included in the query result associated with one of the chronological categories selected by a position of the scrubber on the scrubber track corresponding to an associated one of the plurality of event points.

In a further embodiment of the present application, a method includes the steps of: presenting, on a display of an end-user device, a first map associated with a first topic included in a query sent to an augmented reality platform entity; highlighting areas of interest on the first map, the areas of interest associated with second topics; presenting a scrubber track, a scrubber, and a plurality of event points along the scrubber track, the event points indicative of second maps related to the first topic associated with different dates; and in response to receiving, with an input device, a selection of one of the areas of interest, sending a query to the augmented reality platform entity that includes the corresponding second topic. In some embodiments, including in response to receiving, with the input device, a change in position of the scrubber along the scrubber track to one of the plurality of event points, displaying the second map associated with the corresponding one of the plurality of event points.

In other embodiments, the method includes the steps of receiving search results based on the query, the query results includes records organized into at least first hierarchies, second hierarchies, and third hierarchies, and superimposing an interface over the first map initially displaying the first hierarchies. In a further embodiment, the first hierarchies are displayed in a first window, and the method includes the steps of, in response to receiving a selection of one the first hierarchies, displaying the second hierarchies associated with the selected one the first hierarchies in a second window, and, in response to receiving a selection of one of the second hierarchies, displaying the third hierarchies associated with the selected one the second hierarchies in a third window, the third hierarchies to include selectable uniform resource locators to retrieve entries associated with the third hierarchies. In another embodiment, the first hierarchies are displayed in a circular window, and the method includes the steps of, in response to receiving a selection of one the first hierarchies, displaying the second hierarchies associated with the selected one the first hierarchies in a first concentric ring around the circular window, and, in response to receiving a selection of one of the second hierarchies, displaying the third hierarchies associated with the selected one the second hierarchies in a second concentric ring around the first concentric ring, the third hierarchies to include selectable uniform resource locators to retrieve entries associated with the third hierarchies. In a still further embodiment, the plurality of event points is a first plurality of event points, and the method includes the steps of hiding the first plurality of event points and displaying a second plurality of event points, the second plurality of event points indicative of ones of the search results associated with chronological categories. In another embodiment, the method includes the step of, in response to receiving, with the input device, a change in position of the scrubber along the scrubber track to one of the second plurality of event points, providing the ones of the search results associated with the corresponding chronological category.

In another embodiment of the present application, an end-user device includes memory with an application and a processor communicatively coupled to the memory. The application, when executed, causing the processor to: present, on a display of the end-user device, a first map associated with a first topic included in a query sent to an augmented reality platform entity; highlight areas of interest on the first map, the areas of interest associated with second topics; present a scrubber track, a scrubber, and a plurality of event points along the scrubber track, the event points indicative of second maps related to the first topic associated with different dates; and, in response to receiving, with an input device, a selection of one of the areas of interest, send a query to the augmented reality platform entity that includes the corresponding second topic. In some embodiments, the application, when executing, causes the processor to, in response to receiving a change in position of the scrubber along the scrubber track, with the input device, to one of the plurality of event points, display the second map associated with the corresponding one of the plurality of event points. In other embodiments, the application, when executing, causes the processor to: receive search results based on the query, the query results includes records organized into at least first hierarchies, second hierarchies, and third hierarchies; and superimpose an interface over the first map initially displaying the first hierarchies.

In another embodiment, the first hierarchies are displayed in a first window, and the application, when executing, causes the processor to: in response to receiving a selection of one the first hierarchies, display the second hierarchies associated with the selected one the first hierarchies in a second window; and in response to receiving a selection of one of the second hierarchies, display the third hierarchies associated with the selected one the second hierarchies in a third window, the third hierarchies to include selectable uniform resource locators to retrieve entries associated with the third hierarchies. In a further embodiment, the first hierarchies are displayed in a circular window, and wherein the application, when executing, causes the processor to: in response to receiving a selection of one the first hierarchies, display the second hierarchies associated with the selected one the first hierarchies in a first concentric ring around the circular window; and in response to receiving a selection of one of the second hierarchies, display the third hierarchies associated with the selected one the second hierarchies in a second concentric ring around the first concentric ring, the third hierarchies to include selectable uniform resource locators to retrieve entries associated with the third hierarchies.

In a still further embodiment, the plurality of event points is a first plurality of event points, and the application, when executing, causes the processor to: hide the first plurality of event points; and display a second plurality of event points, the second plurality of event points indicative of ones of the search results associated with chronological categories.

In another embodiment, the application, when executing, causes the processor to, in response to receiving with the input device, a change in position of the scrubber along the scrubber track to one of the second plurality of event points, providing the ones of the search results associated with the corresponding chronological category.

In another embodiment of the present application, a tangible computer readable medium includes instructions that, when executed, cause an end-user device to: present, on a display, a first map associated with a first topic included in a query sent to an augmented reality platform entity; highlight areas of interest on the first map, the areas of interest associated with second topics; present a scrubber track, a scrubber, and a plurality of event points along the scrubber track, the event points indicative of second maps related to the first topic associated with different dates; and in response to receiving, with an input device, a selection of one of the areas of interest, send a query to the augmented reality platform entity that includes the corresponding second topic. In a further embodiment, the instructions, when executed, cause the end-user device to, in response to receiving, with the input device, a change in position of the scrubber along the scrubber track to one of the plurality of event points, display the second map associated with the corresponding one of the plurality of event points. In another embodiment, the instructions, when executed, cause the end-user device to: receive search results based on the query, the query results includes records organized into at least first hierarchies, second hierarchies, and third hierarchies; and superimpose an interface over the first map initially displaying the first hierarchies. In a further embodiment, the first hierarchies are displayed in a first window, and wherein the instructions, when executed, cause the end-user device to: in response to receiving a selection of one the first hierarchies, display the second hierarchies associated with the selected one the first hierarchies in a second window; and in response to receiving a selection of one of the second hierarchies, display the third hierarchies associated with the selected one the second hierarchies in a third window, the third hierarchies to include selectable uniform resource locators to retrieve entries associated with the third hierarchies.

In a further embodiment, the first hierarchies are displayed in a circular window, and the instructions, when executed, cause the end-user device to, in response to receiving a selection of one the first hierarchies, display the second hierarchies associated with the selected one the first hierarchies in a first concentric ring around the circular window, and, in response to receiving a selection of one of the second hierarchies, display the third hierarchies associated with the selected one the second hierarchies in a second concentric ring around the first concentric ring, the third hierarchies to include selectable uniform resource locators to retrieve entries associated with the third hierarchies. In another embodiment, the plurality of event points is a first plurality of event points, and wherein the instructions, when executed, cause the end-user device to: hide the first plurality of event points; display a second plurality of event points, the second plurality of event points indicative of ones of the search results associated with chronological categories; and, in response to receiving, with the input device, a change in position of the scrubber along the scrubber track to one of the second plurality of event points, provide the ones of the search results associated with the corresponding chronological category.

In another embodiment of the present application, a method includes the steps of: presenting, on a display of an end-user device, map geometry data; highlighting objects of interest in the displayed map geometry data, the objects of interest associated with a topic; in response to receiving, with an input device, a selection of one of the objects of interest, sending a query to an augmented reality platform entity that includes the corresponding topic. The method further includes the steps of, in response to receiving a query result from the augmented reality platform entity, presenting a scrubber track, a scrubber, and a plurality of event points along the scrubber track, the plurality of event points indicative chronological categories associated with the query result; and displaying a first hierarchy of a plurality of hierarchies associated with records included in the query result associated with one of the chronological categories selected by a position of the scrubber on the scrubber track corresponding to an associated one of the plurality of event points. In another embodiment, the first hierarchy is displayed in a first window, and the first hierarchy displays a list of database content providers associated with the query results with dates within one of the chronological categories indicated by the scrubber. In a further embodiment, the method includes the step of, in response to receiving a selection of one of the database content providers of the first hierarchy, displaying a second hierarchy in a second window, the second hierarchy including a list of topics associated with the query results associated with the selected database content providers and associated with within the one of the chronological categories indicated by the scrubber. In a still further embodiment, the method includes the step of, in response to receiving a selection of one of the topics of the second hierarchy, displaying a third hierarchy in a third window, the second hierarchy including a list of uniform resource locators of entries associated with the selected topic and associated with within the one of the chronological categories indicated by the scrubber. In some embodiments, the method includes the step of, based on the position of the scrubber, superimposing an image onto the map geometry data over one of the objects of interest, the image being the one of the objects of interest during the chronological categories indicated by the scrubber. In other embodiments, the method includes the step of, for the objects of interest, superimposing an information window that includes a portion of search results for the corresponding topic. In still further embodiments, the method includes the step of determining which portion of the map geometry data to present based on the orientation of the end-user device.

In another embodiment of the present application, an end-user device includes memory with an application and a processor communicatively coupled to the memory. The application, when executed, causing the processor to: present, on a display, map geometry data; highlight objects of interest in the displayed map geometry data, the objects of interest associated with a topic; and, in response to receiving, with an input device, a selection of one of the objects of interest, send a query to an augmented reality platform entity that includes the corresponding topic. The method further includes the steps of, in response to receiving a query result from the augmented reality platform entity: present a scrubber track, a scrubber, and a plurality of event points along the scrubber track, the plurality of event points indicative chronological categories associated with the query result; and display a first hierarchy of a plurality of hierarchies associated with records included in the query result associated with one of the chronological categories selected by a position of the scrubber on the scrubber track corresponding to an associated one of the plurality of event points.

In another embodiment, the first hierarchy is displayed in a first window, and the first hierarchy displays a list of database content providers associated with the query results with dates within one of the chronological categories indicated by the scrubber. In a further embodiment, the application, when executing, causes the processor to, in response to receiving a selection of one of the database content providers of the first hierarchy, display a second hierarchy in a second window, the second hierarchy including a list of topics associated with the query results associated with the selected database content providers and associated with within the one of the chronological categories indicated by the scrubber. In a further embodiment, the application, when executing, causes the processor to, in response to receiving a selection of one of the topics of the second hierarchy, display a third hierarchy in a third window, the second hierarchy including a list of uniform resource locators of entries associated with the selected topic and associated with within the one of the chronological categories indicated by the scrubber.

In some embodiments, the application, when executing, causes the processor to, based on the position of the scrubber, superimpose an image onto the map geometry data over one of the objects of interest, the image being the one of the objects of interest during the chronological categories indicated by the scrubber. In other embodiments, the application, when executing, causes the processor to, for the objects of interest, superimposing an information window that includes a portion of search results for the corresponding topic. In still further embodiments, the application, when executing, causes the processor to determining which portion of the map geometry data to present based on the orientation of the end-user device.

In another embodiment of the present application, a tangible computer readable medium includes instructions that, when executed, cause an end-user device to: present, on a display, map geometry data; highlight objects of interest in the displayed map geometry data, the objects of interest associated with a topic; and, in response to receiving, with an input device, a selection of one of the objects of interest, send a query to an augmented reality platform entity that includes the corresponding topic. The instructions further cause the end-user device to, in response to receiving a query result from the augmented reality platform entity: present a scrubber track, a scrubber, and a plurality of event points along the scrubber track, the plurality of event points indicative chronological categories associated with the query result; and display a first hierarchy of a plurality of hierarchies associated with records included in the query result associated with one of the chronological categories selected by a position of the scrubber on the scrubber track corresponding to an associated one of the plurality of event points.

In some embodiments, the first hierarchy is displayed in a first window, and the first hierarchy displays a list of database content providers associated with the query results with dates within one of the chronological categories indicated by the scrubber. In other embodiments, the instructions, when executed, cause the end-user device to, in response to receiving a selection of one of the database content providers of the first hierarchy, display a second hierarchy in a second window, the second hierarchy including a list of topics associated with the query results associated with the selected database content providers and associated with within the one of the chronological categories indicated by the scrubber. In still further embodiments, the instructions, when executed, cause the end-user device to, in response to receiving a selection of one of the topics of the second hierarchy, display a third hierarchy in a third window, the second hierarchy including a list of uniform resource locators of entries associated with the selected topic and associated with within the one of the chronological categories indicated by the scrubber. In yet further embodiments, the instructions, when executed, cause the end-user device to, based on the position of the scrubber, superimposing an image onto the map geometry data over one of the objects of interest, the image being the one of the objects of interest during the chronological categories indicated by the scrubber. In yet another embodiment, the instructions, when executed, cause the end-user device to, for the objects of interest, superimposing an information window that includes a portion of search results for the corresponding topic.

In a further embodiment of the present applications, a method includes the steps of: presenting, on a display of an end-user device, live image data being captured by a camera of the end-user device; highlighting objects of interest in the displayed live image data being captured by the camera, the objects of interest associated with a topic; and, in response to receiving, with an input device, a selection of one of the objects of interest, sending a query to the augmented reality platform entity that includes the corresponding topic. The method further includes the steps of, in response to receiving a query result from the augmented reality platform entity: presenting a scrubber track, a scrubber, and a plurality of event points along the scrubber track, the plurality of event points indicative chronological categories associated with the query result; and displaying a first hierarchy of a plurality of hierarchies associated with records included in the query result associated with one of the chronological categories selected by a position of the scrubber on the scrubber track corresponding to an associated one of the plurality of event points.

In another embodiment, the step of highlighting the objects of interest in the displayed live image data being captured by the camera includes: determining, with a processor, a pose of the end-user device, the pose including a location of the end-user device and an orientation of the camera of the end-user device; sending the pose of the end-user device to an augmented reality platform entity; and receiving the objects of interest from the augmented reality platform entity based on the pose of the end-user device. In further embodiments, the method includes, for the objects of interest, superimposing an information window that includes a portion of search results for the corresponding topic. In a still further embodiment, the method includes, based on the position of the scrubber, superimposing an image onto the map geometry data over one of the objects of interest, the image being the one of the objects of interest during the chronological categories indicated by the scrubber. In a still further embodiment, the first hierarchy is displayed in a first window, and the first hierarchy displays a list of database content providers associated with the query results with dates within one of the chronological categories indicated by the scrubber. In another embodiment, the method includes, in response to receiving a selection of one of the database content providers of the first hierarchy, displaying a second hierarchy in a second window, the second hierarchy including a list of topics associated with the query results associated with the selected database content providers and associated with within the one of the chronological categories indicated by the scrubber. In a still further embodiment, the method includes, in response to receiving a selection of one of the topics of the second hierarchy, displaying a third hierarchy in a third window, the second hierarchy including a list of uniform resource locators of entries associated with the selected topic and associated with within the one of the chronological categories indicated by the scrubber.

In another embodiment of the present application, an end-user device includes memory with an application and a processor communicatively coupled to the memory. The application, when executed, causing the processor to: present, on a display, live image data being captured by a camera of the end-user device; highlight objects of interest in the displayed live image data being captured by the camera, the objects of interest associated with a topic; and in response to receiving, with an input device, a selection of one of the objects of interest, send a query to the augmented reality platform entity that includes the corresponding topic. The application further causes the processor to, in response to receiving a query result from the augmented reality platform entity: present a scrubber track, a scrubber, and a plurality of event points along the scrubber track, the plurality of event points indicative chronological categories associated with the query result; and display a first hierarchy of a plurality of hierarchies associated with records included in the query result associated with one of the chronological categories selected by a position of the scrubber on the scrubber track corresponding to an associated one of the plurality of event points.

In another embodiment, to highlight the objects of interest in the displayed live image data being captured by the camera, the application, when executing, causes the processor to: determine, with a processor, a pose of the end-user device, the pose including a location of the end-user device and an orientation of the camera of the end-user device; send the pose of the end-user device to an augmented reality platform entity; receive the objects of interest from the augmented reality platform entity based on the pose of the end-user device. In a further embodiment, the application, when executing, causes the processor to, for the objects of interest, superimpose an information window that includes a portion of search results for the corresponding topic. In another embodiment, the application, when executing, causes the processor to, based on the position of the scrubber, superimposing an image onto the map geometry data over one of the objects of interest, the image being the one of the objects of interest during the chronological categories indicated by the scrubber. In a still further embodiment, the first hierarchy is displayed in a first window, and the first hierarchy displays a list of database content providers associated with the query results with dates within one of the chronological categories indicated by the scrubber. In yet another embodiment, the application, when executing, causes the processor to, in response to receiving a selection of one of the database content providers of the first hierarchy, display a second hierarchy in a second window, the second hierarchy including a list of topics associated with the query results associated with the selected database content providers and associated with within the one of the chronological categories indicated by the scrubber. In another embodiment, the application, when executing, causes the processor to, in response to receiving a selection of one of the topics of the second hierarchy, displaying a third hierarchy in a third window, the second hierarchy including a list of uniform resource locators of entries associated with the selected topic and associated with within the one of the chronological categories indicated by the scrubber.

In another embodiment of the present application, a tangible computer readable medium comprising instructions that, when executed, cause an end-user device to: present, on a display of an end-user device, live image data being captured by a camera of the end-user device; highlight objects of interest in the displayed live image data being captured by the camera, the objects of interest associated with a topic; and, in response to receiving, with an input device, a selection of one of the objects of interest, send a query to the augmented reality platform entity that includes the corresponding topic. The instructions further cause the end-user device to, in response to receiving a query result from the augmented reality platform entity: present a scrubber track, a scrubber, and a plurality of event points along the scrubber track, the plurality of event points indicative chronological categories associated with the query result; and display a first hierarchy of a plurality of hierarchies associated with records included in the query result associated with one of the chronological categories selected by a position of the scrubber on the scrubber track corresponding to an associated one of the plurality of event points.

In another embodiment, to highlight the objects of interest in the displayed live image data being captured by the camera, the instructions, when executed, cause the end-user device to: determine, with a processor, a pose of the end-user device, the pose including a location of the end-user device and an orientation of the camera of the end-user device; send the pose of the end-user device to an augmented reality platform entity; and receive the objects of interest from the augmented reality platform entity based on the pose of the end-user device. In another embodiment, the instructions, when executed, cause the end-user device to, based on the position of the scrubber, superimpose an image onto the map geometry data over one of the objects of interest, the image being the one of the objects of interest during the chronological categories indicated by the scrubber. In a still further embodiment, the first hierarchy is displayed in a first window, and the first hierarchy displays a list of database content providers associated with the query results with dates within one of the chronological categories indicated by the scrubber. In another embodiment, the instructions, when executed, cause the end-user device to, in response to receiving a selection of one of the database content providers of the first hierarchy, display a second hierarchy in a second window, the second hierarchy including a list of topics associated with the query results associated with the selected database content providers and associated with within the one of the chronological categories indicated by the scrubber. In a still further embodiment, the instructions, when executed, cause the end-user device to, in response to receiving a selection of one of the topics of the second hierarchy, display a third hierarchy in a third window, the second hierarchy including a list of uniform resource locators of entries associated with the selected topic and associated with within the one of the chronological categories indicated by the scrubber.

In another embodiment of the present application, a method includes the steps of: generating, with a processor, records for entries from a plurality of database content providers, the records identifying topics included in the entries and dates associated with the entries; and analyzing the entries from the plurality of database content providers to determine affinities between the topics. The method further includes the steps of, in response to receiving a query that includes a search topic from an end-user device: retrieving, from a database, records identifying the search topic and related topics that have affinity with the search topic; organizing, with the processor, the records into chronological categories based on the dates associated with the corresponding entries, each one of the chronological categories representing a different period of time, the chronological categories being based on a number of the dates associated with the retrieved records and a clustering of dates associated with the retrieved records; for each of the chronological categories, generating a query result with the processor, the query result organizing the records into hierarchies based on attributes of the entries associated with the records; and sending the query result to the end-user device. In another embodiment, the hierarchies include at least first hierarchies, second hierarchies, and third hierarchies.

In a further embodiment, organizing the query result into the hierarchies includes: organizing the records into the first hierarchies based on which of the plurality of database content providers is associated with the records; for each of the plurality of database content providers in the first hierarchies, organizing the records into the second hierarchies based on the corresponding topics; and, for each of the topics in the second hierarchies, organizing the records into the third hierarchies based on a category of the entries associated with the records. In a still further embodiment, generating the records for the entries from the plurality of database content providers includes, for each of the entries, determining whether the entry is an image; and, in response to the entry being an image, determining the topics associated with the image based on at least one of metadata included in the image, image recognition performed on the image, or articles in which the image is used. In another embodiment, each of the chronological categories are associated with an event mark when the query results are displayed on the end-user device. In another embodiment, the method includes the step of comparing words in the entries match topic records in a topic database to identify which of the topics are includes in the entries. In a further embodiment, the method includes the step of analyzing the entries from the plurality of database content providers to determine potential topics to be added to the topic database.

In a further embodiment of the present application, a system includes memory having instructions and a processor communicatively coupled to the memory. The instructions, when executed, causing the processor to: generate records for entries from a plurality of database content providers, the records identifying topics included in the entries and dates associated with the entries; and analyze the entries from the plurality of database content providers to determine affinities between the topics. The instructions further cause the processor to, in response to receiving a query that includes a search topic from an end-user device: retrieve, from a database, records identifying the search topic and related topics that have affinity with the search topic; organize the records into chronological categories based on the dates associated with the corresponding entries, each one of the chronological categories representing a different time period, the time periods associated with the chronological categories being based on a number of the dates associated with the retrieved records and a clustering of dates associated with the retrieved records; for each of the chronological categories, generate a query result with the processor, the query result organizing the records into hierarchies based on attributes of the entries associated with the records; and send the query result to the end-user device. In another embodiment, the hierarchies include at least first hierarchies, second hierarchies, and third hierarchies. In a further embodiment, to organize the query result into the hierarchies, the processor is to: organize the records into the first hierarchies based on which of the plurality of database content providers is associated with the records; for each of the plurality of database content providers in the first hierarchies, organize the records into the second hierarchies based on the corresponding topics; and for each of the topics in the second hierarchies, organize the records into the third hierarchies based on a category of the entries associated with the records. In yet another embodiment, where to generate the records for the entries from the plurality of database content providers, the processor is to, for each of the entries: determine whether the entry is an image; and in response to the entry being an image, determine the topics associated with the image based on at least one of metadata included in the image, image recognition performed on the image, or articles in which the image is used. In a still further embodiment, the chronological categories are each associated with an event marker when the query results are displayed on the end-user device. In another embodiment, the processor is to compare words in the entries match topic records in a topic database to identify which of the topics are includes in the entries. In a further embodiment, the processor is to analyze the entries from the plurality of database content providers to determine potential topics to be added to the topic database.

In another embodiment of the present application, a tangible computer readable medium includes instructions that, when executed, cause a server to: generate records for entries from a plurality of database content providers, the records identifying topics included in the entries and dates associated with the entries; and analyze the entries from the plurality of database content providers to determine affinities between the topics. The instructions further cause the server to, in response to receiving a query that includes a search topic from an end-user device: retrieve, from a database, records identifying the search topic and related topics that have affinity with the search topic; organize the records into chronological categories based on the dates associated with the corresponding entries, each one of the chronological categories representing a different time period, the time periods associated with the chronological categories being based on a number of the dates associated with the retrieved records and a clustering of dates associated with the retrieved records; for each of the chronological categories, generate a query result with the processor, the query result organizing the records into hierarchies based on attributes of the entries associated with the records; and send the query result to the end-user device. In another embodiment, the hierarchies include at least first hierarchies, second hierarchies, and third hierarchies. In yet another embodiment, the instructions, when executed, cause the server to: organize the records into the first hierarchies based on which of the plurality of database content providers is associated with the records; for each of the plurality of database content providers in the first hierarchies, organize the records into the second hierarchies based on the corresponding topics; and for each of the topics in the second hierarchies, organize the records into the third hierarchies based on a category of the entries associated with the records. In a still further embodiment, to generate the records for the entries from the plurality of database content providers, the instructions cause the server to, for each of the entries: determine whether the entry is an image; and, in response to the entry being an image, determine the topics associated with the image based on at least one of metadata included in the image, image recognition performed on the image, or articles in which the image is used. In yet another embodiment, the chronological categories are associated with event markers when the query results are displayed on the end-user device. In a further embodiment, the instructions, when executed cause the server to: compare words in the entries match topic records in a topic database to identify which of the topics are includes in the entries; and analyze the entries from the plurality of database content providers to determine potential topics to be added to the topic database.

In a still further embodiment of the present application, a method includes the steps of: presenting, on a display of an end-user device, map geometry data; presenting a scrubber track, a position marker, and a plurality of event points along the scrubber track, the plurality of event points indicative chronological categories; and displaying indicia in the displayed map geometry data when one of the chronological categories corresponding to a timestamp associated with the indicia is selected by a position of the position marker on the scrubber track corresponding to an associated one of the plurality of event points, the indicia being each associated with an event; in response to receiving, with an input device, a selection of one of the indicia, sending a query to an augmented reality platform entity that includes topic related the corresponding event; and displaying a first hierarchy of a plurality of hierarchies associated with records included in a query result received from the augmented reality platform entity relating to the selected indicia.

In a further embodiment of the present application, a method includes the steps of: presenting, on a display of an end-user device, live image data being captured by a camera of the end-user device; determining a pose of the end-user device, the pose including a location of the end-user device; sending the pose of the end-user device to an augmented reality platform entity; receiving tracking data for athletes in the image data based on the pose of the end-user device; superimposing the tracking data on the locations of the athletes in the live image data being captured by a camera of the end-user device; in response to receiving a selection of the superimposed tracking data of one of the athletes, sending a query to the augmented reality platform entity that includes an identity of the selected athlete; and displaying a first hierarchy of a plurality of hierarchies associated with records included in a query result received from the augmented reality platform entity relating to the selected athlete.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
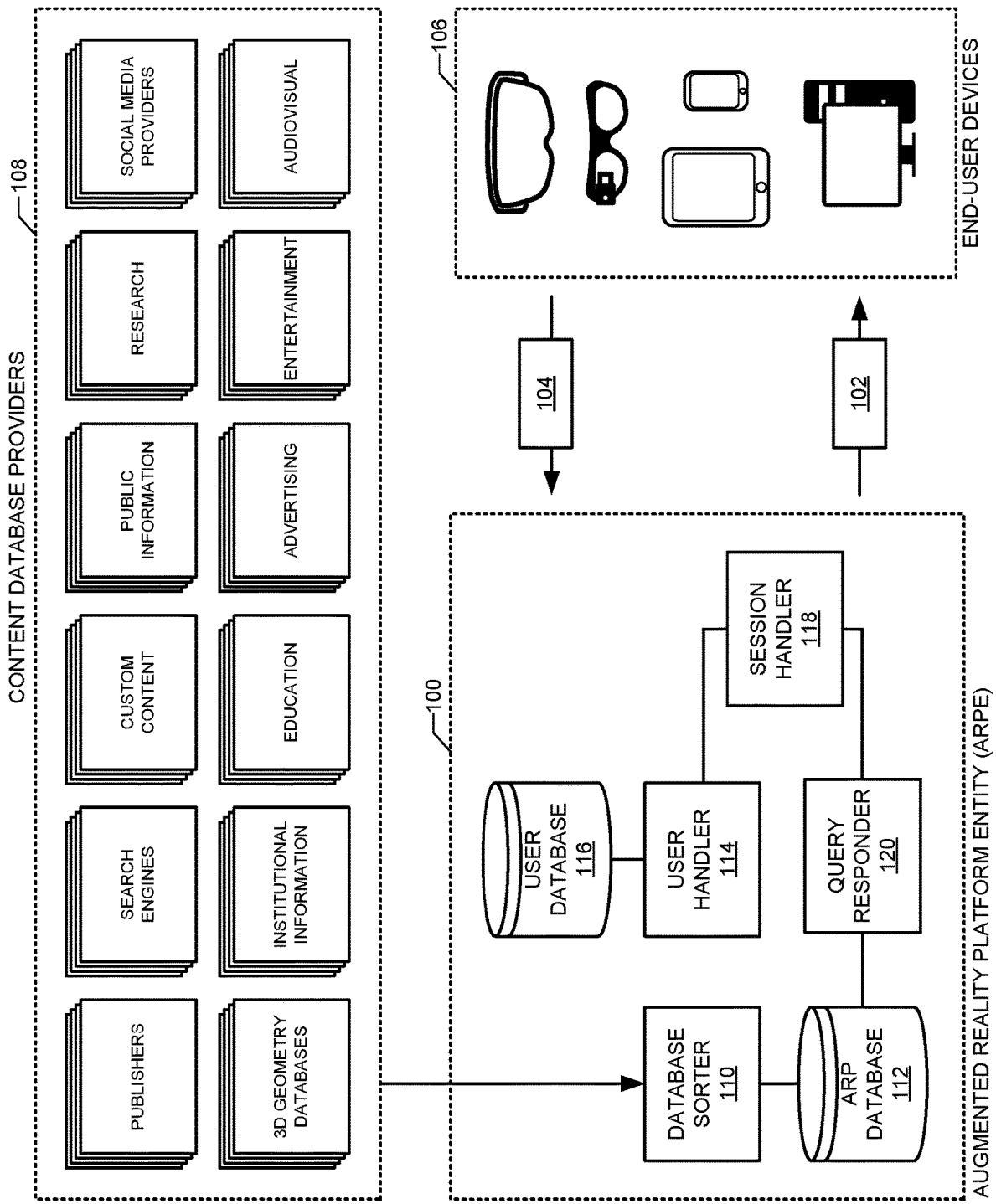
FIG. 1 illustrates a system diagram of an augmented reality platform entity providing query results in response to receiving queries from end-user devices in accordance to the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As end-user devices (e.g., computers, gaming consoles, smart phones, tablets, smart televisions, over-the-top devices, optical head-mounted displays, augmented reality smart glasses, virtual reality headsets, cockpit displays, virtual cockpits, etc.) are developed to include more processing power and better input devices, users expect a more immersive experience that facilitates utilizing the environment around them for entertainment, richer content (e.g., context aware content) and more useful information. As disclosed below, an augmented reality platform entity provides an interface to facilitate a user, via an end-user device, searching for information based on contextual information in images, maps, map geometry data, and/or live video (e.g., via augmented reality, virtual reality, etc.). As used herein, "augmented reality" refers to a live video of an environment captured by a camera that includes elements superimposed on the live view including computer-generated sounds, images, and/or videos, etc. As used herein, "map geometry data" refers to spatial data on an area that facilitates (i) identifying of points of interest (e.g., buildings, infrastructure, landmarks, etc.) within an associated image and/or (b) determining the location and orientation of points of interest with reference to the location of the end-user device and orientation of a camera of the end-user device. The map geometry data provides information so that the end-user device is virtually at the location viewed on the end-user device. The map geometry data may include representations of locations that do not presently exist. For example, the map geometry data may include graphical representations of structures that do not currently exist, but may be planned for the future or existed in the past.

The augmented reality platform entity indexes entries from content database providers. Additionally, in some examples, the augmented reality platform entity facilitates creation of entries by end-users and indexes those entries. As used herein, "entries" are discrete pieces of content (e.g., articles, images, websites, videos, advertisements, records, map geometry, social media information, etc.) stored by the content database providers and/or created by end-users. The content database providers store and provide various types of entries. For example, content database providers include publishers (e.g., newspapers, magazines, electronic book depositories, blogs, media outlets, etc.), search engines (e.g., Google®, Bing®, Baidu®, etc.), public information offices (e.g., property records, criminal records, incorporation records, licensing records, etc.), research providers (e.g., LexisNexis®, Westlaw®, Bloomberg®, etc.), social media companies (e.g. Facebook®, Twitter®, Weibo®, etc.) map geometry providers (e.g., Google®, Apple®, Tencent®, etc.), institutional providers (e.g., libraries, museums, private collections, etc.) education providers (e.g., universities, community colleges, secondary schools, etc.), advertisers, entertainment (e.g., Netflix®, Hulu®, etc.), and/or audiovisual providers (e.g., Youtube®, Vimeo®, Spotify®, etc.). Some content database providers provide public access (e.g., via the World Wide Web, etc.) to the entries. Other content database providers provide access to authorized users (e.g., via login credentials, via keys, etc.) Some content providers provide access via an Application Program Interface (API). In some examples, the augmented reality platform entity searches for and indexes the databases via network and Internet protocols (e.g., HTML, FTP, etc.).

The augmented reality platform entity analyzes the entries from the content database providers to identify topics (e.g., a person, place, thing, or event) within the entries. For example, if an entry being analyzed is a real estate listing from a real estate database, the augmented reality platform entity may identify the street of the property, the municipality in which the property is located, previous owners of the property, crime statistics, and/or county recorder records, etc. The augmented reality platform entity generates tags for the entries that uniquely identify the topics associated with the entries. The augmented reality platform entity then creates records for the entries with the tags, metadata associated with the entries (e.g., title, geographical coordinates, dates associated with the entry, etc.), and/or a Uniform Resource Identifier (URI) that identifies the location on a network at which the entry is accessible. In some examples, the URI is a Uniform Resource Location (URL) that provides a protocol identifier (e.g., http, https, ftp, etc.) and an identifier of the on a network (e.g., an intranet, the Internet, etc.). Additionally, through analyzing the entries from the various content database providers, the augmented reality platform entity determines affinities (e.g., co-occurrence relationships) between topics. For example, the topic of the "Rookery Building" may be connected to the topics of "Daniel Burnham," "Frank Lloyd Wright," "Roman Revival Architecture," and "Burnham & Root," etc.

After receiving a query from an end-user device, the augmented reality platform entity determines which records are responsive to the query based on the topic(s) contained in the query and other topics related (e.g., have affinity and are relevant, etc.) to those topics. The augmented reality platform entity generates a response that includes metadata (e.g., title, author, size, etc.) and the URI associated with the responsive records. In some examples, the augmented reality platform entity receives pre-query data from the end-user device. In such examples, the pre-query data includes map geometry data, image date, device pose data (e.g., location and orientation), and/or image depth mapping (e.g., from a LiDAR and/RADAR on the device). In such examples, the augmented reality platform entity identifies (e.g. via image recognition, via coordinate and orientation analysis, image depth mapping analysis, etc.) topics in the pre-query data that the user may select to form a query. For example, based on the pre-query data (the coordinates of a phone, orientation data regarding the camera of the phone, and field of view data of the camera of the phone, etc.) and map geometry data from one of the map geometry database providers, the augmented reality platform entity may determine that the image in the pre-query data includes the Rookery Building and the Chicago Board of Trade building.

The end-user devices display an interface to facilitate users (i) submitting queries, (ii) browsing the responses to the queries, and (iii) selecting and viewing the content associated with the responses. The end-user device includes visual, audio, and/or haptic outputs. The visual outputs may include a screen (e.g., a screen on a phone, a tablet, a virtual reality headset, a virtual cockpit, etc.) or a projection onto a transparent surface (e.g., the panels of an optical head-mounted display, augmented reality smart glasses, a heads up display, a cockpit glass display, etc.). The interface includes a scrubber track and a scrubber that controls the results that are currently display on the end-user device. In some examples, the results are listed in chronological order and the scrubber track and the scrubber facilitates scrolling through the results chronologically. In such examples, the scrubber track includes event points indicative of results corresponding to a particular periods of time (e.g., weeks, months, years, decades, etc.). When the scrubber is moved to a particular event point, the interface displays results associated with corresponding period of time. For example, if the scrubber is moved to an event point associated with the year 1893, the interface may display results associated with the year 1893 (e.g., articles written in 1893, images from 1893, videos about events in 1893, articles about people alive in 1983, etc.) In some examples, the results are listed based on relevance score and the scrubber track and the scrubber facilitates scrolling through the results based on relevance to the query.

The end-user devices include inputs to facilitate (a) manually entering a query and browsing results (e.g., a touch screen, a mouse, a controller, microphones, etc.), tracking a user (e.g., a finger, eye gaze location, etc.) to enter queries and browse results (e.g., a forward-facing camera, back-facing cameras, etc), and/or (c) gathering data for the interface to identify and/or suggest queries (e.g., back-facing cameras, global positioning system (GPS) receivers, accelerometers, etc.). In some examples, based on the inputs, the end-user device sends pre-query data to the augmented reality platform entity for the augmented reality platform entity to identify and/or suggest topics for queries. For example, the end-user device may send an image of the Cloud Gate sculpture, the coordinated of the end-user device (e.g., 41.882772 and −87.622958), and the orientation of the end-user device (e.g., 225 degrees from true north). In such an example, the augmented reality platform entity may identify the Cloud Gate sculpture as a suggested topic. In such an example, the end-user devices highlights (e.g., superimposes a semi-transparent image) the Cloud Gate sculpture as it is being captured by the camera. In such an example, the end-user device sends a query with the Cloud Gate sculpture as a topic in response to the user (e.g., via the touch screen) indicating interest in the highlighted Cloud Gate sculpture.

FIG. 1 illustrates a system diagram of an augmented reality platform entity (ARPE) 100 providing query results 102 in response to receiving queries 104 from end-user devices 106 in accordance to the teachings of this disclosure. The example ARPE 100, the example end-user devices 106, and example content database providers 108 are communicatively coupled via a network (e.g., an intranet, the Internet, etc.). The example end-user devices 106 include computers (e.g., Window®-based computers, iOS®-based computers, Linux-based computers, etc.), smart phones (e.g., Android™-based phones, iOS-based phones, Windows® Mobile-based phones, etc.), tablets (e.g., iPad®, Google Pixel®, etc.), smart televisions, over-the-top devices (e.g., Apple TV®, Chromecast™, Amazon Fire®, etc.) optical head-mounted displays (e.g. Google Glass, Vuzix M300, etc.), augmented reality smart glasses (e.g., Microsoft® HoloLens, etc.), virtual reality headsets (e.g., Oculus Rift, HTC Vive, etc.), vehicle center console displays, heads up displays, virtual cockpits, glass cockpits, and/or global positioning system (GPS) devices, etc. As disclosed in more detail below in FIGS. 14 and 15 below, the end-user devices 106 present the query results 102 to a user and receive input from the user to form the queries 104 and navigate the entries associated with the query results 102.

The content database providers 108 generate and/or store content (e.g., articles, websites, images, records, maps, map geometry data, videos, etc.) that is accessible via a Uniform Resource Indicator (URI), such as a Uniform Resource Locator (URL). Some content database providers 108 provide open access (e.g., without credentials), while other content database providers 108 provide access to the corresponding content through a login. In the illustrated example, the content database providers 108 include content database providers include publishers (e.g., newspapers, magazines, electronic book depositories, blogs, media outlets, broadcasters (live and pre-taped), etc.), search engines (e.g., Google®, Bing®, Baidu®, etc.), public information offices (e.g., property records, criminal records, incorporation records, licensing records, etc.), research providers (e.g., LexisNexis®, Westlaw®, Bloomberg®, etc.), social media companies (e.g. Facebook®, Twitter®, Weibo®, etc.) map geometry providers (e.g., Google®, Apple®, Tencent®, etc.), institutional providers (e.g., libraries, museums, private collections, etc.) education providers (e.g., universities, community colleges, secondary schools, etc.), advertisers, entertainment (e.g., Netflix®, Hulu®, etc.), and/or audiovisual providers (e.g., Youtube®, Vimeo®, Spotify®, Twitch®, etc.).

In the illustrated example, the ARPE 100 includes a database sorter 110, an augmented reality platform (ARP) database 112, a user handler 114, a user database 116, a session handler 118, and a query responder 120. As disclosed in more detail in FIG. 9 below, the example database sorter 110 analyzed entries from content database providers 108. The entries are discrete pieces of content that are associated with a URI that may be accessed by the end-user device 106 via the URI. For an entry, the database sorter 110 determines which topic(s) are relevant to the entry, and creates an entry record to store in the ARP database 112 that include the identified topic(s), metadata that identifies the entry (e.g., a title, a thumbnail, an author) and the associated content database provide 108, and the URI to access the entry. In some examples, the database sorter 110 also assigns one or more dates to the entry record. For example, an entry about the great Chicago fire may be assigned a dates of Oct. 8, 1871, Oct. 9, 1871, and Oct. 10, 1871. Additionally, in some examples, the database sorter 110 determines affinities between the topics. An affinity is a measure of a likelihood of the co-occurrence of two or more topics in an entry. Topics with high affinity may be considered related. For example, the topic of "S. R. Crown Hall" may have a high affinity with the topic of "Ludwig Mies van der Rohe." That is, if a query 104 includes the topic of "S. R. Crown Hall," the user may be also interested in the topic of "Ludwig Mies van der Rohe."

Figure 2:
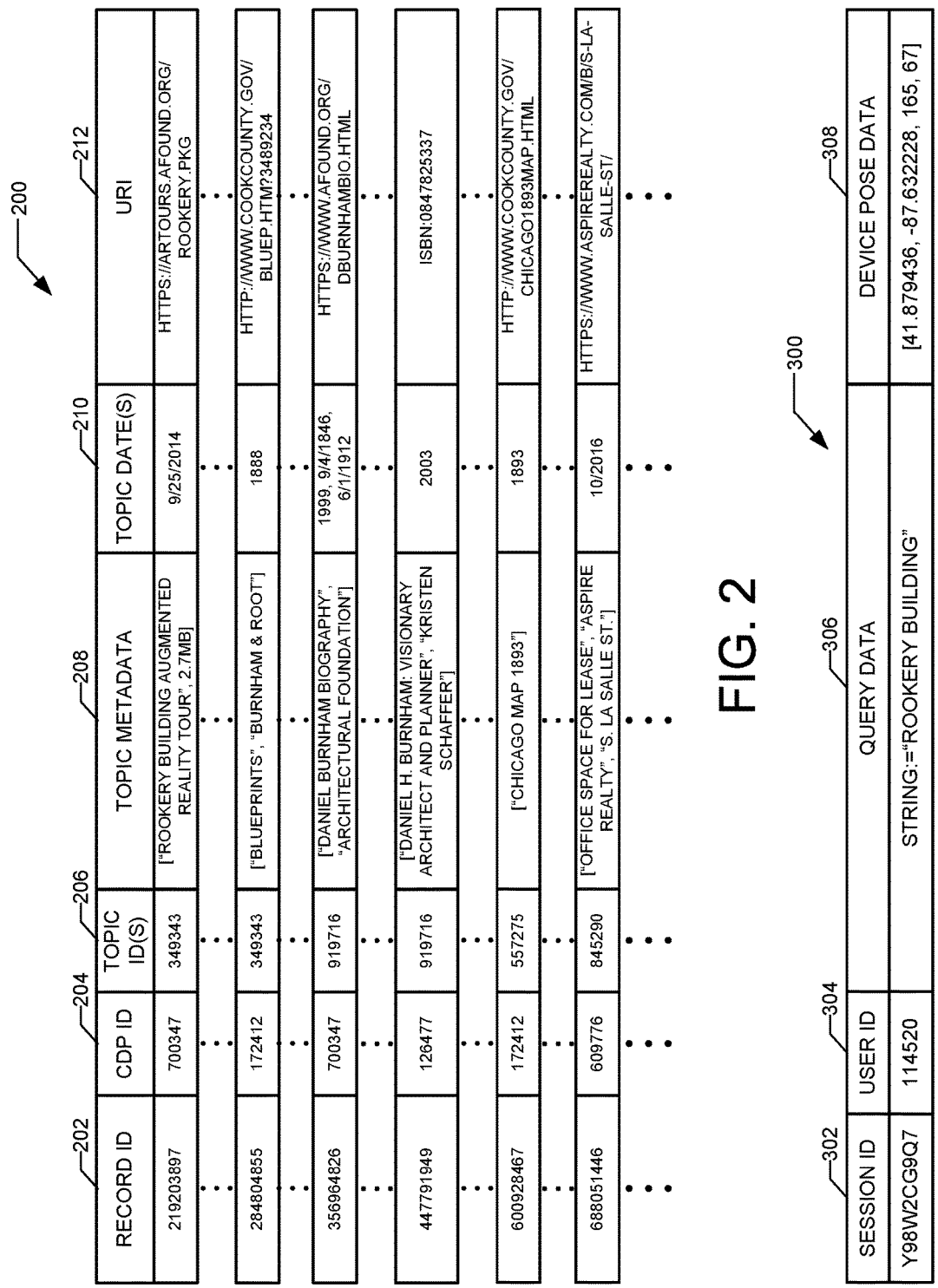
FIG. 2 illustrates an example data structure that may be used to store the entry records in the augmented reality platform database.

FIG. 2 illustrates an example data structure 200 that may be used to store the entry records (e.g. the entry records 1200 of FIG. 12 below) in the ARP database 112. In the illustrated example, the data structure 200 includes a record identifier (ID) field 202, a content database provider (CDP) ID field 204, a topic ID field 206, a topic metadata field 208, topic date field 210, and a URI field 212. The example record ID field 202 includes a numeric or an alphanumeric value that uniquely identifies the entry record. The example CDP ID field 204 includes a numeric, an alphanumeric, or an alphabetic value that uniquely identifies the content database provider 108 from which the entry record was created. The example topic ID field 206 includes a numeric, an alphanumeric, or an alphabetic value that uniquely identifies the topic(s) assigned to the entry record. The topic metadata field 208 includes a set of values to be used to inform the user about the content at the associated URI (e.g., as identified by the URI field 212, etc.). For example, the topic metadata field 208 may include a title, an author, a source name, and/or a download size, etc. The topic date field 210 identifies dates associated with the entry. The URI field 212 includes the URI at which the entry may be found. For example, the URI field 212 may include a URL, an international standard book number (ISBN), a universal product code (UPC), and/or a global trade item number (GTIN), etc. In such an example where the URI field 212 includes an object identifier (e.g., an ISBN, a UPC, a GTIN, etc.) instead of a URL, the end-user device 106 may use a preferred content database provider 108 (e.g., Amazon.com, the Library of Congress, etc.) when the entry associated with the object identifier is selected by the user.

Returning to FIG. 1, the user handler 114 maintains the user database 116. The when a user first registers with the ARPE 100 (e.g., via the end-user device 106), the user handler 114 manages a registration process to create user records to store the user database 116. The user handler 114 manages authentication (e.g., via login credentials, etc.) of users accessing the ARPE 100. Additionally, the user handler 114 manages and updates the user records to reflect settings and preferences of the corresponding user. Example settings and preferences may include a preferred query result interface (e.g., the interfaces disclosed in FIGS. 3, 4, and 5 below), bookmarks, preferred content database providers, and/or subscriptions and credentials to content database providers, etc.

The example session handler 118 manages connections and communication with the end-user devices 106. The end-user devices 106 communicatively couple to the session handler 118 via the network. The network may be a public network, such as the Internet; a private network, such as an intranet; or combinations thereof, and may utilize a variety of networking protocols now available or later developed including, but not limited to, TCP/IP-based networking protocols. The example session handler 118 receives the queries 104, pre-query data (e.g., information that provides context to the location and environment of the end-user device 106), registration data, login data, and/or preference data, etc. from the end-user devices 106. The session handler 118 sends session data (e.g., session identifiers, authentication data, etc.), pre-query responses, and query results 102.

Figure 3:
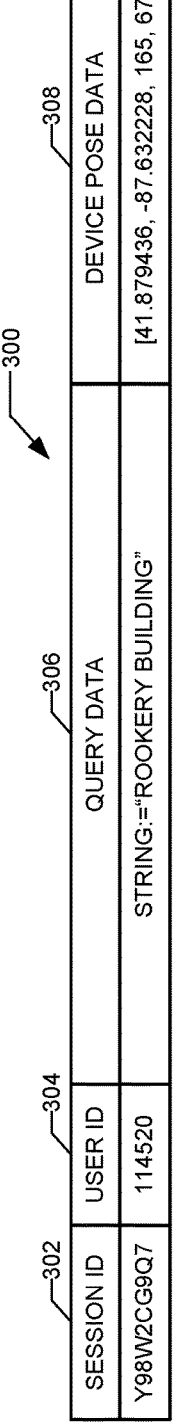
FIG. 3 illustrates an example data structure that may be used to form the query.

FIG. 3 illustrates an example data structure 300 that may be used to form the query 104. In the illustrated example, the data structure 300 includes an example session ID field 302, an example user ID field 304, an example query data field 306, and an example device pose data field 308. The session ID field 302 includes a numeric, an alphanumeric, or an alphabetic value that uniquely identifies a session associated with the end-user device 106 that send the query 104. The example user ID field 304 includes a numeric, an alphanumeric, or an alphabetic value that uniquely identifies a user of the end-user device 106. Preferences and settings may be obtained from the user database 116 with the value in the user ID field 304. The query data field 306 includes data (e.g., string data, image data, coordinate data, etc.) to be used by the query responder 120 to generate the query results 102. The device pose data field 308 includes information regarding the pose (e.g., the location, orientation, altitude, etc.) to the end-user device 106.

As disclosed in more detail in FIG. 13 below, the example query responder 120 generates query results 102 in response to the queries 104 from the end-user devices 106. To generate a query result 102, the query responder 120 analyzes the topic(s) included in the query 104 and determines which of the query records in the ARP database 112 (*a*) are responsive (e.g., are about the topic(s) in the query 104 and are about topics that have a high affinity to the topic(s) in the query 104), and (b) conform to the user's preferences. For example, in response to a query 104 that include the topic of "The Rookery Building," the query responder 120 may generate the query result 102 based on entry records indexed for topics such as "The Rookery Building," "Daniel Burnham," "Brooks Brothers," and "South La Salle Street," etc., and exclude entry records associated with content database providers that require a subscription.

Figure 4:
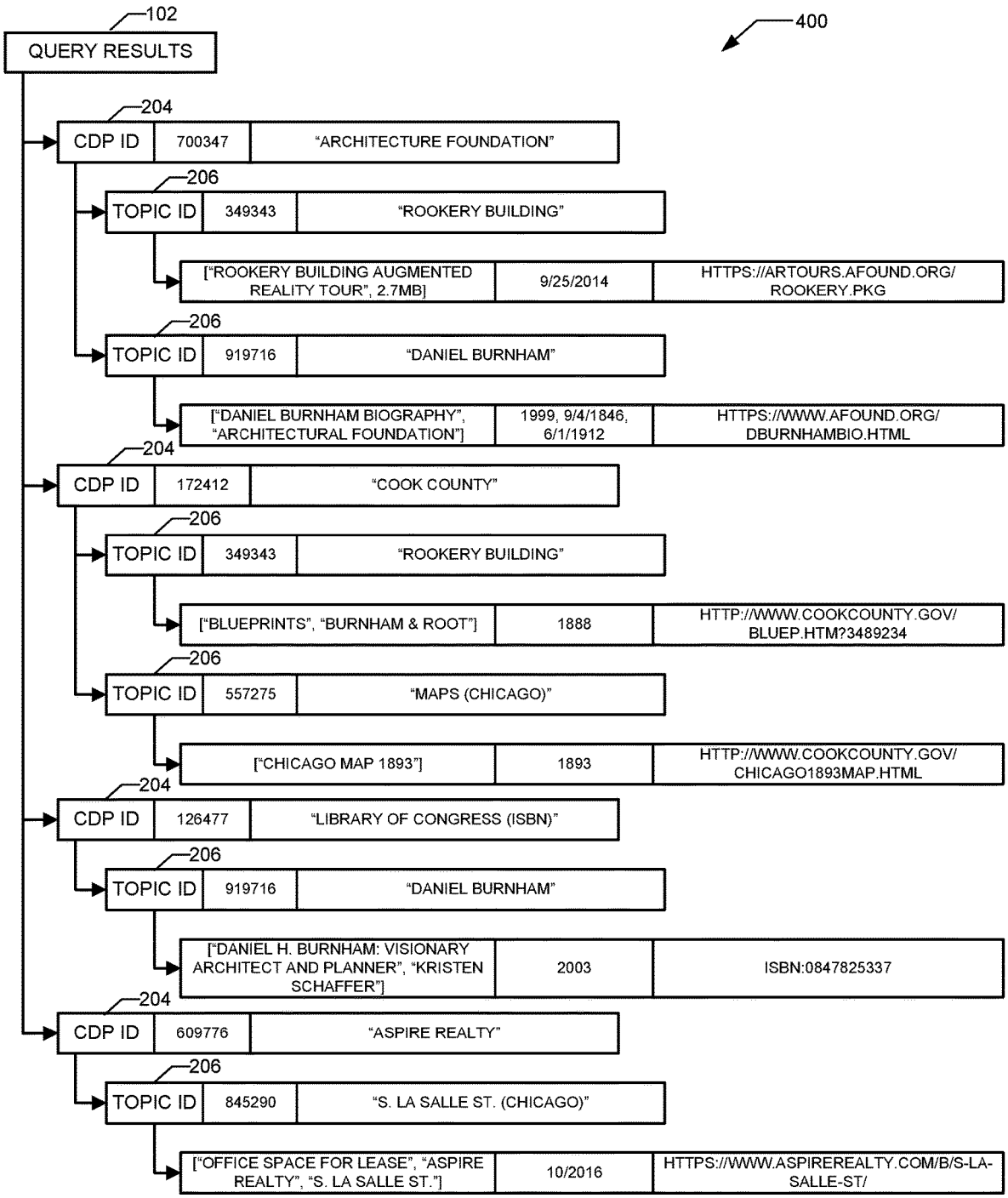
FIG. 4 illustrates an example data structure used to form the query results.

FIG. 4 illustrates an example data structure 400 used to form the query results 102. In the illustrated example, the query results are arranged in a hierarchy, based on the CDP ID field 204, the topic ID field 206, and then the entry record data (e.g., the topic metadata field 208, the topic date field 210, and the URI field 212). However, the data structure 400 may be arranged in any other suitable manner (e.g., by the topic ID field 206 then the CDP ID field 204, by the topic date field 210, etc.). Alternatively, in some examples, the data structure 400 may be a flat list of entry record data structures 200 that is then organized into a hierarchy by the end-user device 106.

Figure 5:
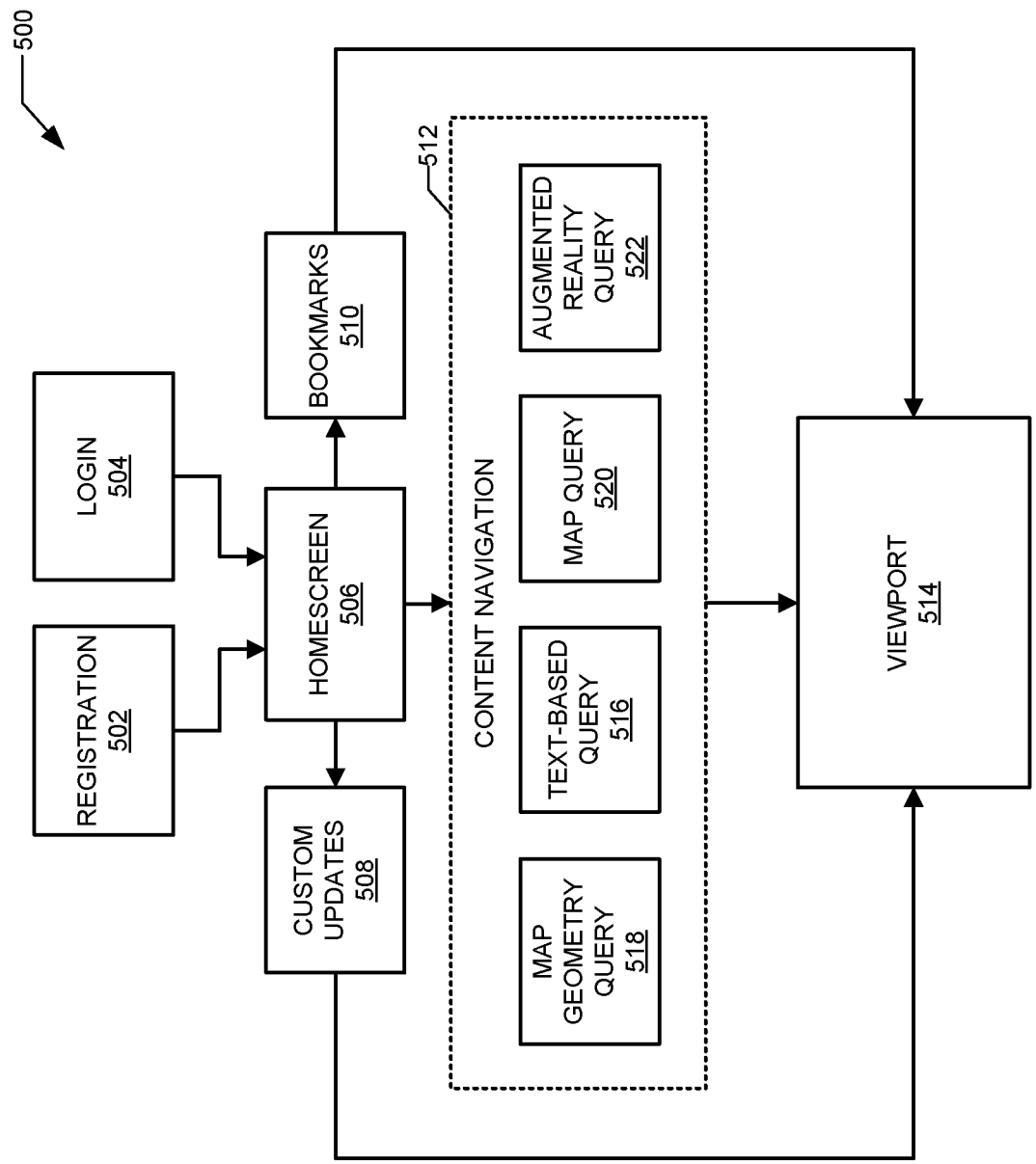
FIG. 5 illustrates a diagram of a navigation map for a user to search content with the end-user device of FIG. 1.

FIG. 5 illustrates a diagram of a navigation map 500 for a user to search content with the end-user device 106 of FIG. 1. In the illustrated example, the navigation map 500 includes a registration interface 502, a login interface 504, a home interface 506, a custom updates interface 508, a bookmarks interface 510, and content navigation interfaces 512 to be displayed on a viewport 514. The registration interface 502 facilitates a user creating an account to choose settings, set preferences, and create authentication credentials. Through the registration interface 502, the user handler 114 creates a user record to be sorted in the user database 116. The login interface 504 creates a session by facilitating a registered user entering authentication credentials. The home interface 506 facilitates selecting one of the content navigation interfaces 512, the custom update interface 508 and/or the bookmarks interface 510. In some examples, the home interface 506 includes one of the other interfaces 508-512 by default depending on preference settings of the corresponding user record. The custom update interface 508 presents entries that are updated in real-time based on preferences set in the corresponding user record. The bookmarks interface 510 presents saved previous query results 102.

In the illustrated example, the content navigation interfaces 512 includes a text-based query interface 516, a map geometry query interface 518, a map query interface 520, and an augmented reality query interface 522. The text-based query interface 516 facilitates a user generating a query 104 by entering a string into a text box. For example, a user may enter "The Thompson Center" into the text box of the text-based query interface 516. As disclosed in more detail in FIG. 9 below, the map geometry query interface 518 provides an interface to (i) generate queries based on interactive map geometry data (e.g., from a map geometry content database provider, such as Google, CycloMedia, Tencent, etc.) and/or static images, and (ii) browse results from the queries. As disclosed in more detail in FIG. 10, the map query interface 520 provides an interface to (i) generate queries based on map images, and (ii) browse results from the queries. As disclosed in more detail below in FIG. 11, the augmented reality query interface 522 provides an interface to (i) generate queries based on pointing a camera (e.g., the back-facing camera 2616 of FIG. 26 below) at objects, (ii) provide quick results based on identifying the objects, and (iii) browse results from the queries.

The viewport 514 is the visible area of the interfaces 502-512 on the end-user devices 106. Because the displays (e.g., the display 2612 of FIG. 26 below), and thus the amount of area to provide the interface to the user, of the different types of end-user devices 106 have different dimensions, the viewport 514 varies how the interfaces are displayed on the particular end-user device 106. For example, the displayed interfaces 502-512 may be smaller, oriented differently, and/or have a different aspect ratio on a portable device (e.g., a smart phone, a tablet, etc.) than on a computer screen. In the illustrated example, the viewport 514 formats the orientation, layout, and size to the interfaces 502-512 suitable for the particular display of the end-user device 106.

Figure 6:
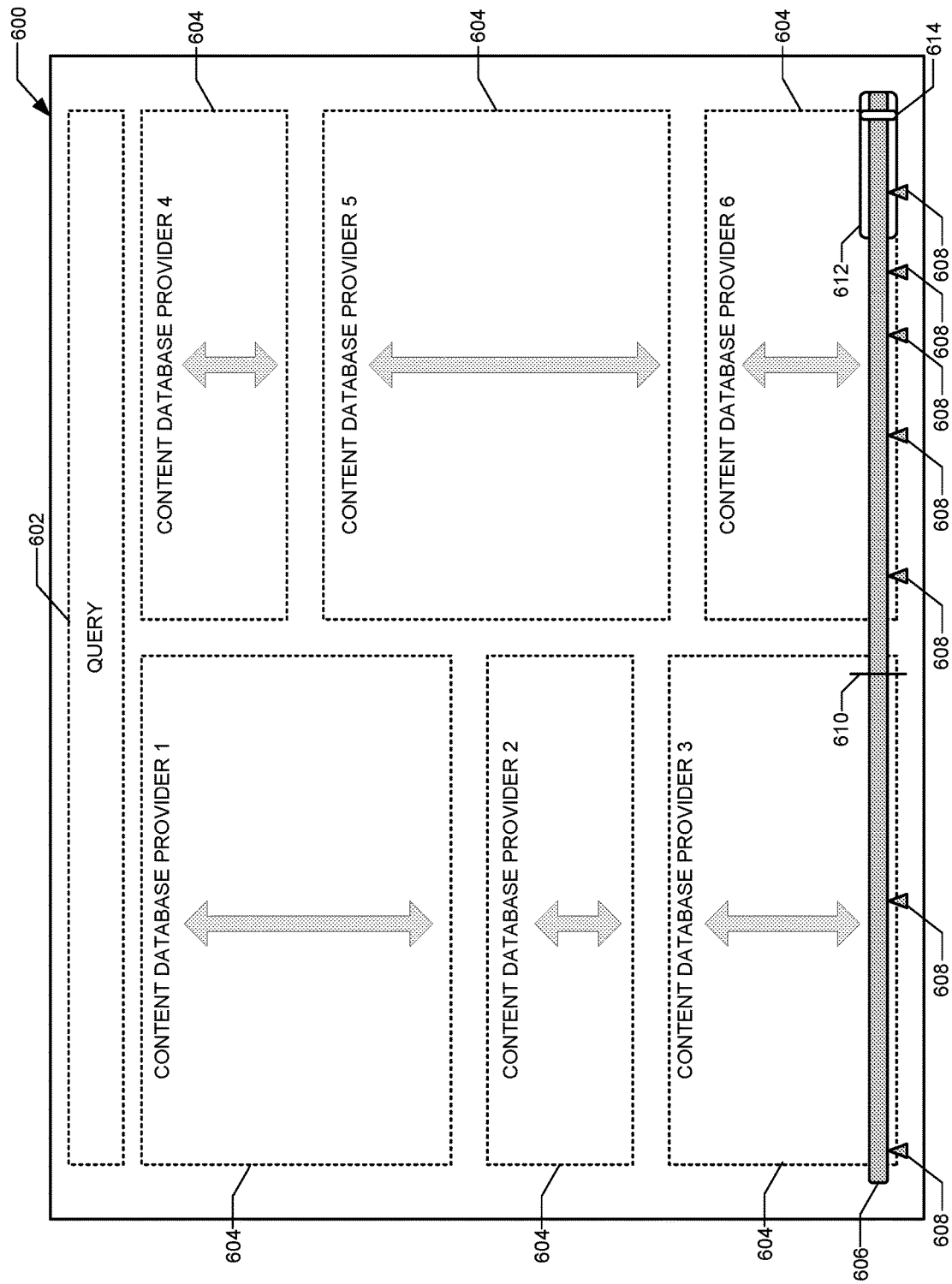
FIG. 6 depicts an interface presented by the end-user device of FIG. 1 to facilitate presenting and interacting with the query results.

FIG. 6 depicts an interface 600 presented by the end-user device 106 of FIG. 1 to facilitate presenting and interacting with the query results 102. In some examples, the interface 600 is superimposed on the interface 516-522 from which the query 104 was generated. For example, if the query 104 was generated via the map geometry query interface 518, the interface 600 maybe superimposed on the image of the map geometry data of the map geometry query interface 518. In the illustrated example, the interface 600 includes a query identifier field 602, query result fields 604, a scrubber track 606, event points 608, timeline markers 610, a scrubber 612, and a position marker 614. The example query identifier field 602 displays the query 104 for which the query results 102 are being displayed. The query result fields 604 display the query results 102 segregated by topic and/or content database provider 108. In some examples, the query result fields 604 are sized according to a number of entries associated with the corresponding topic and/or content database provider 108. In some examples, when there are more entries for a topic and/or content database provider 108 than can be displayed in the corresponding query result field 604, the interface 600 accepts a swipe input (e.g., a vertical or horizontal input to the particular query result fields 604) to facilitate browsing the entries displayed in the particular query result fields 604.

The scrubber track 606 facilitates limiting results displayed in the query result fields 604 by a criterion. In some examples, the criterion is a chronological value (e.g., a date) associated with the entries in the query result 102. Alternatively, in some examples, the criterion is a relevancy score associated with the entries in the query result 102. The scrubber track 606 may be displayed vertically or horizontally. The event points 608 demark events or time periods of significance. In some examples, the events or the time periods of significance are (a) the events or time periods that are location maxima of mentions in the entries of the query results, and/or (b) a curate set of events associated with the particular query 104. For example, if the query is "Chicago," the event points 608 may mark 1803 (the founding of Fort Dearborn), 1871 (the great Chicago fire), 1893 (the Columbian Exposition World's Fair), 1933 (the Century of Progress World's Fair), and/or 1973 (Sears Tower complete), etc. The timeline markers 610 mark points in time (e.g., day, weeks, years, decades, etc.) depending on the chronological scope of the query. For example, the timeline markers 610 may mark every fifty years.

The scrubber 612 indicates which of the entries are displayed in the query result fields 604. The scrubber 612 shows a relative amount of entries that are being displayed in the query result fields 604. For example, if there are 2000 entries and 400 entries are being shown, the scrubber 612 would encompass twenty percent of the scrubber track 606. In some examples, the size of the scrubber 612 is determined by a user preference for (i) a number of the entries displayed in the query result fields 604 or (ii) a percentage of entries displayed in the query result fields 604. The position marker 614 controls the position of the scrubber 612. Changing the location of the position marker 614 along the scrubber track 606 changes at least some of the entries displayed in the query result fields 604.

Figure 7:
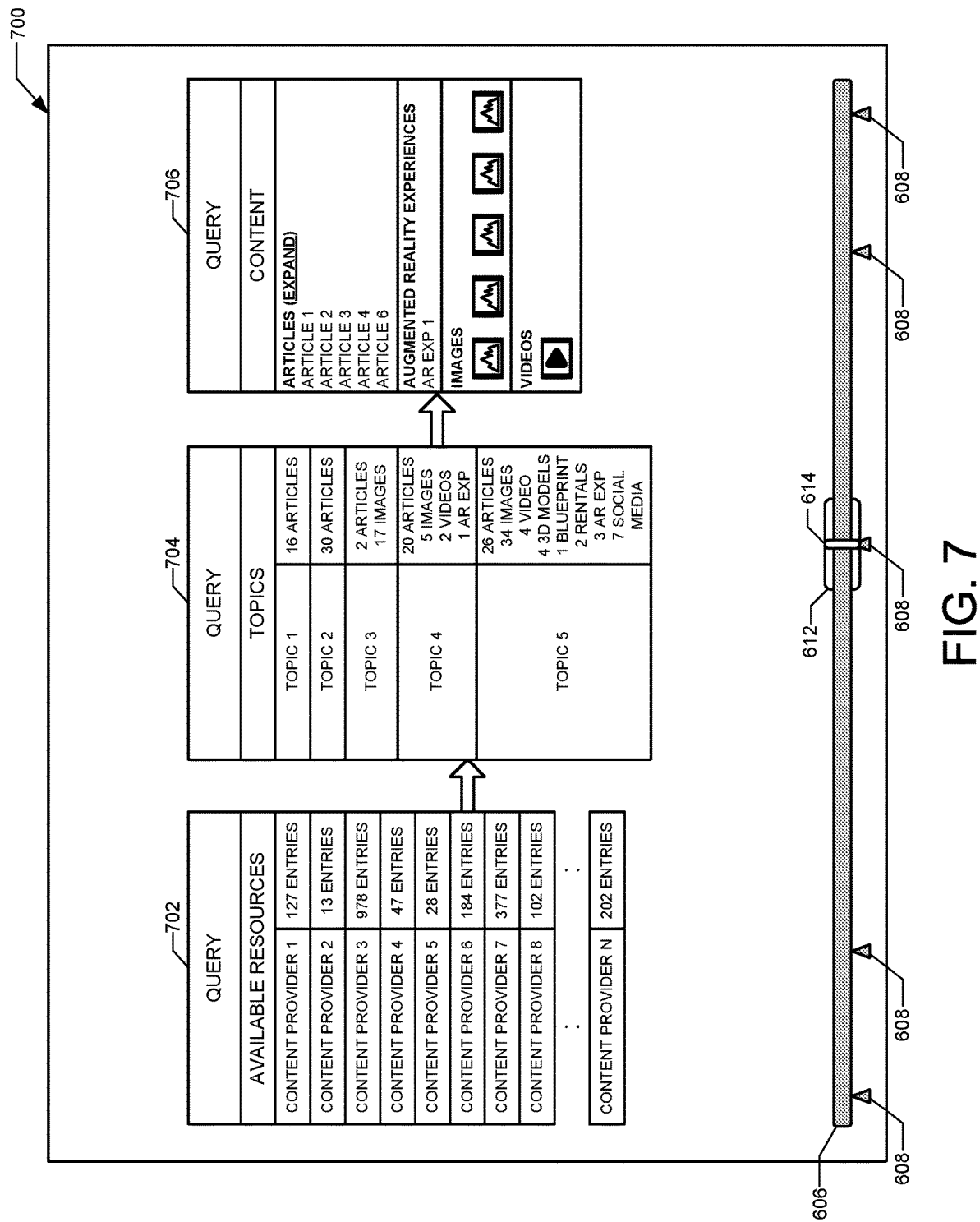
FIG. 7 depicts another interface presented by the end-user device of FIG. 1 to facilitate presenting and interacting with the query results.

FIG. 7 depicts another interface 700 presented by the end-user device 106 of FIG. 1 to facilitate presenting and interacting with the query results 102. In the illustrated example, the interface 700 presents the query results 102 in a hierarchical manner. In some examples, the interface 700 is superimposed on the interface 516-522 from which the query 104 was generated. The example interface 700 presents a first hierarchy element 702 that displays a first level of results. In some examples, the first level of results is the content database providers 108. When one of the first levels of results is selected, the interface presents a second hierarchy element 704 that displays a second level of results. In some examples, the second level of results is the topics associated with the query 104. When one of the second levels of results is selected, the interface 700 displays a third hierarchy element 706 that displays a third level of results. In some examples, the third level of results includes the entries from the selected content database provider about the selected topic. In some examples, the interface 700 may include further hierarchical levels to facilitate browsing the query results 102 in finer levels of detail. In the illustrated example, the interface 700 includes the scrubber track 606, the event points 608, the timeline markers 610, the scrubber 612, and/or the position marker 614 to facilitate navigating though the query results 102 based on the criterion (e.g., the chronological value, the relevance value, etc.).

Figure 8:
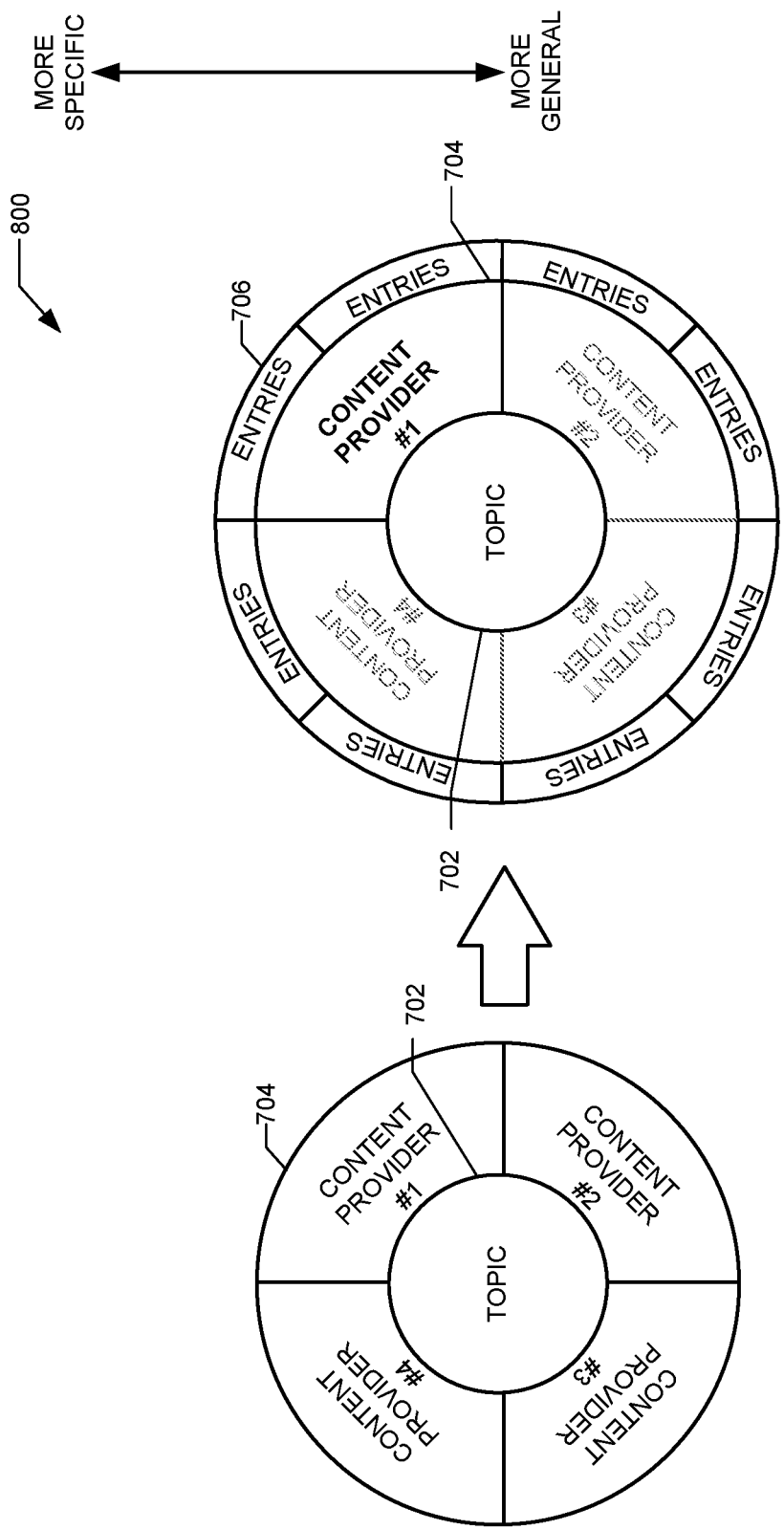
FIG. 8 depicts another interface presented by the end-user device of FIG. 1 to facilitate presenting and interacting with the query results.

FIG. 8 depicts another interface 800 presented by the end-user device 106 of FIG. 1 to facilitate presenting and interacting with the query results 102. In the illustrated example, the interface includes the first hierarchy element 702, the second hierarchy element 704, and the third hierarchy element 706 arranged in concentric circles. In the illustrated example, the first hierarchy element 702 is associated with the topic, the second hierarchy element 704 is associated with the content database providers 108, and the third hierarchy element 706 is associated with the entries. Initially, some of the hierarchies 704 and 706 are hidden until a selection is made on the associated lower level hierarchy (e.g., the first hierarchy element 702). In some examples, the interface 800 includes more hierarchies. In such examples, at the hierarchies closer to the center are more general and the hierarchies become more specific the further from the center they are. An example hierarchy may be: topic content providers entry types specific entries. In some examples, a user scrolls through the hierarchies 702-706 by turning the hierarchy of interest about a central axis. Although not shown, the interface 800 may include the scrubber track 606, the event points 608, the timeline markers 610, the scrubber 612, and/or the position marker 614 to facilitate navigating though the query results based on the criterion (e.g., the chronological value, the relevance value, etc.).

Figure 9:
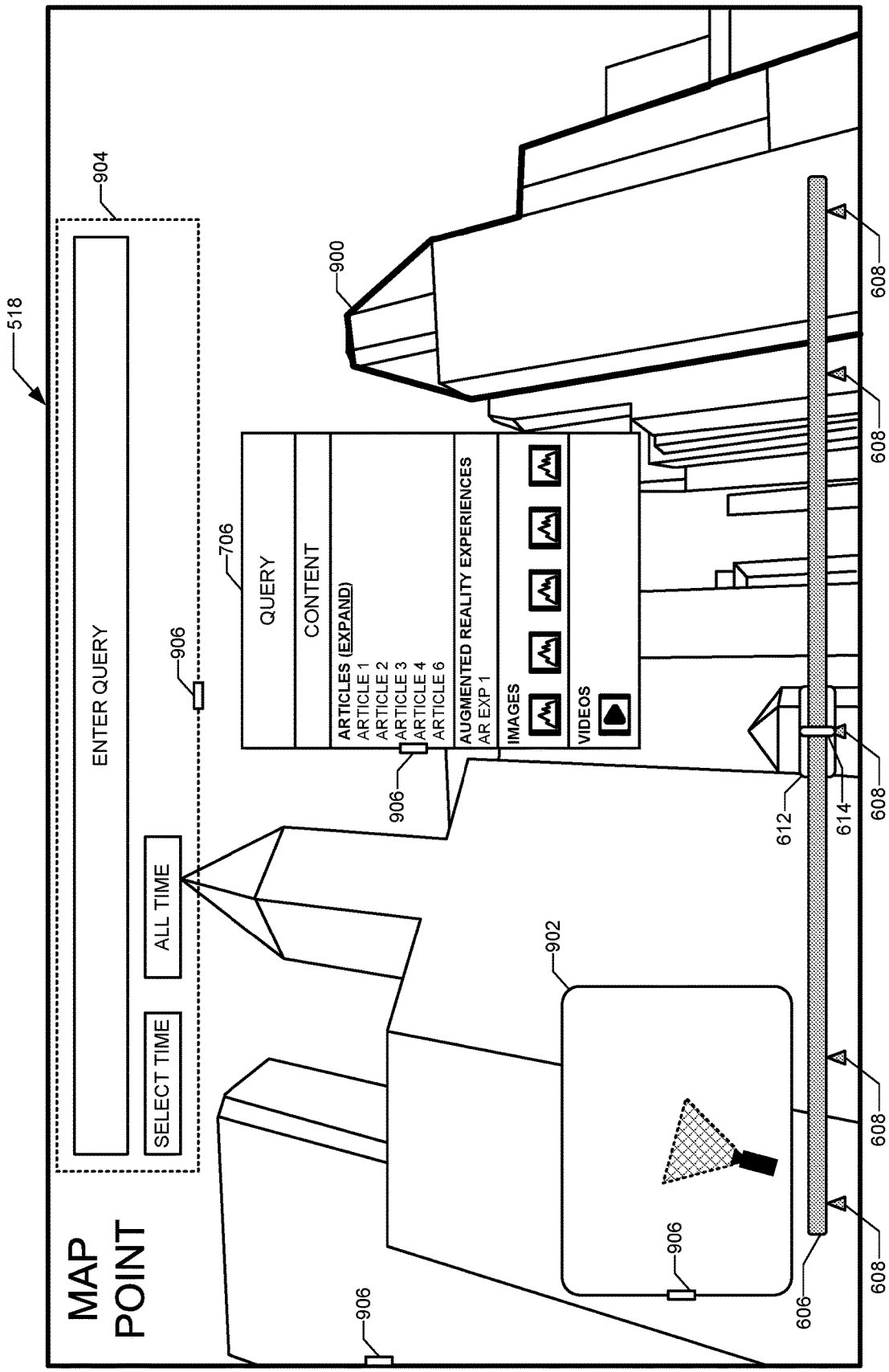
FIG. 9 depicts a map geometry interface presented by the end-user device of FIG. 1 to facilitate generating the query and presenting and interacting with the query results.

FIG. 9 depicts the map geometry query interface 518 presented by the end-user device 106 of FIG. 1 to facilitate generating the query 104 and presenting and interacting with the query results 102. In the illustrated example, the user browses map geometry data and/or static images to generate the query 104. Based on the displayed map geometry data or the static image, the end-user device 106 sends pre-query data to the ARPE 100 to identify objects 900 (e.g., buildings, landmarks, people, etc.) in the map geometry data or the static image. In the illustrated example, the map geometry query interface 518 outlines the identified objects. When the user interacts with the highlighted object (e.g., the object 900), the map geometry query interface 518 generates a query 104 about that object.

Initially, in some examples, the map geometry query interface 518 may display a zoomed-out view of an overhead map of the area around the location of the end-user device 106. The user may set a preference for how much the initial view of the overhead map is zoomed-out. The user selects a location on the overhead map to view the map geometry data. In the illustrated example, the map geometry query interface 518 includes an inset map 902 that shows (a) the location of the point-of-view on the overhead map and (b) the orientation of the point-of-view of currently displayed map geometry data in comparison to the overhead map. The map geometry query interface 518 may also include other windows to display information about the displayed map geometry data. When the end-user device 106 receive results from the ARPE 100, the map geometry query interface 518 displays the results in via an interface (e.g., the interfaces 600, 700, and 800 of FIGS. 6, 7, and 8 above) super imposed on the map geometry query interface 518. In the illustrated example, the map geometry query interface 518 includes results display via the hierarchical interface 700 of FIG. 7 above. In the illustrated example, windows (e.g., the hierarchy elements 702, 704, and 706, the inset map 902, a query text box 904, etc.) displayed by the map geometry query interface 518 include handles 906 that facilitate hiding and expanding the windows. In some examples, to hide one of the windows, the corresponding handle 906 is dragged to an edge of the map geometry query interface 518. In some examples, double-tapping the handles 906 causes the corresponding window (e.g., the inset map 902) to collapse or expand. In some examples, event points 608 are added to the scrubber track 606 to indicate entries (e.g., images, videos, etc.) of the scene displayed by the map geometry query interface 518 are available that represent a different point in time.

In some examples, the end-user device 106 includes an accelerometer and a magnetometer to facilitate determining the orientation of the end-user device 106. In some such examples, when the map geometry data is displayed, changing the orientation of the end-user device 106 changes which portion of the map geometry data is displayed. In such a manner, the user may change the map geometry data by moving the end-user device 106. In such examples, as the displayed map geometry data changes, the end-user device 106 sends pre-query data to the ARPE 100 to identify the objects 900 in the displayed map geometry data or the static image. The map geometry query interface 518 continually identifies (via the pre-query responses) and outlines the objects 900.

Figure 10:
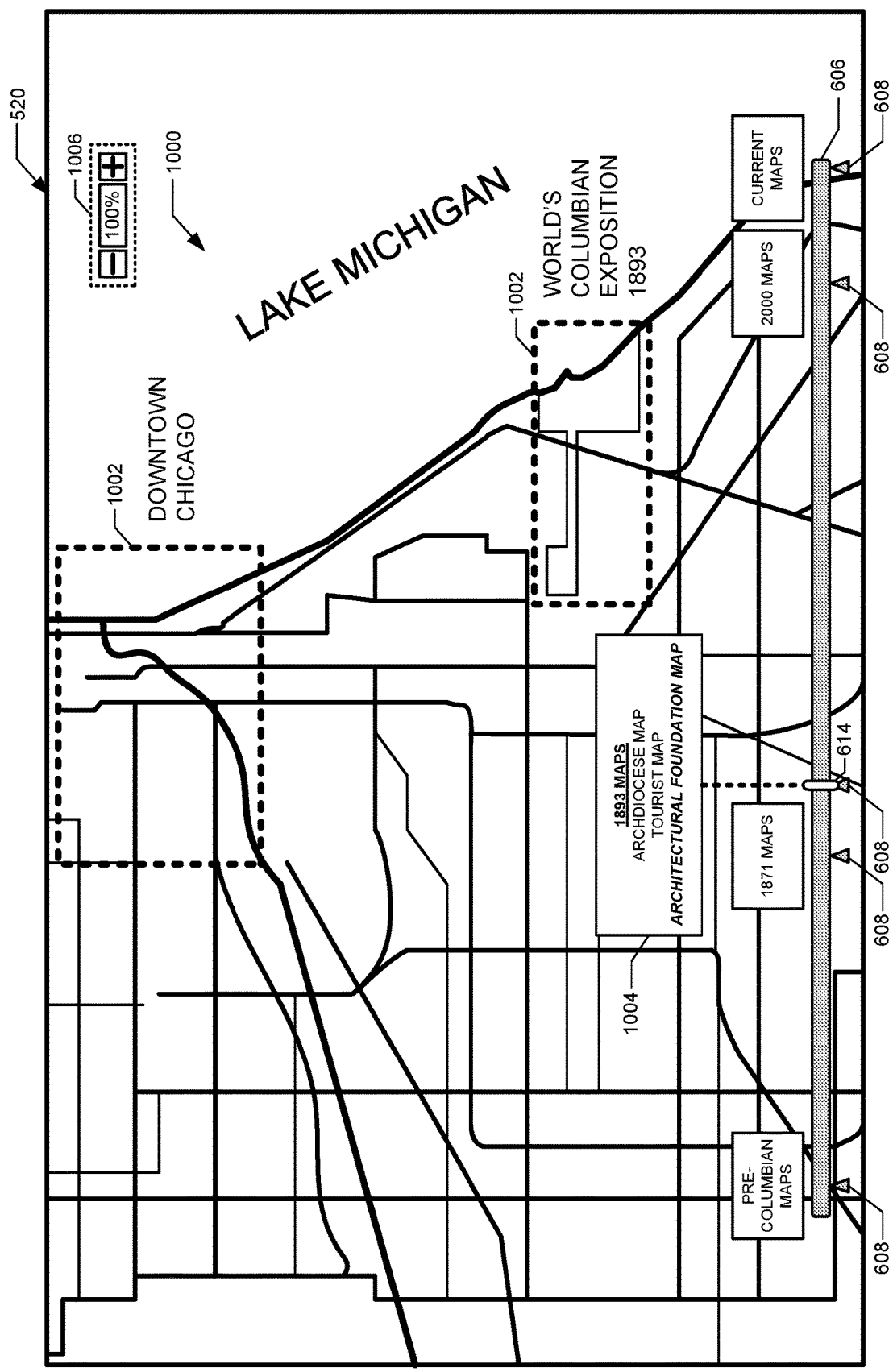
FIG. 10 depicts a map interface presented by the end-user device of FIG. 1 to facilitate generating the query and presenting and interacting with the query results.

FIG. 10 depicts the map query interface 520 presented by the end-user device 106 of FIG. 1 to facilitate generating the query 104 and presenting and interacting with the query results 102. In the illustrated example, the map query interface 520 displays a map 1000. The map 1000 may be selected via one of the result interface (e.g., interfaces 600, 700, and 800 of FIGS. 6, 7, and 8, above). The map query interface 520 includes the scrubber track 606, the event points 608, the timeline markers 610, the scrubber 612, and/or the position marker 614 to facilitate navigating though related maps (e.g., maps that cover the same or substantially similar geographical areas, etc.) with different chronological values. The event points 608 are indicative of maps with different chronological values. The illustrated example includes a trackhead menu 1004 to display the map(s) associated with the event point 608 at which the position marker 614 is located. In some examples, the trackhead menu 1004 presents a string list to facilitate selecting different maps associated with the event point 608.

The map query interface 520 includes highlighted regions 1002 to indicate suggested queries 104. For example, a map that depicts Chicago in 1893 may include a highlighted region 1002 around the area of the map of the World's Columbian Exposition. When one of the highlighted regions 1002 is selected, the map query interface 520 generates a query 104 associated with the topic of the corresponding highlighted region 1002. The query results 102 may be superimposed on the map query interface 520 using one of the result interfaces 600, 700, and 800. In some examples, the map query interface 520 includes a view distance control panel 1006 that facilitates increasing and decreasing the magnification or zoom of the map 1000. In some such examples, if the user set a view distance to show regions beyond the borders of the map 1000, the map query interface 520 display (a) other maps that have a similar chronological value and/or (b) current maps (such as satellite imagery maps, roadmaps, etc.).

Figure 11:
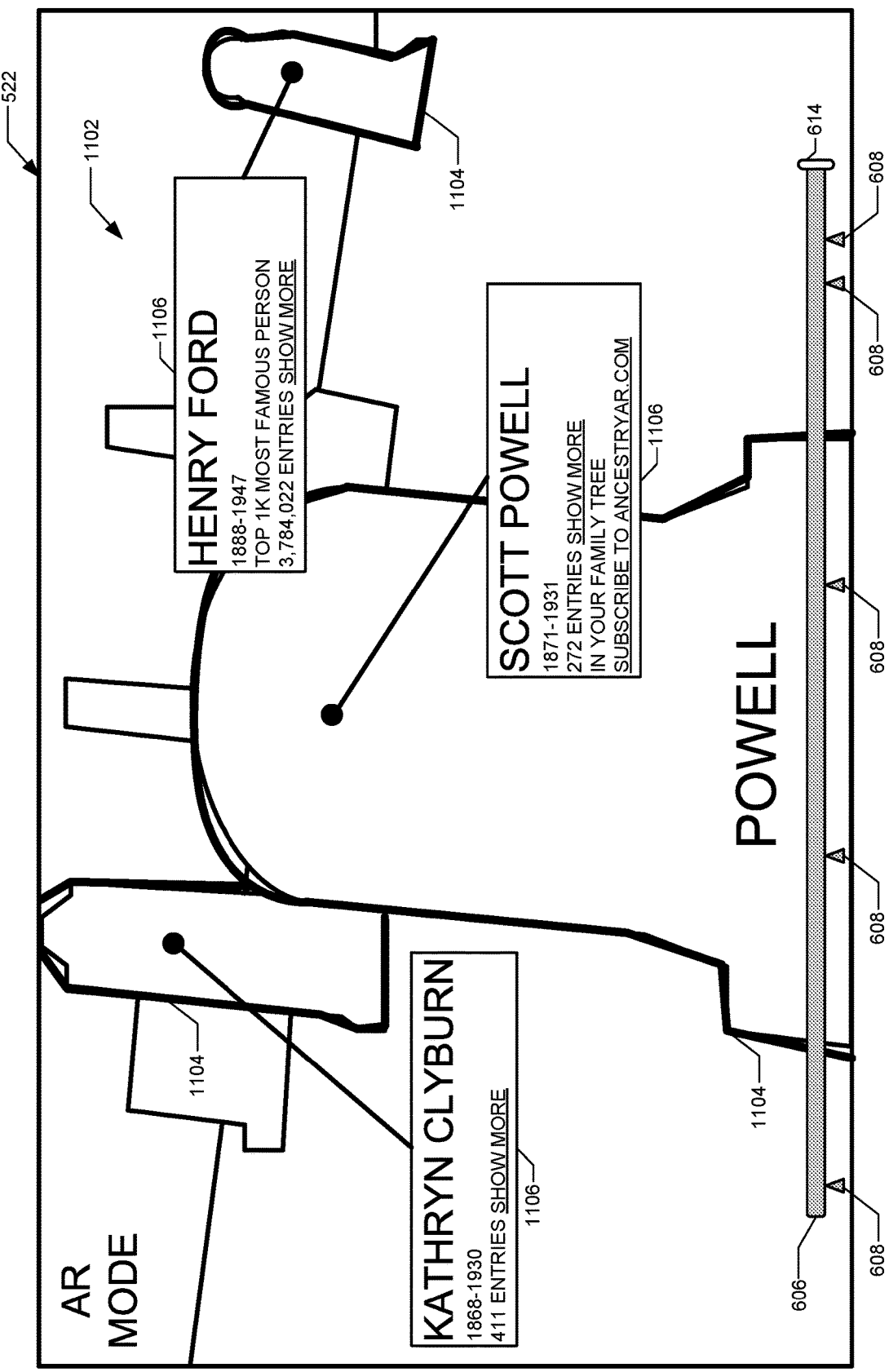
FIG. 11 depicts an augmented reality interface presented by the end-user device of FIG. 1 to facilitate generating the query and presenting and interacting with the query results.

FIG. 11 depicts an augmented reality query interface 522 presented by the end-user device 106 of FIG. 1 to facilitate generating the query 104 and presenting and interacting with the query results 102. In the illustrated example, the augmented reality query interface 522 displays a live image 1102 captured by one of the cameras (e.g., the cameras 2614 and 2616 of FIG. 26 below). Additionally or alternatively, in some examples, the augmented reality query interface 522 displays images from a media application (e.g., Netflix, Hulu, local broadcasts via a smart TV, etc.) as if the images were being captured by one of the cameras. In some examples, when the augmented reality query interface 522 is described below as analyzing the live images captured by one of the cameras, the augmented reality query interface 522 may instead be analyzing images from the media application. From time-to-time (e.g., periodically, aperiodically, etc.), the augmented reality query interface 522 sends pre-query data to the ARPE 100 to identify objects 1104 within the live image 1102. The information in the pre-query data depends on the sensors of the end-user device 106. When an object 1104 is recognized, the augmented reality query interface 522 outlines and/or highlights the object 1104. In some examples, when an object 1104 is recognized, the ARPE 100 performs abbreviated queries with the objects 1104 as topics. In such an example, the augmented reality query interface 522 displays abbreviated query panels 1106 with basic information (e.g., identity of the object, dates associated with the object, number of entries pertaining to the object, factoids about the object, available subscriptions to content database providers 108 with information about the object, etc.). When the user interacts with the outlined and/or highlighted area or the abbreviated query panels 1106, the augmented reality query interface 522 generates and sends the query 104 with the identity of the object as the topic to the ARPE 100.

When the augmented reality query interface 522 receives the query results 102, the augmented reality query interface 522 may super impose the query results based on the results interface (e.g., the interfaces 600, 700, and 800 of FIGS. 6, 7, and 8 above). Additionally, in some examples, in response to an entry from the query results 102 being selected, the augmented reality query interface 522 super imposes the selected entry onto the live image 1102. For example, if the selected entry is an image associated with coordinates and an orientation, the augmented reality query interface 522 may transform (e.g. change size, display angle, and/or perspective, etc.) the image to display in the place of the corresponding object 1104. In some examples, the augmented reality query interface 522 emphasizes local entries (e.g., related to topics that are geographically proximate to the location of the end-user device 106).

Additionally, in some examples, the augmented reality query interface 522 facilities generating entries to be associated with the outlined and/or highlighted the objects 1104. In such an example, the user, via an input device (e.g., the input devices 2608 of FIG. 26 below) enters a message (e.g., a length limited message) to be pinned to (e.g., associated in the ARP database 112 with) the selected outlined and/or highlighted the object 1104 and associated with a date. Additionally, the augmented reality query interface 522 may receive the message as part of the pre-query data and present (e.g., via one of the interfaces 600, 700, and 800) the pinned messages when the corresponding object 1104 is outlined and/or highlighted.

Figure 12:
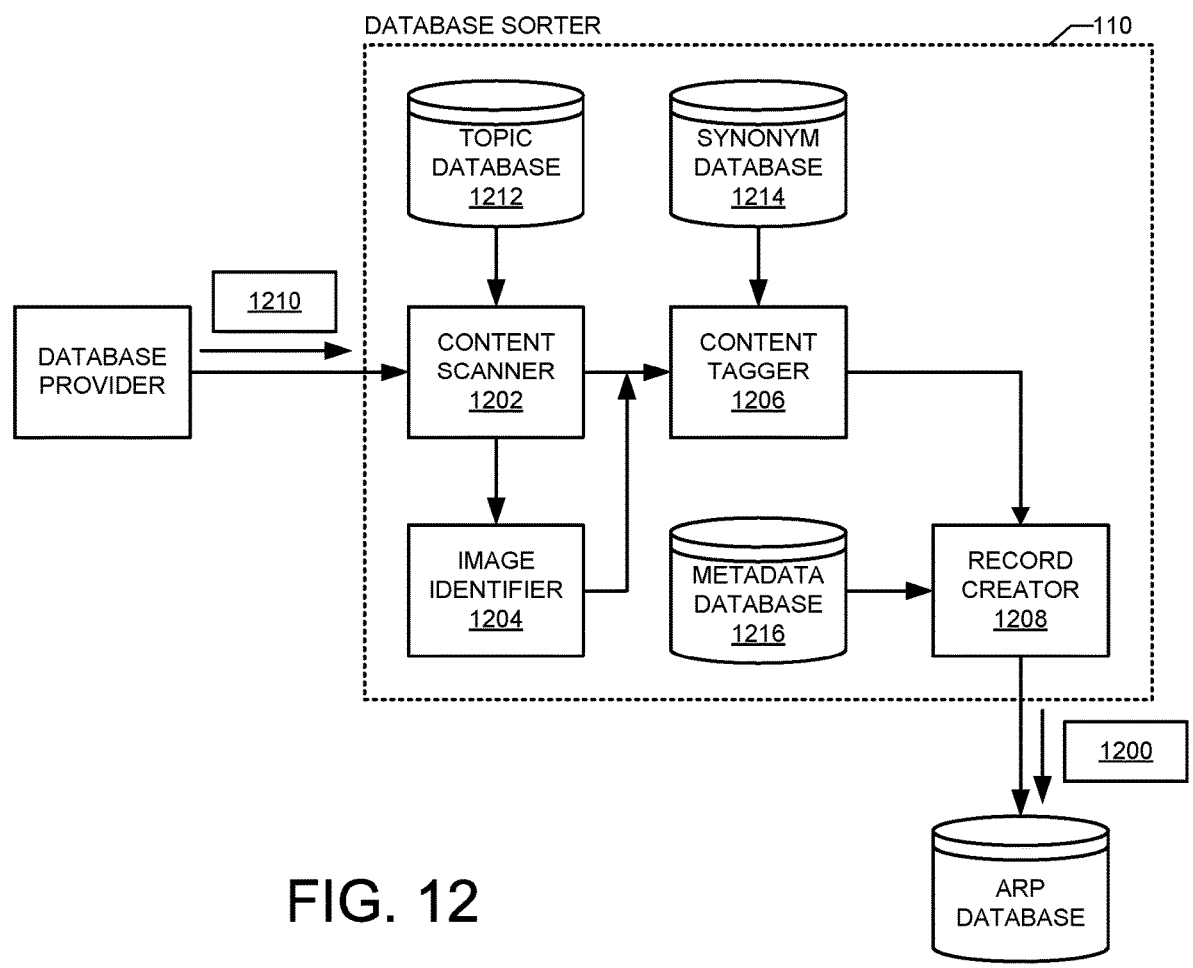
FIG. 12 is a block diagram of the database sorter of FIG. 1 that generates entry records.

FIG. 12 is a block diagram of the database sorter 110 of FIG. 1 that generates the entry records 1200 (e.g., based on the entry record data structures 200 of FIG. 2). In the illustrated example, the database sorter 110 includes an example content scanner 1202, an example image identifier 1204, an example content tagger 1206, and an example record creator 1208.

The example content scanner 1202 receives entries 1210 from the content database providers 108. The content scanner 1202 forwards ones of the entries 1210 that are images to the example image identifier 1204. The content scanner 1202 analyzes the entries 1210 to identify topics of interest within the entries 1210. The content scanner 1202 analyzes the body of the entry 1210, the title of the entry 1210, and metadata (e.g., tags, author, dates, etc.), etc. In the illustrated example, the database sorter 110 maintains an example topic database 1212 that includes topics on interest to be identified by the content scanner 1202. In some examples, the topic database 1212 includes abbreviations and common misspellings of the topics of interest. In some examples, the content scanner 1202 analyzes the entries to determine potential topics that are not in the topic database 1212. The potential topics are words in sentences that may be the subject or object of the sentence. In some such example, the potential topics may be flagged to determine whether the topic should be added to the topic database 1212. For example, if the entry 1210 states "The dogtor prescribed medicine to my corgi," the content scanner 1202 may (a) identify {medicine, corgi} as the topics of the entry 1210, and (b) {dogtor} as a potential topic. In some examples, when the entry 1210 does not have a text body (e.g., is a video, an augmented reality experience, etc.), the content scanner 1202 identifies topics in the metadata of the entry 1210 which may include topics suggested by the corresponding content database provider 108. Additionally, the content scanner 1202 analyzes the entries 1210 to identify dates associated with the entries. For example, an entry 1210 written on Apr. 4, 2008 that discusses the battle at Gettysburg may be associated with that dates of {Jul. 1, 1863, Jul. 1, 1863, Jul. 1, 1863, Apr. 4, 2008}.

The image identifier 1204 identifies topics within the entries 1210 that include images. The image identifier 1204 analyzes the metadata (e.g., HTML data, the EXIF data, the XMP data, etc.) associated with the image to determine tags of topics associated with the image. For example, the XMP data associated with the image may include keywords, key phrases, location markers, coordinates, or classification codes that describe the topic(s) of the image. In some example, the image identifier 1204 uses machine learning techniques (such as neural networks, etc.) to performs image recognition to identify topics in the image. Additionally, in some examples, the image identifier 1204 performs facial recognition to identify people in the image. In some examples, the image identifier 1204 performs a reverse image lookup to (i) identify other entries in which the image is used and/or (ii) identify other copies of the image that may contain different metadata. In some such examples, the image identifier 1204 identifies topics within the image based on the topics in the other associated entries and/or images. In some such examples, the topics are weighted based on the source (e.g., the content database provider 108) of the other associated entries and/or images. For example, the image identifier 1204 may distinguish between professional sources (e.g., professional image providers, such as Getty® Images, newspapers, etc.) and crowdsourced sources (e.g., Wikipedia, Amazon Turk, etc.).

The example content tagger 1206 associates the topics in the entries 1210 identified by the content scanner 1202 and/or the image identifier 1204 with topic identifiers for the topic ID field 206. In the illustrated example, the content tagger 1206 uses a synonym database 1214. The synonym database 1214 (a) associates topics that are synonyms, and (b) associates the topic identifiers with topics identified by the content scanner 1202 and/or the image identifier 1204. For example, the topics of {Abraham Lincoln, Honest Abe, Uncle Abe, The Great Emancipator, the Illinois Rail Splitter} may be associated with the topic identifier {713589}. In some examples, the content tagger 1206 includes the identified topic identifier(s) in the topic ID field 206 for a particular entry record if a number of times the topic or one of its synonyms is identified in the entry 1210 satisfies (e.g., is greater than or equal to) a threshold. In some such examples, the threshold is based on a number of topics identified in the entry 1210. For example, if thirty-five topics are identified in the entry 1210, the threshold may be five. Additionally, in some examples, the content tagger 1206 calculates relevance scores for the topics to be associated with the entry 1210. The relevance score measures the importance of the topic to the entry 1210. For example, the relevance score for text-based entries 1210 may be based on (i) the frequency of the topic in entry 1210, (ii) the length of the entry 1210, and (iii) the number of entries that 1210 that contain the topic.

The example record creator 1208 creates the entry records 1200 based on the entry record data structures 200. The record creator 1208 generates a unique record identifier to be entered into the record ID field 202. The record creator 1208 enters an identifier associated with the corresponding content database provider 108 in the CDP ID field 204. Additionally, the record creator 1208 enters the topic identifiers identified by the content tagger 1206 into the topic ID field 206. The record creator 1208 enters metadata associated with the entry 1210 (e.g., the title, coordinates, the author, the file size, etc.) into the topic metadata field 208. In some examples, the record creator 1208 maintains a metadata database 1216 that includes information (e.g., coordinates associated with a topic, dates associated with a topic, etc.) about the topics that may not be included in the entry 1210. The record creator 1208 enters dates associated with the topic identified by the content scanner 1202 and/or the image identifier 1204 or included in the metadata database 1216 into the topic date field 210. The record creator 1208 enters the URI associated with the entry 1210 into the URI field 212. The record creator 1208 then stores the entry record 1200 into the ARP database 112.

Figure 13:
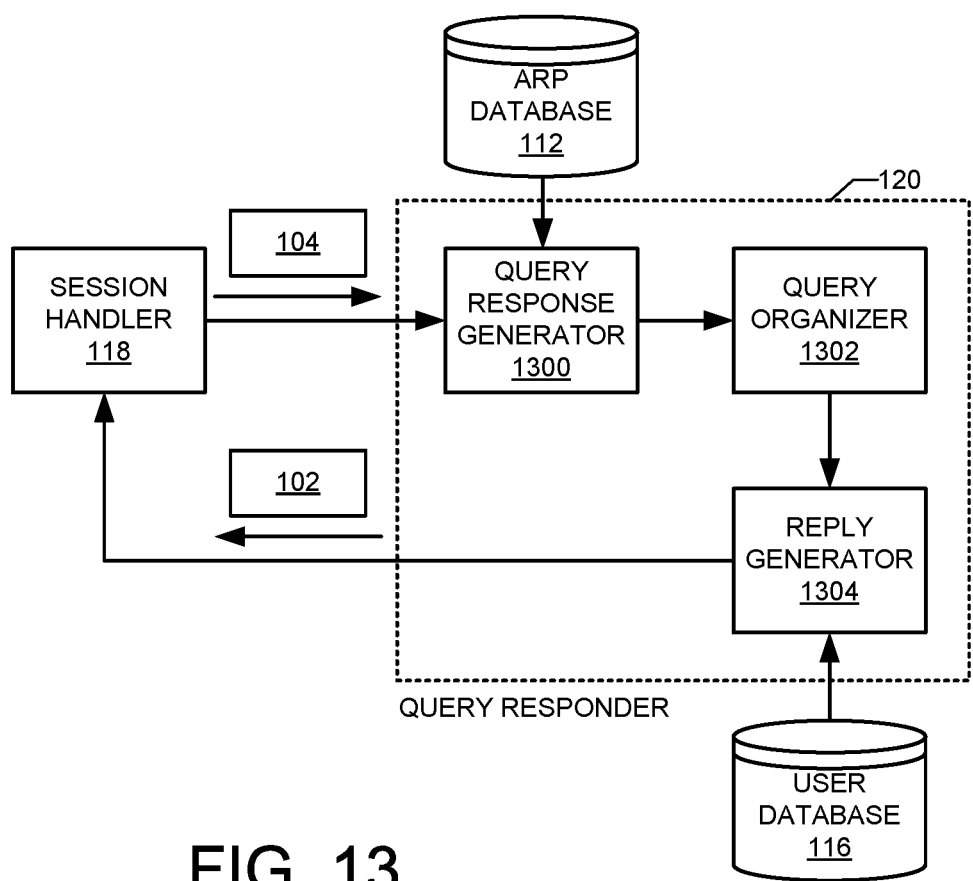
FIG. 13 is a block diagram of a query responder of the augmented reality platform entity of FIG. 1.

FIG. 13 is a block diagram of the query responder 120 of the augmented reality platform entity 100 of FIG. 1. In the illustrated example, the query responder 120 includes an example query response generator 1300, an example query organizer 1302, and an example reply generator 1304.

The example query response generator 1300 receives the query 104 from the end-user device 106 via the session handler 118. The query response generator 1300 analyzes the query 104 to determine the topic(s) contained in the query 104. In some examples, because some topics may not be directly contained in the query 104 (e.g., are inferential), the query response generator 1300 determines some topics based on inferences to other topics contained in the query 104. For example, if the query data field 306 of the query include the text string "person who designed the rookery building," the query response generator 1300 may retrieve people-related topics from the topic database that are related to the topic of the "Rookery Building." Based on the topics, the query response generator 1300 determines which topics in the topic database 1212 are related (e.g., have affinity with) the topics of the query 104.

The example query organizer 1302 receives and/or otherwise retrieves the topics identified by the query response generator 1300. Based on the topics, the query organizer 1302 retrieves the entry records 1200 related to the topics from the ARP database 112. In some examples, the entry records 1200 are filtered based on (i) the relevance of the entry records 1200 to the identified topics, and (ii) relationship between the identified topics and the query 104.

The example reply generator 1304 generates the query results 102 based on the entry records 1200 received and filtered by the query organizer 1302. Based on user preferences stored in the user database 116, the reply generator 1304 filters and orders the entry records 1200 based on the preferences. For example, a first user may prefer entries be presented by topic and then database content provider 108 or vice versa. In some examples, the reply generator 1304 assigns the records into chronological categories that are associated with periods of time. In some such examples, the chronological categories are based on a number of dates associated with the entry records 1200 in the query results 102 and clustering of the dates. Additionally, in some examples, the reply generator 1304 organizes the entry records 1200 into the chronological categories. In such examples, the reply generator 1304 organizes the entry records 1200 in each of the chronological categories into hierarchies (e.g., the hierarchies 702, 704, and 706 of FIG. 7 above). The reply generator 1304 formats (e.g., in HTML, in XML, etc.) the organized entry records 1200 to generate the query results 102.

Figure 14:
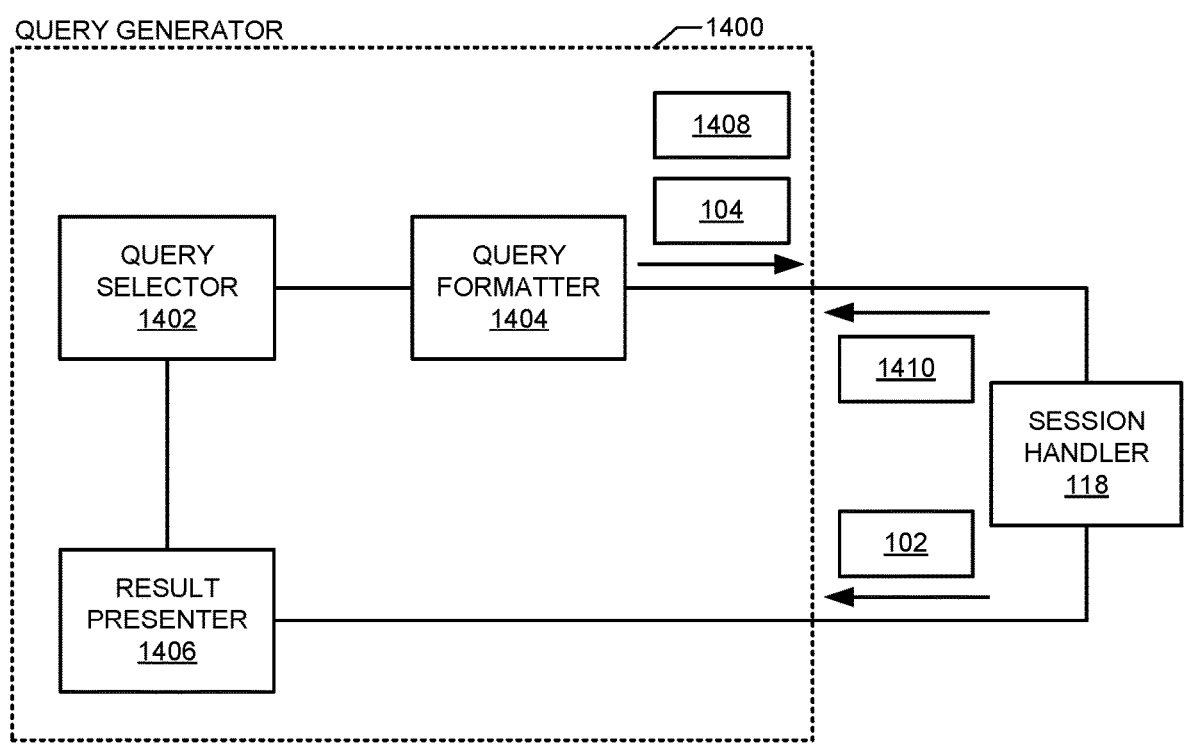
FIG. 14 is a block diagram of a query generator of the augmented reality platform handler of FIG. 11.

FIG. 14 is a block diagram of a query generator 1400 of the end-user device 106 of FIG. 1. The query generator 1400 generates queries 104 based on input from the end-user device 106 (e.g. via the input devices 2608 and/or the cameras 2614 and 2616 of FIG. 26 below) and presents the query results 102 via a display (e.g., the display 2612 of FIG. 26 below). In some examples, the query generator 1400 is included in an application that is downloaded onto the end-user device 106 from an application store (e.g., the Google Play Store, the App Store, etc.). Alternatively, in some examples, the query generator 1400 is implemented in hardware and software. In the illustrated example, the query generator 1400 includes an example query selector 1402, an example query formatter 1404, and an example result presenter 1406.

The query selector 1402 presents an interface (e.g., one of the interfaces 502-512) to the user on a display (e.g., the display 2612 of FIG. 26 below). The query selector 1402 receives input (e.g., from the input devices 2608 and/or the cameras 2614 and 2616 of FIG. 26 below) to facilitate a user navigating between the interfaces 502-512 and the user selecting which one of the content navigation interfaces 512 to generate a query 104.

The query formatter 1404 receives input to determine the query of the user based on the content navigation interfaces 512 selected via the query selector 1402. For some interfaces (e.g., the map geometry query interface 518, the map query interface 520, the augmented reality query interface 522, etc.), the query formatter 1404 generates pre-query data 1408 to be sent to the ARPE 100 to provide context to the selected interface. The pre-query data 1408 provides context to the ARPE 100 about the location and environment of the end-user device 106. For example, the pre-query data 1408 may include GPS coordinates, direction heading, airspeed, and altitude to provide context for objects of interest around when the end-user device 106 is used on a plane. The type of information included in the pre-query data 1408 may be based on the interface 512 being used. For example, for the augmented reality query interface 522, the query formatter 1404 may generate pre-query data 1408 that includes image(s) captured by the camera(s) of the end-user device 106. Additionally, the query formatter 1404 based on input from a user and, in some examples, a pre-query response 1410, the query formatter 1404 generates the query 104.

The result presenter 1406 receives the query results 102 and, in some examples, the pre-query response 1410. The result presenter 1406 superimposes the query results 102 onto the interface selected via the query selector 1402. In some examples, in response to receiving the pre-query response 1410, the result presenter 1406 superimposes outlines and/or highlights of topics of interest contained in the pre-query response 1410 on the interface selected via the query selector 1402. For example, if the pre-query response 1410 includes data for a particular tombstone from an image in the pre-query data 1408, the result presenter 1406 superimposes an outline and/or a highlight the tombstone in the interface being displayed to the user.

Figure 15:
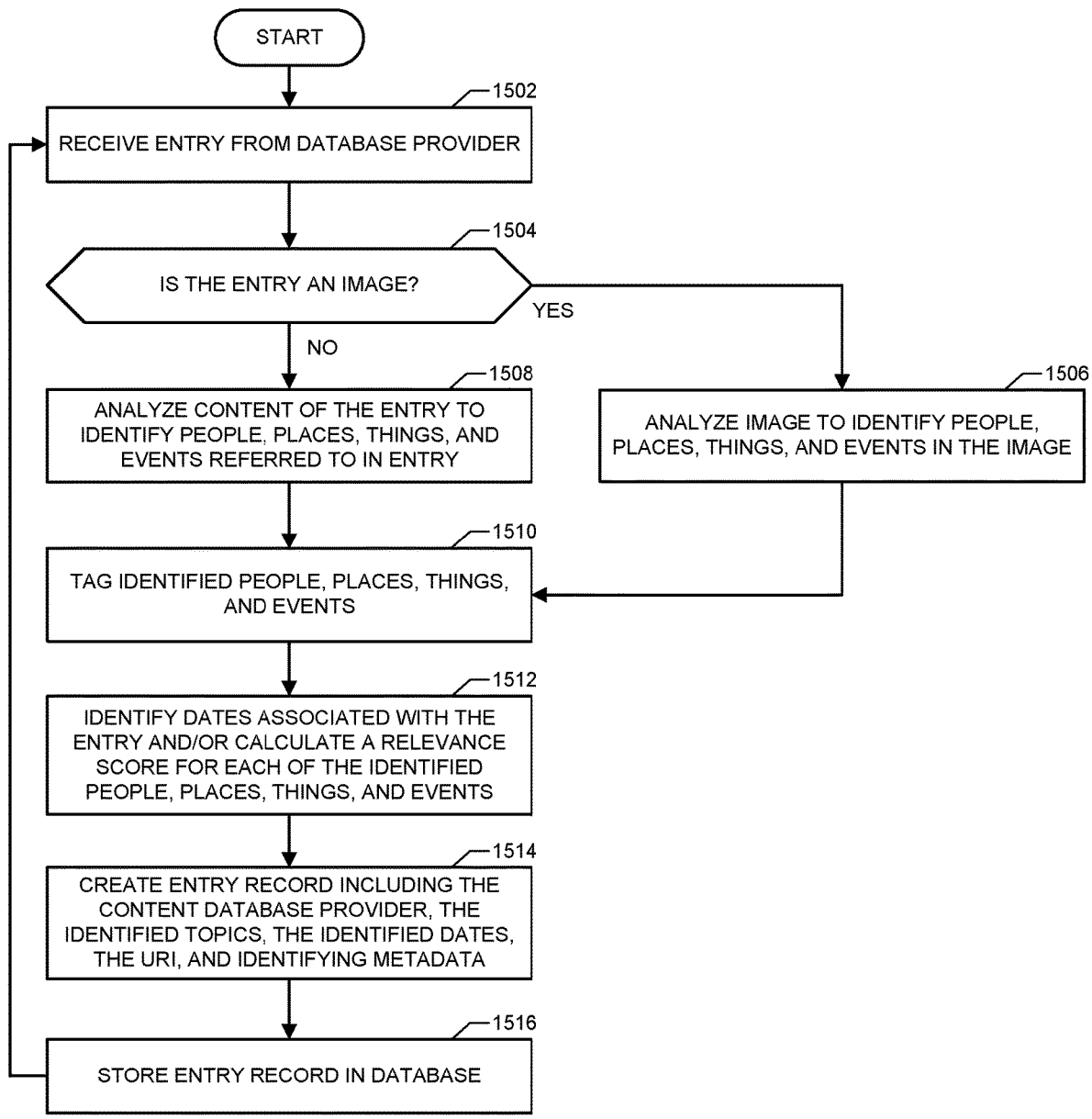
FIG. 15 is a flowchart of a method to index entries from content database providers, which may be implemented by the processor platform of FIG. 25.
Figure 25:
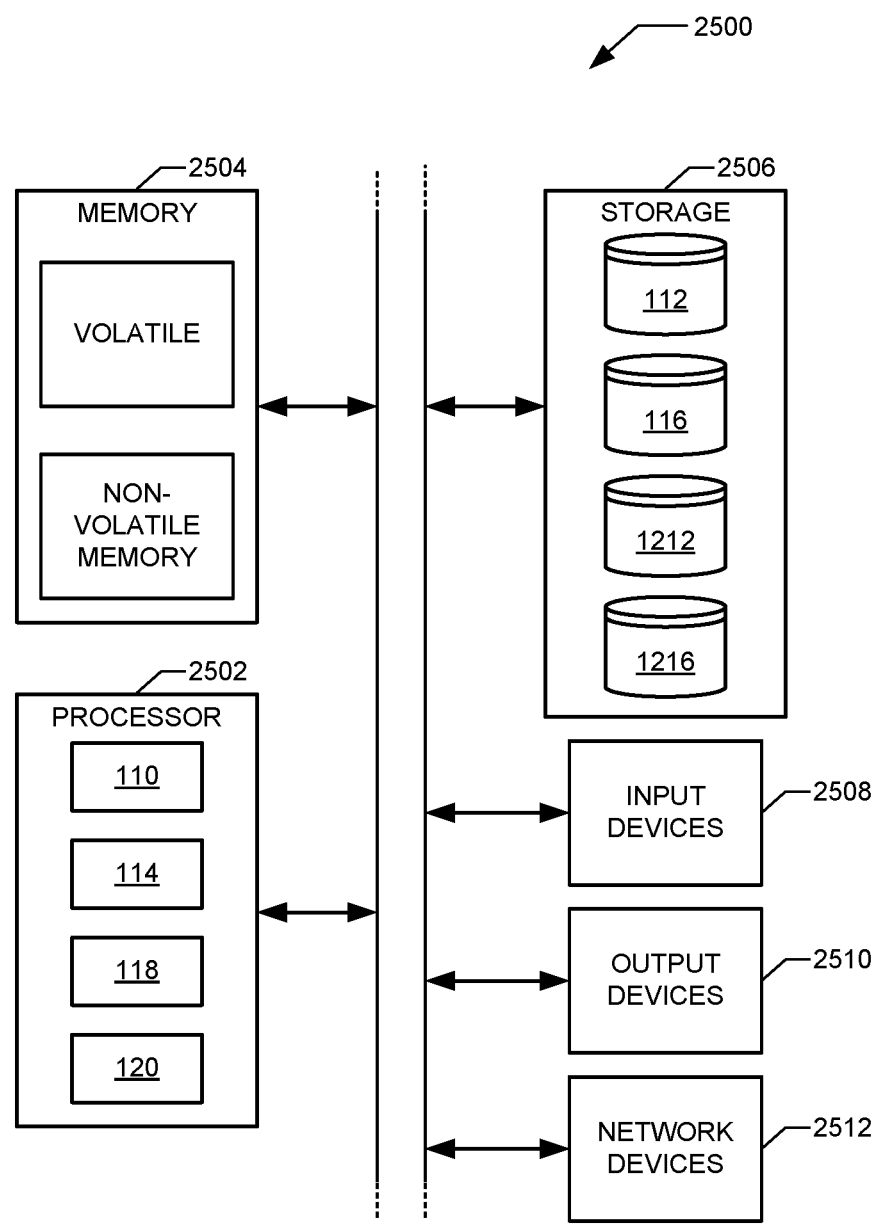
FIG. 25 is a block diagram of a processor platform that may implement the method of FIG. 15.

FIG. 15 is a flowchart of a method to index entries 1210 from content database providers 108, which may be implemented by the processor platform of FIG. 25. Initially, at block 1502, the content scanner 1202 receives an entry 1210 from one of the content database providers 108. At block 1504, the content scanner 1202 determines whether the entry 1210 received at block 1502 is an image. If the entry 1210 is an image, the method continues at block 1506. Otherwise, if the entry 1210 is not an image, the method continues at block 1508.

At block 1506, the image identifier 1204 analyzes the image to determine the topics in the image. The image identifier 1204 evaluates the metadata of the image for tags that identify the topics depicted by the image. In some examples, the image identifier 1204 performs image recognition on the image to identify the topics depicted by the image. At block 1508, the content scanner 1202 analyzes the text and metadata associated with the entry 1210 to determine the topics of interest in the entry 1210. At block 1510, the content tagger 1206 tags the identified topics identified by the content scanner 1202 and/or the image identifier 1204. In some examples, based on the synonym database, the content tagger 1206 consolidates the topics identified by the content scanner 1202 and/or the image identifier 1204. Additionally, at block 1512, the content tagger 1206 identifies dates associated with the entry and/or calculates a relevance score for each of the identified topics. At block 1514, the record creator 1208 creates an entry record 1200 for the entry 1210 including the content database provider 108, the identified topics, the identified dates, the URI, and identifying metadata. At block 1516, the record creator 1208 stores the entry record 1200 in the ARP database 112.

The flowchart of FIG. 15 is representative of machine readable instructions stored in memory (such as the memory 2504 of FIG. 25 below) that comprise one or more programs that, when executed by a processor (such as the processor 2502 of FIG. 25 below), cause the ARPE 100 to implement the example query responder 120 of FIGS. 1 and 13. Further, although the example program(s) is/are described with reference to the flowchart illustrated in FIG. 15, many other methods of implementing the example query responder 120 may alternatively be used. For example, the order of execution of the blocks may be changed, and/or some of the blocks described may be changed, eliminated, or combined.

Figure 16:
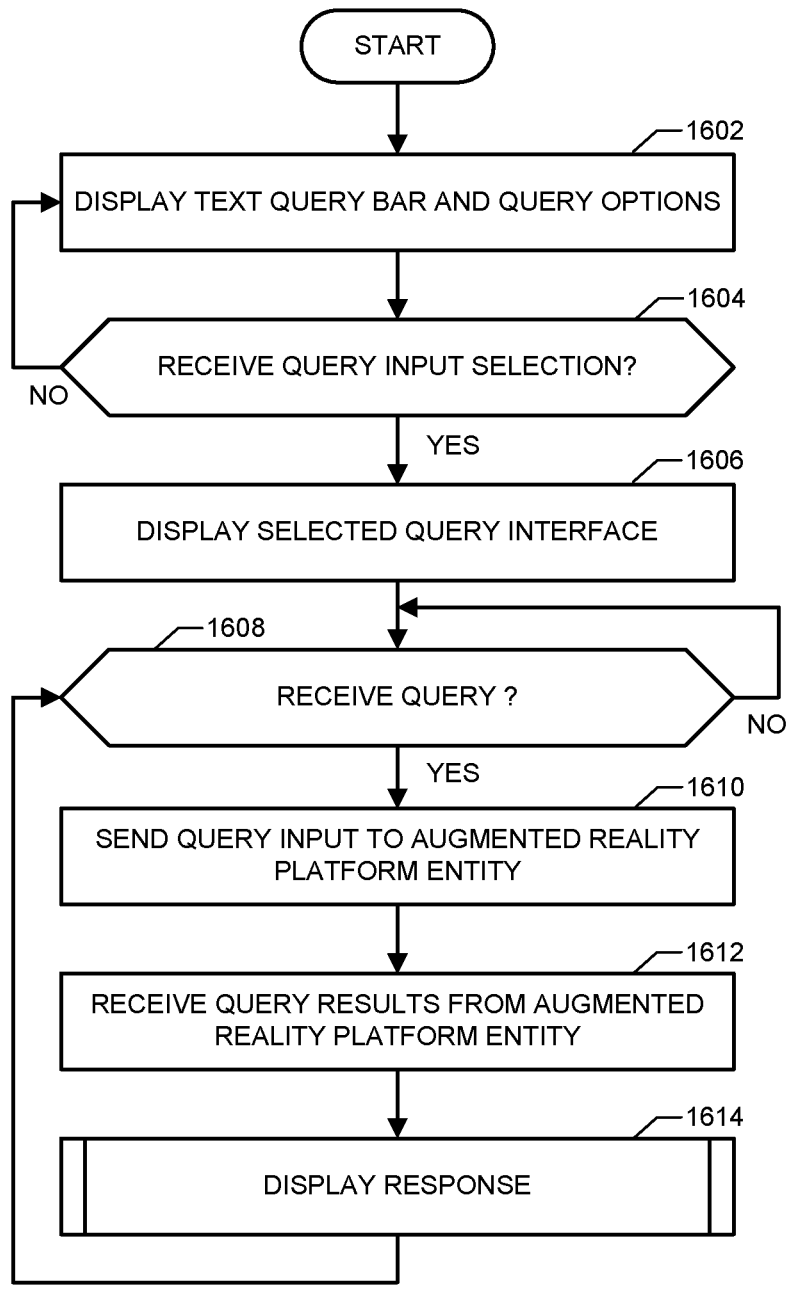
FIG. 16 is a flowchart of a method to generate the queries and present the query results, which may be implemented by the electronic components of FIG. 26.
Figure 26:
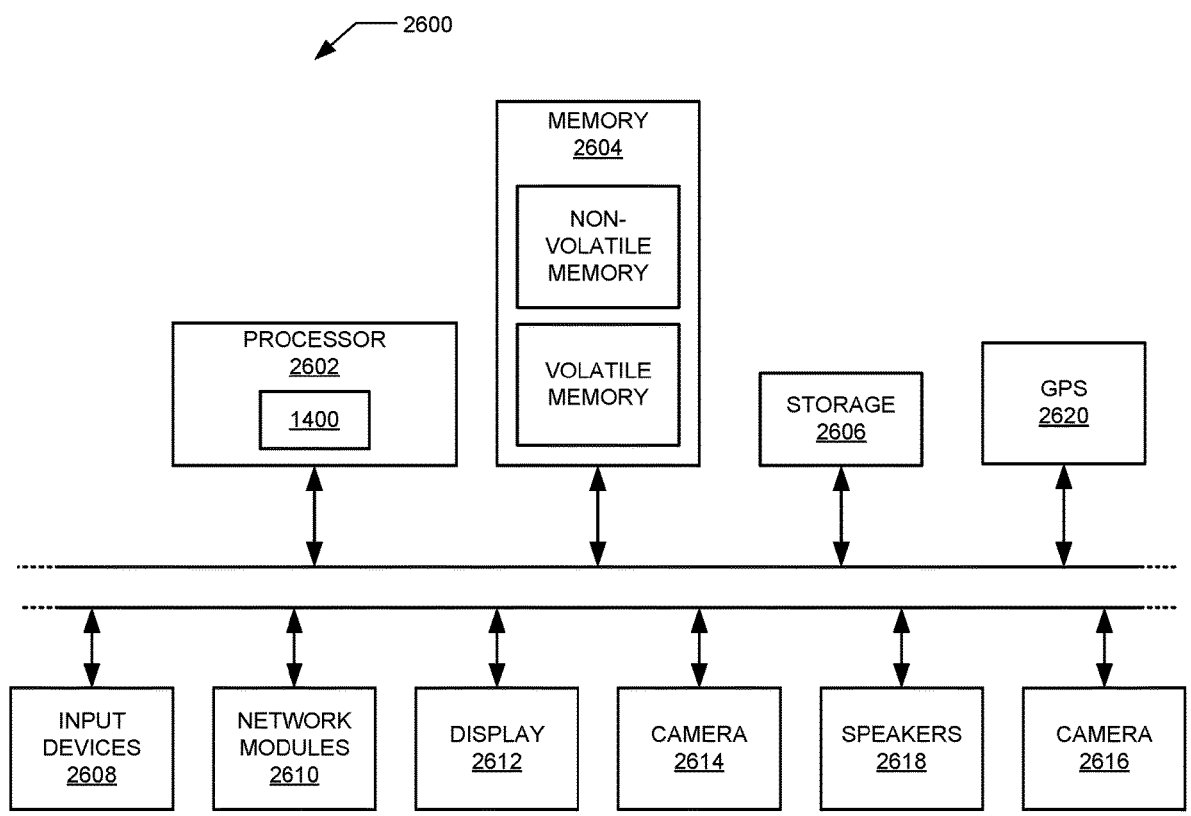
FIG. 26 is a block diagram of electronic components that may implement the methods of FIGS. 16-22, and 24.

FIG. 16 is a flowchart of a method to generate the queries 104 and present the query results 102, which may be implemented by the electronic components of FIG. 26. Initially, at block 1602, the query selector 1402 displays a text query bar and query options via the home interface 506. At block 1604, the query selector waits until a type of query has been selected. At block 1606, the query selector 1402 displays the selected interface (e.g., one of the interfaces 516-522). At block 1608, the query selector 1402 waits until the user enters (e.g., enters text into a text box, selects an identified object on map geometry data, selects a point of interest on a map, selects an object identified in a live image, etc.). At block 1610, the query formatter 1404 generates the query 104 and sends the query 104 to the ARPE 100. At block 1612, the result presenter 1406 receives query results 102 from the ARPE 100. At block 1614, the result presenter 1406 displays the query results 102. Example methods to display the query results are disclosed in FIGS. 18-22 below.

Figure 17:
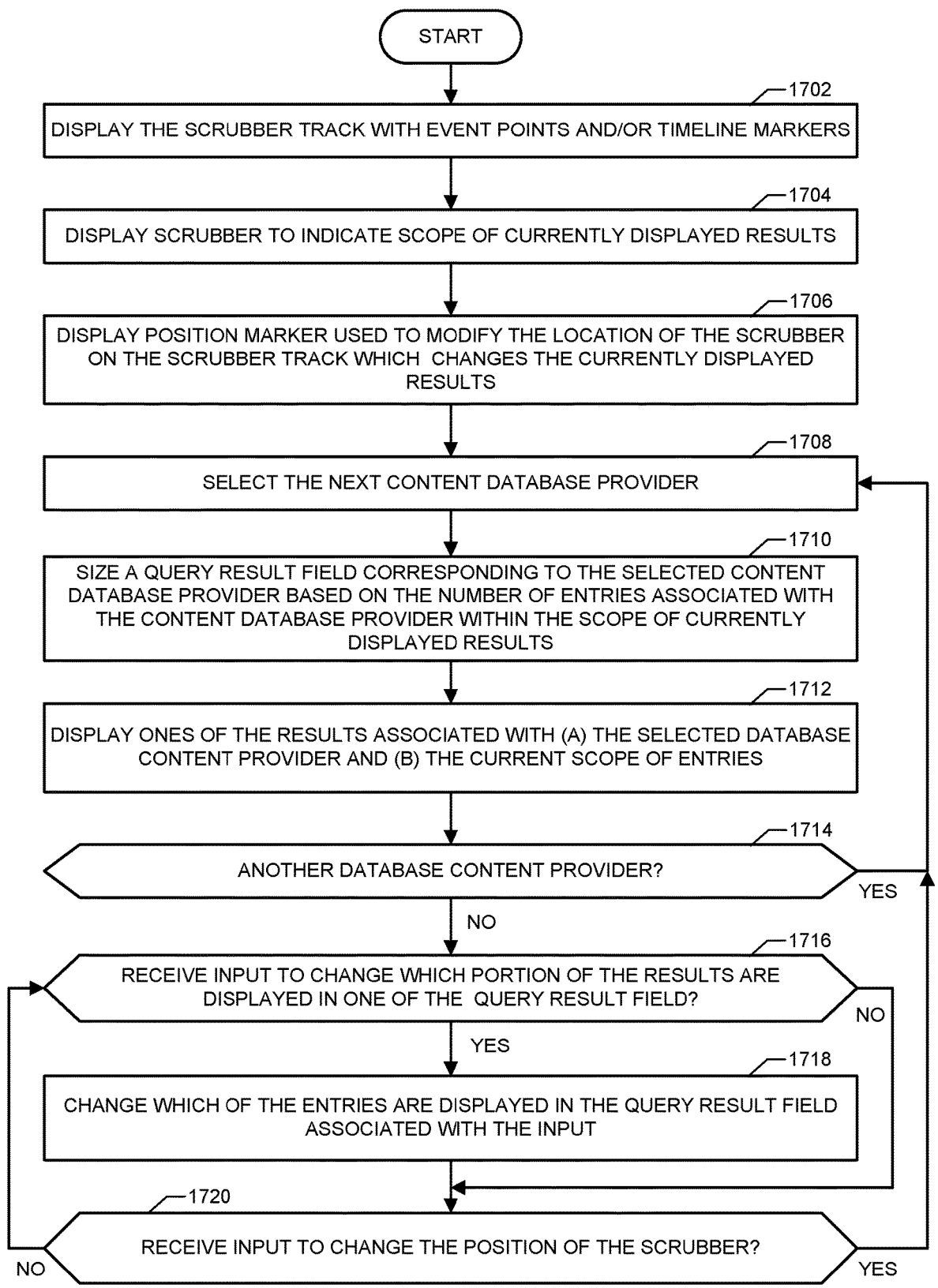
FIG. 17 is a flowchart of a method to present the query results, which may be implemented by the electronic components of FIG. 26.

FIG. 17 is a flowchart of a method to present the query results 102, which may be implemented by the electronic components of FIG. 26. Initially, at block 1702, the result presenter 1406 displays the scrubber track 606 with event points 608 and/or timeline markers 610. The location of the event points 608 along the scrubber track 606 are based on dates associated with the query results 102. For example, the event points 608 may represent a number (e.g., five, ten, twenty, etc.) of the most reoccurring dates within the query results 102. For example, if the query results 102 are based on the topic "the battle of Gettysburg," a first event point 608 may represent 7/1/1863, a second event point 608 may represent 7/2/1863, a third event point 608 may represent 7/3/1863, and a fourth event point 608 may represent 10/19/1863. In some examples, the result presenter 1406 displays the timeline markers 610 based on the earliest date and the latest date associated with the query results 102. In some such example, the timeline markers 610 are displayed linearly. Alternatively, in some examples, the timeline markers 610 are di splayed logarithmically.

At block 1704, the result presenter 1406 displays the scrubber 612 to indicate scope of currently displayed results. For example, if twenty percent of the results from the query results 102 are displayed, then the scrubber 612 may occupy twenty percent of the length of the scrubber track 606. At block 1706, the result presenter 1406 displays the position marker 614 used to modify the location of the scrubber 612 on the scrubber track 606 which changes of currently displayed results.

At block 1708, the result presenter 1406 selects the next content database provider 108 (as identified by the CDP ID filed 204) identified in the query results 102. At block 1710, the result presenter 1406 sizes the query result field 604 corresponding to the selected content database provider 108 based on the number of entries associated with the content database provider 108 within the scope of currently displayed results (as selected via the scrubber 612). At block 1712, the result presenter 1406 displays the entries within the corresponding query result field 604 associated with (a) the selected content database provider 108 and (b) the current scope as indicated by the scrubber 612. At block 1714, the result presenter 1406 determines whether there is another content database provider 108 to display within the query results 102. If there is another content database provider 108 to display, the method returns to block 1708. Otherwise, if there is not another content database provider 108 to display, the method continues to block 1716.

At block 1716, the result presenter 1406 determines whether it received input to change which portion of the results are displayed in one of the category boxes. For example, the end-user device 106 with a touch screen may receive a vertical swiping motion within an area of one of the query result fields 604. If input is received, the method continues to block 1718. Otherwise, if the input is not received, the method continues to block 1720. At block 1718, the result presenter 1406 changes which of the entries are displayed in the query result field 604 associated with the input. At block 1720, the result presenter 1406 determines whether it received input to change the position of the scrubber 612. If the input is received, the method returns to block 1708. Otherwise, if the input is not receivers, the method returns to block 1716.

Figure 18:
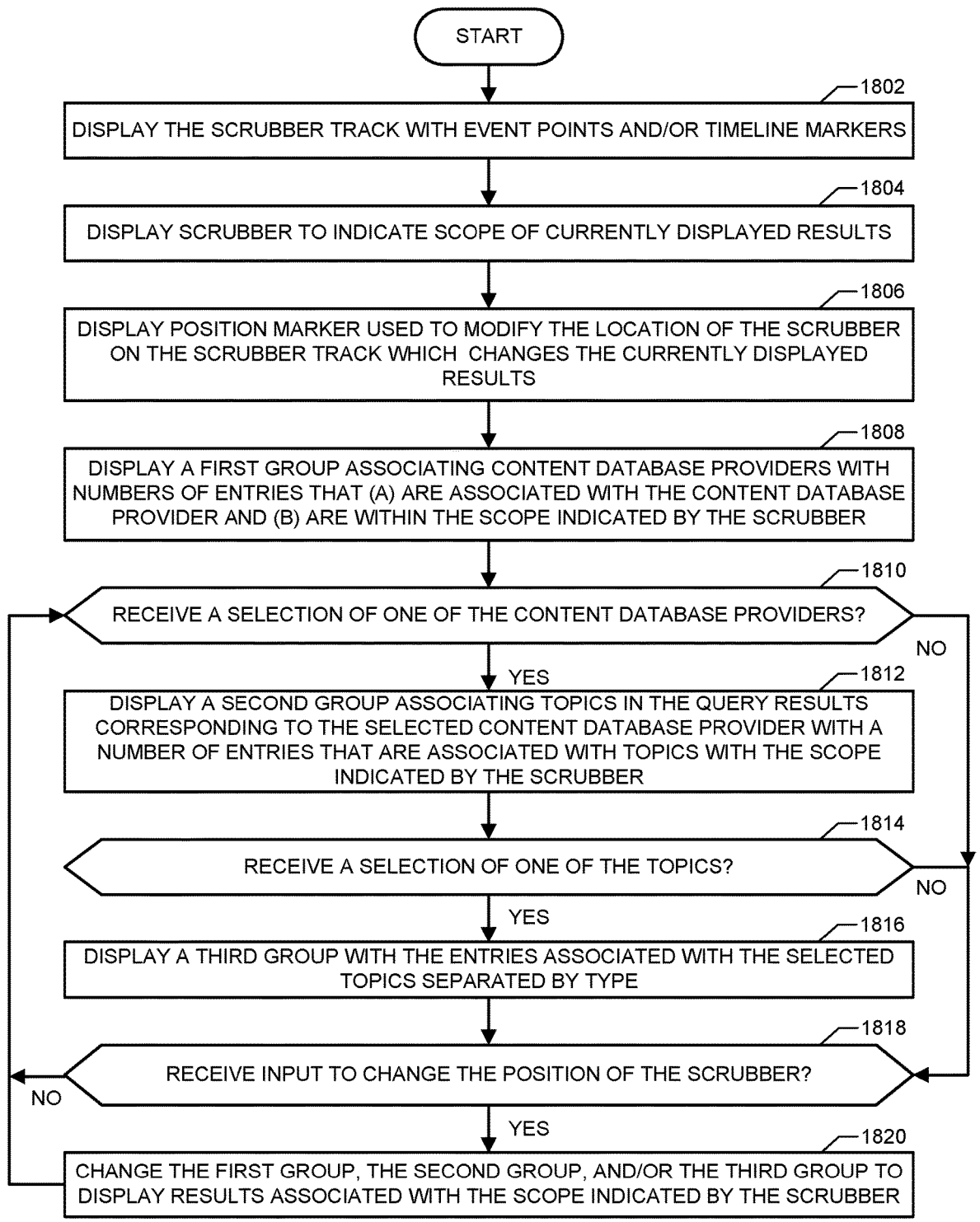
FIG. 18 is a flowchart of a method to present the query results, which may be implemented by the electronic components of FIG. 26.

FIG. 18 is a flowchart of a method to present the query results 102, which may be implemented by the electronic components of FIG. 26. Initially, at block 1802, the result presenter 1406 displays the scrubber track 606 with event points 608 and/or timeline markers 610. The location of the event points 608 along the scrubber track 606 are based on dates associated with the query results 102. In some examples, the result presenter 1406 displays the timeline markers 610 based on the earliest date and the latest date associated with the query results 102. In some such example, the timeline markers 610 are displayed linearly. Alternatively, in some examples, the timeline markers 610 are displayed logarithmically.

At block 1804, the result presenter 1406 displays the scrubber 612 to indicate scope of currently displayed results. For example, if twenty percent of the results from the query results 102 are displayed, then the scrubber 612 may occupy twenty percent of the length of the scrubber track 606. At block 1806, the result presenter 1406 displays the position marker 614 used to modify the location of the scrubber 612 on the scrubber track 606 which changes of currently displayed results.

At block 1808, the result presenter 1406 displays, in the first hierarchy element 702, a first group associating content database providers 108 with numbers of entries that (a) are associated with the content database provider 108 and (b) are within the scope indicated by the scrubber 612. At block 1810, the result presenter 1406 determines whether it has received a selection of one of the content database provider 108. If a selection has been received, the method continues at block 1812. Otherwise, if a selection has not been received, the method continues at block 1818. At block 1812, the result presenter 1406 displays, in the second hierarchy element 704, a second group associating topics in the query results 102 corresponding to the selected content database provider 108 with a number of entries that are associated with topics with the scope indicated by the scrubber 612. At block 1814, the result presenter 1406 determines whether it has received a selection of one of the topics in the second hierarchy element 704. If a selection has been received, the method continues at block 1816. Otherwise, if a selection has not been received, the method continues at block 1818. At block 1816, the result presenter 1406, in the third hierarchy element 706, displays a third group with the entries associated with the selected topic separated by type (e.g., articles, maps, images, videos, augmented reality experiences, map geometry data, etc.).

At block 1818, the result presenter 1406 determines whether the input has been received to change the position of the scrubber 612. If input has been received, the method continues to block 1820. Otherwise, if input has not been received, the method returns to block 1810. At block 1820, the result presenter 1406 changes the first group displaying the content database providers 108 in the first hierarchy element 702, the second group displaying the topics in the second hierarchy element 704, and/or the third group displaying the entries in the third hierarchy field 706 to display results associated with the scope indicated by the scrubber 612.

Figure 19:
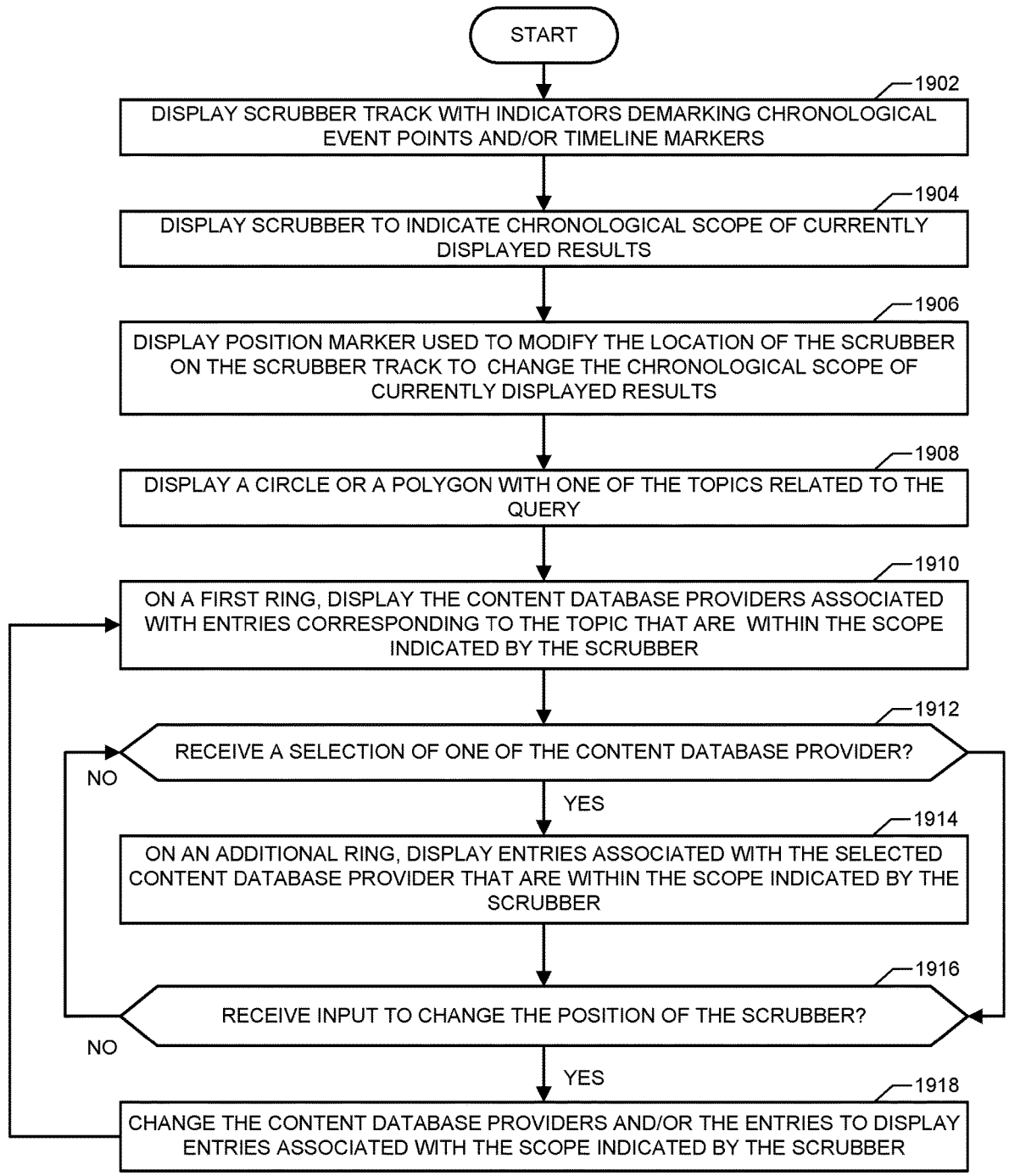
FIG. 19 is a flowchart of a method to present the query results, which may be implemented by the electronic components of FIG. 26.

FIG. 19 is a flowchart of a method to present the query results 102, which may be implemented by the electronic components of FIG. 26. Initially, at block 1902, the result presenter 1406 displays the scrubber track 606 with event points 608 and/or timeline markers 610. The location of the event points 608 along the scrubber track 606 are based on dates associated with the query results 102. In some examples, the result presenter 1406 displays the timeline markers 610 based on the earliest date and the latest date associated with the query results 102. In some such example, the timeline markers 610 are displayed linearly. Alternatively, in some examples, the timeline markers 610 are displayed logarithmically.

At block 1904, the result presenter 1406 displays the scrubber 612 to indicate scope of currently displayed results. For example, if twenty percent of the results from the query results 102 are displayed, then the scrubber 612 may occupy twenty percent of the length of the scrubber track 606. At block 1906, the result presenter 1406 displays the position marker 614 used to modify the location of the scrubber 612 on the scrubber track 606 which changes of currently displayed results.

At block 1908, the result presenter 1406 displays, the first hierarchy element 702 shaped as a circle or polygon, one of the topics related to the query 104. In some examples, the result presenter 1406 displays multiple first hierarchy elements 702, which may be moveable, resizable and/or hidable, etc., for the different ones of the topics related to the query 104. For example, if the query 104 is "The Rookery Building," a first one of the first hierarchy elements 702 may be associated with "The Rookery Building" and a second one of the first hierarchy elements 702 may be associated with "Daniel Burnham."

At block 1910, the result presenter 1406 displays, on the second hierarchy element 704 shaped as a first ring around the first hierarchy element 702, the content database providers 108 associated with entries corresponding to the topic that are within the scope indicated by the scrubber 612. At block 1912, the result presenter 1406 determines whether a selection of one content database providers 108 has been received. If a selection has been received, the method continues to block 1914. Otherwise, if a selection has not been received, the method continues to block 1916.

At block 1914, the result presenter 1406 displays, on the third hierarchy element 706 shaped as a first ring around the second hierarchy element 704, display entries associated with the selected content database provider 108 that are within the scope indicated by the scrubber 612. At block 1916, the result presenter 1406 determines whether the input has been received to change the position of the scrubber 612. If input has been received, the method continues to block 1918. Otherwise, if input has not been received, the method returns to block 1912. At block 1918, the result presenter 1406 changes the content database providers 108 in the second hierarchy element 704 and/or the entries in the third hierarchy element 706 to display entries associated with the scope indicated by the scrubber 612.

Figure 20:
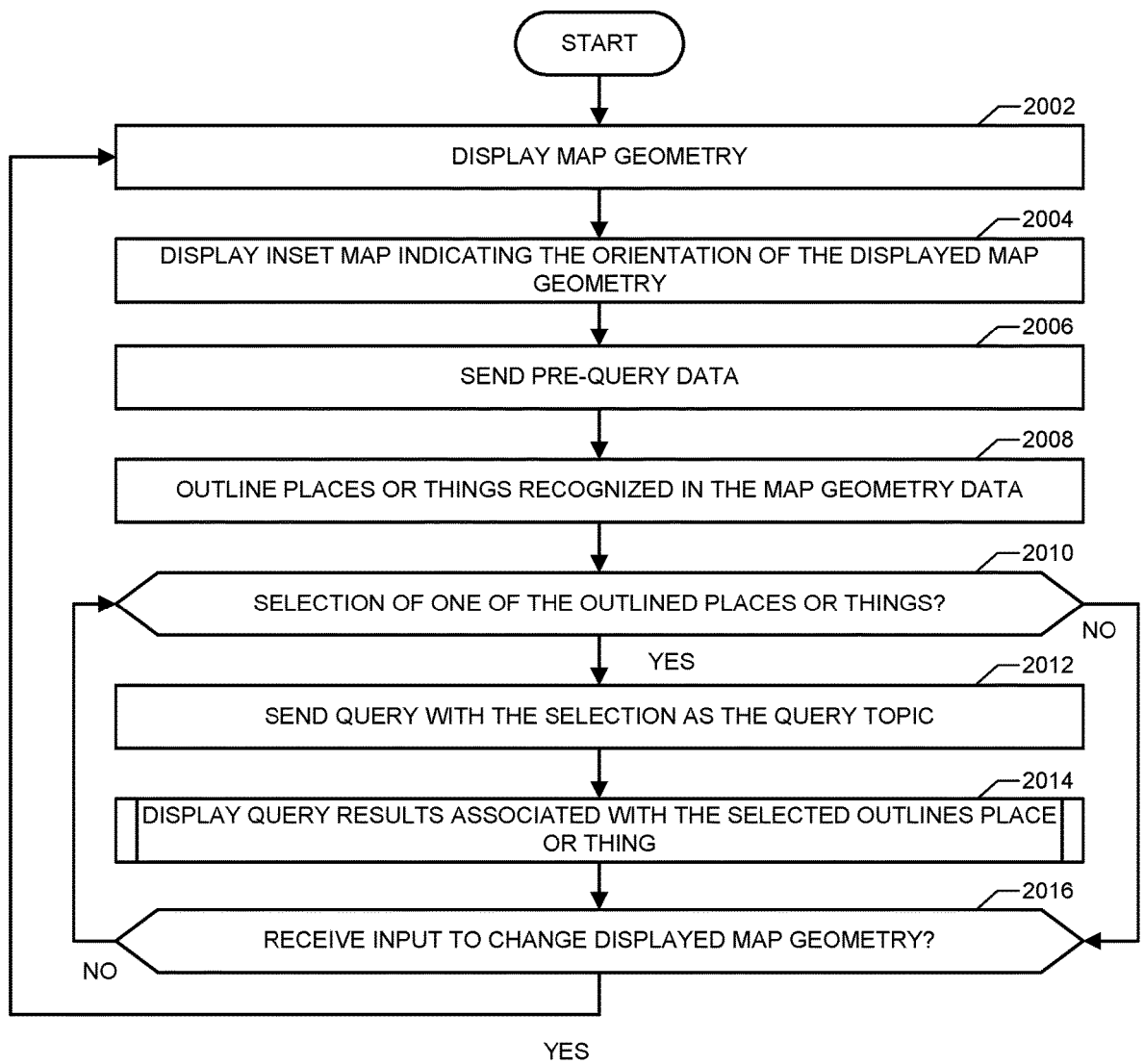
FIG. 20 is a flowchart of a method to present the query results in conjunction with map geometry data, which may be implemented by the electronic components of FIG. 26.

FIG. 20 is a flowchart of a method to present the query results 102 in conjunction with map geometry data, which may be implemented by the electronic components of FIG. 26. Initially, at block 2002, the query selector 1402 displays the map geometry. The map geometry includes images that may be planned to illustrate a geographical location as if the user of the end-user device 106 was at that location. At block 2004, the query selector 1402 displays an inset map 902 indicating the orientation of the displayed map geometry. At block 2006, the query formatter 1404 sends pre-query data 1408 to the ARPE 100. In some examples, the pre-query data 1408 includes an image being displayed, coordinates from which the map geometry data was captured, and the angle at which the map geometry data is being viewed. At block 2008, the query selector 1402 outlines places or things in the displayed at block 2002 recognized in the map geometry data. At block 2010, the query selector 1402 determines whether it has received a selection of one of the places or things outlines at block 2008. If a selection has been received, the method continues at block 2012. Otherwise, if a selection has not been received, the method continues at block 2016.

At block 2012, the query formatter 1404 sends the query 104 to the ARPE 100 with the selected place or thing in the query data field 306. At block 2014, the result presenter 1406 displays the query results 102 received from the ARPE 100. Examples methods of displaying the query results 102 are disclosed in FIGS. 17, 18, and 19 above. At block 2016, the query selector 1402 determines whether it has received input to change the displayed map geometry data. If the input to change the displayed map geometry data has been received, the method returns to block 2002. Otherwise, if the input to change the displayed map geometry data has not been received, the method returns to block 2010.

Figure 21:
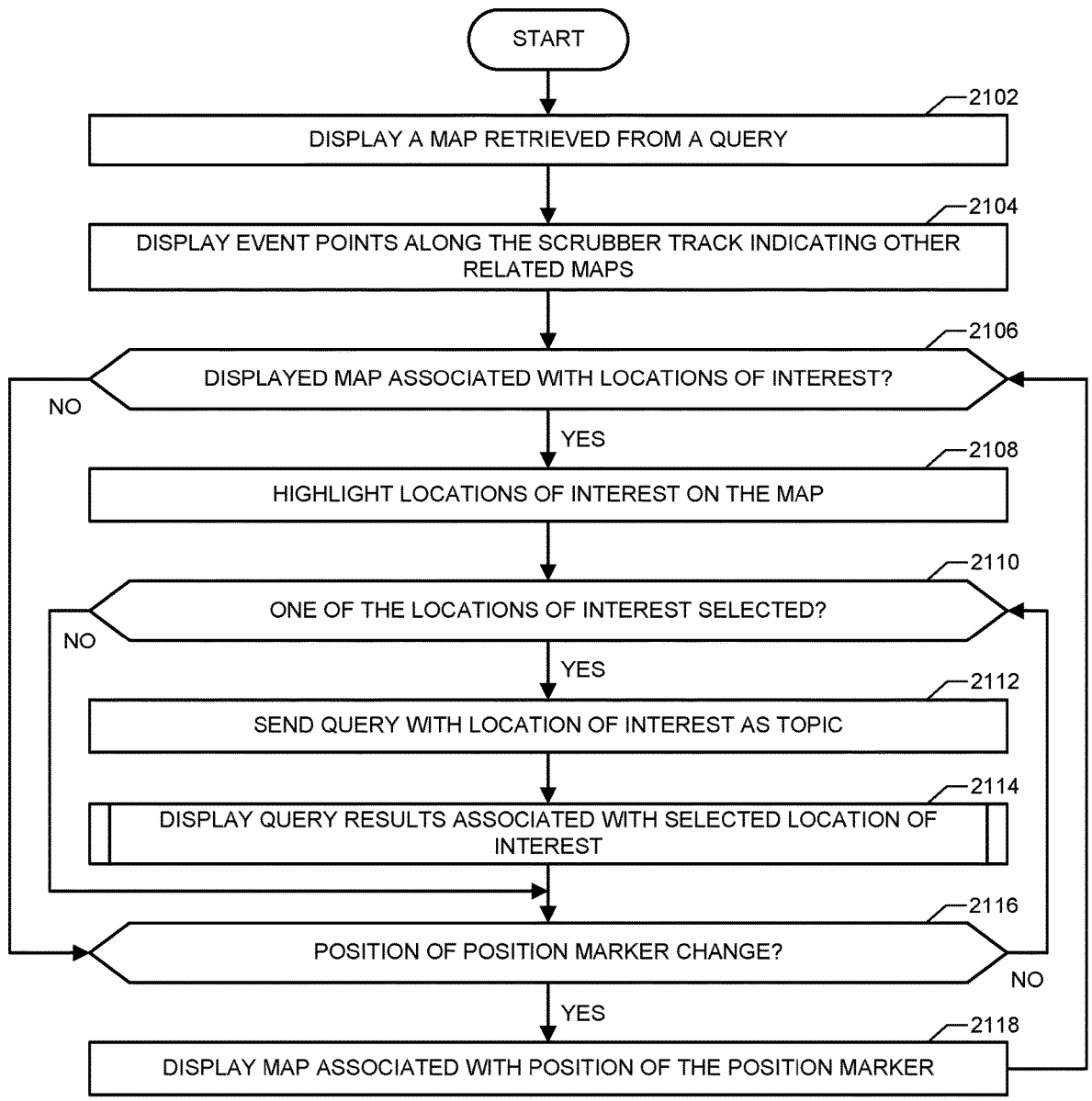
FIG. 21 a flowchart of a method to present the query results in conjunction with map data, which may be implemented by the electronic components of FIG. 26.

FIG. 21 a flowchart of a method to present the query results 102 in conjunction with map data, which may be implemented by the electronic components of FIG. 26. Initially, at block 2102, the query selector 1402 displays a map retrieved via a query 104. For example, one of the entries include in query results 102 may be a map 1000. At block 2104, the query selector 1402 displays event points 608 along the scrubber track 606 indicating other related maps. For example, if the displayed map 1000 is a map of Chicago from 1893, the query selector 1402 may display event points 608 along the scrubber track 606 indicating maps of Chicago associated with other dates. At block 2106, the query selector 1402 determines whether the displayed map 1000 is associated with locations of interest. In some examples, the information (e.g., boundaries on the map, related topics, etc.) about the locations of interest is included in the map data. If there are locations of interest associated with the displayed map 1000, the method continues at block 2108. Otherwise, if there are not locations of interest associated with the displayed map 1000, the method continues to block 2116.

At block 2108, the query selector 1402 highlights locations of interest on the map 1000 (e.g., the highlighted regions 1002 of FIG. 10). At block 2110, the query selector 1402 determines whether one of the locations of interest has been selected. If one of the locations of interest has been selected, the method continues at block 2112. Otherwise, if one of the locations of interest has not been selected, the method continues at block 2116. At block 2112, the query formatter 1404 sends a query 104 to the ARPE 100 with location of interest in the query data field 306. At block 2114, the result presenter 1406 displays the query results 102 received from the ARPE 100. Examples methods of displaying the query results 102 are disclosed in FIGS. 17, 18, and 19 above. At block 2116, the query selector 1402 determines whether the position of the position marker 614 changed. If the position of the position marker 614 changed, the method continues to block 2118. Otherwise, if the position of the position marker 614 did not change, the method returns to block 2110. At block 2118, the query selector 1402 displays a map 1000 associated with position of the position marker 614.

Figure 22:
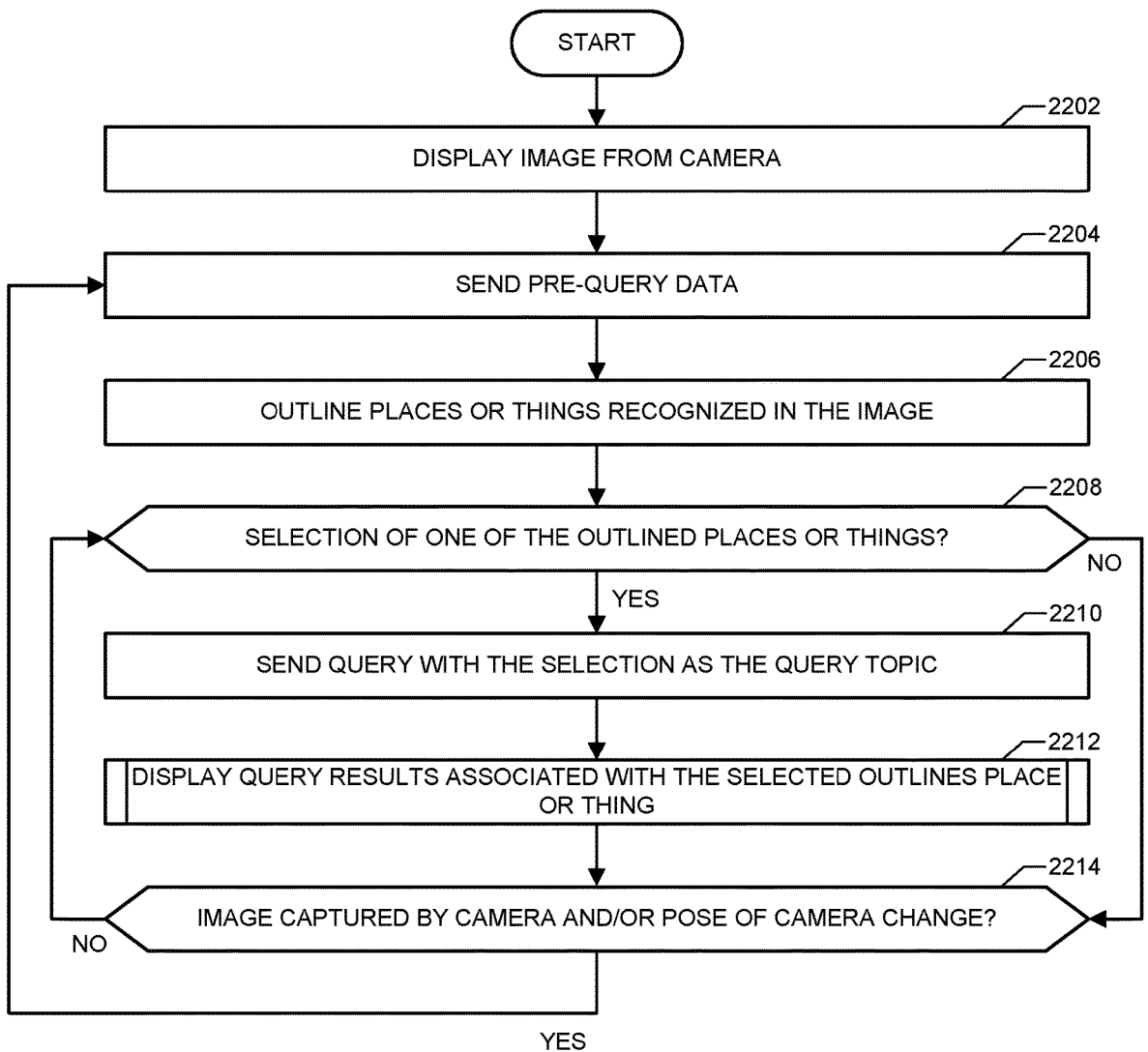
FIG. 22 a flowchart of a method to present the query results in conjunction with live image data from a camera, which may be implemented by the electronic components of FIG. 26.

FIG. 22 a flowchart of a method to present the query results 102 in conjunction with live image data from a camera (e.g., the camera 2614 and 2616 of FIG. 26 below), which may be implemented by the electronic components of FIG. 26. Initially, at block 2202, the query selector 1402 displays the image captured by the camera. At block 2204, the query formatter 1404 sends pre-query data 1408 to the ARPE 100. In some examples, the pre-query data includes the image captured by the camera, the coordinates of the end-user device 106, the orientation of the camera, and/or the field of view of the camera, etc. At block 2206, the query selector 1402 outlines places or things recognized in the image based on a pre-query response 1410 received from the ARPE 100. At block 2208, the query selector 1402 determines whether one of the outlined places or things has been selected. If one of the outlined places or things has been selected, the method continues at block 2210. Otherwise, if one of the outlined places or things has not been selected, the method continues at block 2214.

At block 2210, the query formatter 1404 sends a query 104 to the ARPE 100 with the selected place or thing in the query data field 306. At block 2212, the result presenter 1406 displays the query results 102 received from the ARPE 100. Examples methods of displaying the query results 102 are disclosed in FIGS. 17, 18, and 19 above. At block 2214, the query selector 1402 determines whether (a) the image captured by the camera has changed and/or (b) the pose (e.g., coordinates and orientation, etc.) of the camera has changed. If (a) the image captured by the camera has changed and/or (b) the pose of the camera has changed, the method returns to block 2204. Otherwise, if (a) the image captured by the camera has not changed and/or (b) the pose of the camera has not changed, the method returns to block 2208.

The flowcharts of FIGS. 16-22, and 24 are representative of machine readable instructions stored in memory (such as the memory 2604 of FIG. 26) that comprise one or more programs that, when executed by a processor (such as the processor 2602 of FIG. 26), cause the end-user device 106 to implement the example query generator 1400 of FIG. 14. Further, although the example program(s) is/are described with reference to the flowchart illustrated in FIGS. 16-22, and 24, many other methods of implementing the example query generator 1400 may alternatively be used. For example, the order of execution of the blocks may be changed, and/or some of the blocks described may be changed, eliminated, or combined.

Figure 23:
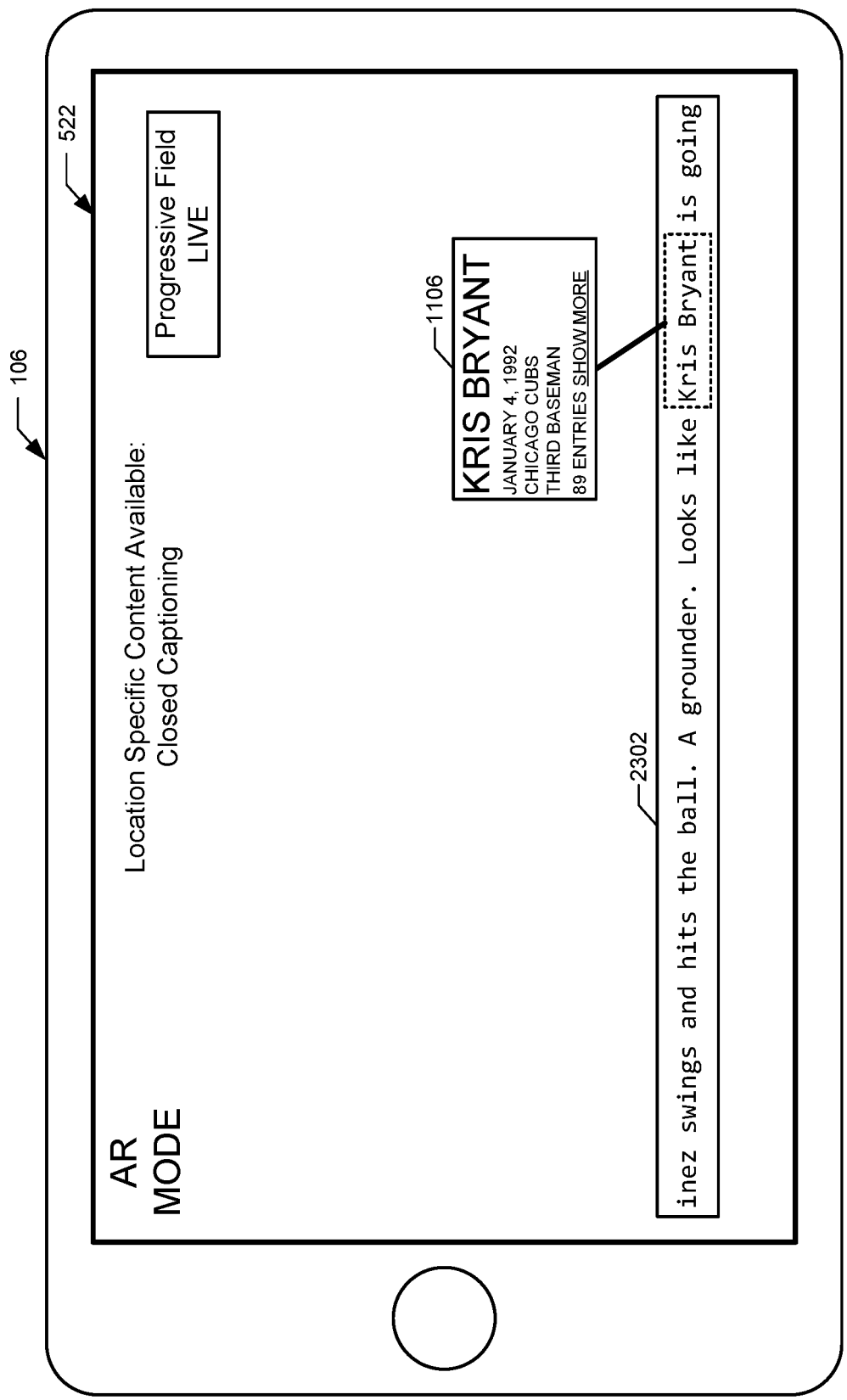
FIG. 23 illustrates the augmented reality interface of FIG. 11 providing location specific content superimposed on live images captured by the end-user device of FIG. 1.

FIG. 23 illustrates the augmented reality interface 522 of FIG. 11 providing location specific content 2302 superimposed on live images captured by the end-user device 106 of FIG. 1. The end-user device 106 provides its location to the ARPE 100 (e.g., via the pre-query data 1408). The ARPE 100 determines whether one of the content database providers 108 associated with a venue (e.g., a stadium, a theater, a museum, etc.) corresponding to the location of the end-user device 106 is providing location specific content 2302. The location specific content 2302 is content that is being generated in near real-time (e.g., there may be a delay between the creation of the content for processing and/or indexing, etc.) for users located at the venue. For example, the location specific content may be closed captioning of an announcer or a tour guide, etc. In some examples, the ARPE 100 provides the location specific content 2302 via the pre-query response 1410. In some such examples, as long as enabled, the ARP 100 continuously pushes the location specific content 2302 to the end-user device 106 via the pre-query response 1410. In such a manner, the venue may provide services to cater to the needs of users while facilitating the users viewing the event or exhibit uninterrupted.

If enabled, the location specific content 2302 is displayed by the augmented reality interface 522 by superimposing the location specific content 2302 on the image being captured by the camera(s) (e.g., the cameras 2614 and 2616 of FIG. 26 below) of the end-user device 106. In some examples, the location specific content 2302 is displayed on a specific highlighted and/or outlined object 1104. For example, the location specific content 2302 may be displayed so that it is visible on a scoreboard or jumbotron of a stadium. In the illustrated example, the ARPE 100 (e.g., via the database sorter 110) provides abbreviated query panels 1106 for topics detected within the location specific content 2302. When the user interacts with the abbreviated query panels 1106, the augmented reality query interface 522 generates and sends the query 104 regarding the corresponding topic to the ARPE 100.

In some examples, the ARPE 100 provides the location specific content 2302 to the end-user device 106 when the end-user device 106 is not located at the venue, but is viewing content (e.g., via a media application) that is generated at the venue. For example, a user may be viewing a baseball game via a media application on a smart TV. In such examples, the augmented reality interface 522 uses the media application as the input (e.g., instead of the images being captured by the camera(s) etc.) and superimposes the location specific content 2302 on the media application.

Figure 24:
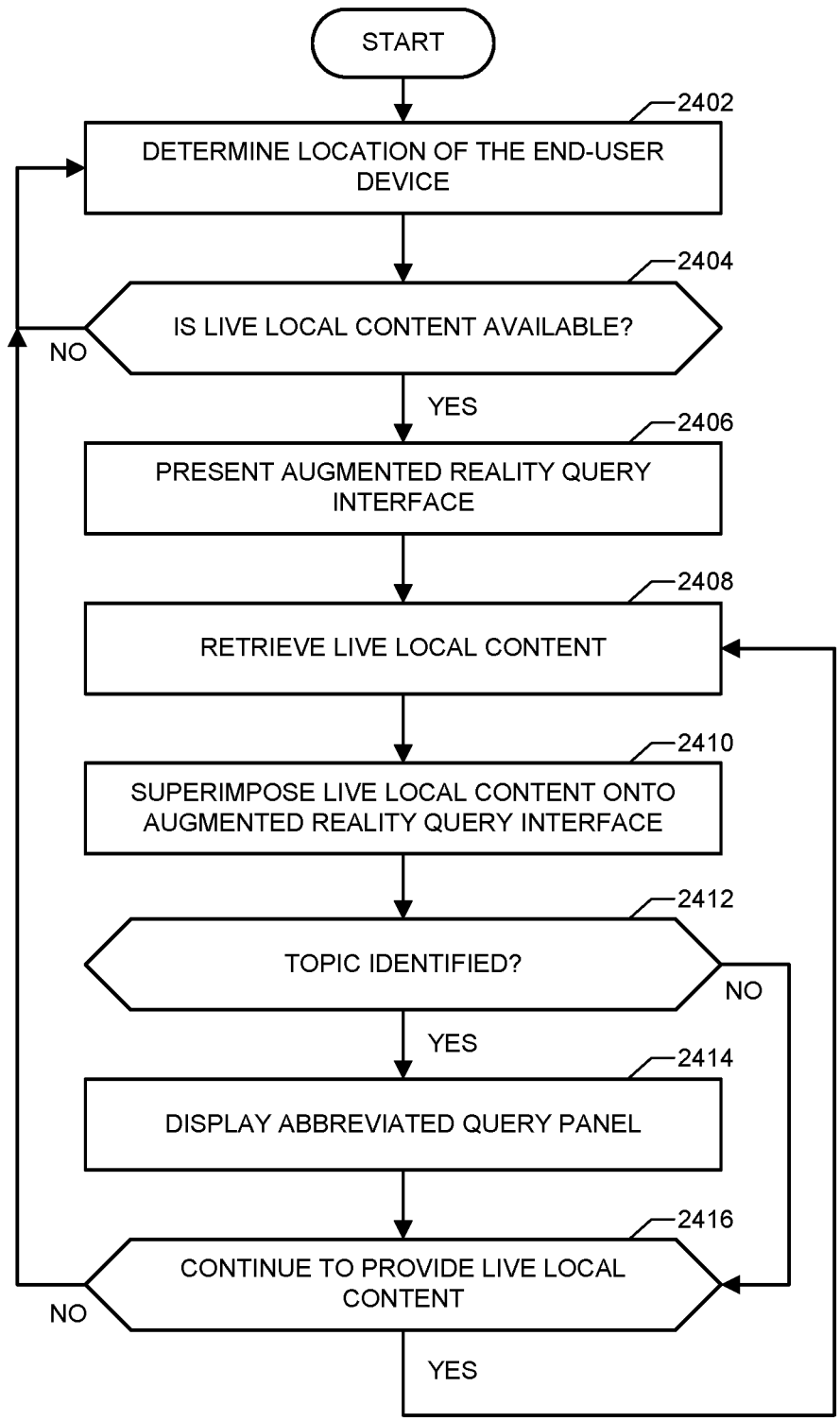
FIG. 24 is a flowchart of a method to detect and provide location specific content superimposed on live images captured by the end-user device of FIG. 1, which may be implemented by the electronic components of FIG. 26.

FIG. 24 is a flowchart of a method to detect and provide location specific content 2302 superimposed on live images captured by the end-user device 106 of FIG. 1, which may be implemented by the electronic components of FIG. 26.

Initially, at block 2402, the query formatter 1404 determines the location of the end-user device 106 (e.g., via the GPS receiver 2620 of FIG. 26 below). In some examples, the query formatter 1404 sends pre-query data 1408. At block 2404, the query formatter 1404 determines whether the location specific content 2302 is available. In some examples, the query formatter 1404 receives an indication of whether the location specific content 2302 is available in the pre-query response 1410. If the location specific content 2302 is available, the method continues to block 2406. Otherwise, is the location specific content 2302 is not available, the method returns to block 2402.

At block 2406, the result presenter 1406 presents the augmented reality interface 522 of FIG. 5 on the end-user device 106. At block 2408, the query formatter 1404 retrieves or otherwise receives the location specific content 2302. In some examples, the location specific content 2302 is included in the pre-query responses 1410. At block 2410, the result presenter 1406 superimposes the location specific content 2302 onto the image displayed by the end-user device 106. At block 2412, the result presenter 1406 determines whether a topic is identified in the location specific content 2302. If a topic is identified, the method continues at block 2414. Otherwise, if a topic is not identified, the method continues at block 2416.

At block 2414, the result presenter 1406 displays the abbreviated query panels 1106 in associated with the topic identified in the location specific content 2302. The information for the abbreviated query panels 1106 is included in the pre-query responses 1410. At block 2416, the query formatter 1404 determines whether there is more location specific content 2302. If there is more location specific content 2302, the method returns to block 2408. Otherwise, if there is not more location specific content 2302, the method returns to block 2402.

FIG. 25 is a block diagram of an example processor platform 2500 capable of executing the instructions to implement the method of FIG. 15. The processor platform 2500 can be, for example, a server, a personal computer, a workstation, one or more virtual machines and/or containers, or any other type of computing device. In the illustrated example, the processor platform 2500 includes a processor 2502, memory 2504, storage 2506, input devices 2508, output devices 2510, and network devices 2512.

The processor platform 2500 of the illustrated example includes the processor 2502. The processor or controller 2502 may be any suitable processing device or set of processing devices such as, but not limited to: a microprocessor, a controller-based platform with multiple processing cores, a suitable integrated circuit, one or more field programmable gate arrays (FPGAs), and/or one or more application-specific integrated circuits (ASICs). In the illustrated example, the processor 2502 is structured to include the example database sorter 110, the example user handler 114, the example session handler 118, and the example query responder 120.

The memory 2504 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and/or read-only memory. In some examples, the memory 2504 includes multiple kinds of memory, particularly volatile memory and non-volatile memory. The storage 2506 includes high-capacity storage devices, such as hard drives, tape drives, and/or solid state drives, etc. In the illustrated example, the storage 2506 includes the ARP database 112, the user database 116, the topic database 1212, the synonym database 1214, and/or the metadata database 1216. When used by the processor 2502, portions of the databases 112, 116, 1212, 1214, and 1216 may be move into the memory 2504, processed by the processor 2502, and then re-stored in the storage 2506.

The memory 2504 and storage are computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 2504, the storage 2506, and/or within the processor 2502 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals, to exclude transitory signals, and to exclude transmission media. As used herein, the term "non-transitory" refers to storing information on the computer readable medium for any duration (e.g., permanently, for long durations (e.g., minutes, days, etc.), for temporarily buffering and/or for caching, etc.).

The example input devices 2508 include any device that facilitates a user interacting with the processor platform 2500 to, for example, enter data and commands. The input devices 2508 include, for example, a microphone, a camera, a keyboard, a button, a mouse, a touch screen, a controller, a gesture recognition device, and/or a voice recognition system.

The example output devices 2510 include any device to facilitate communication of data and/or status to a user. Example output devices 2510 include instrument cluster outputs (e.g., dials, lighting devices), actuators, a heads-up display, a display (e.g., a liquid crystal display ("LCD"), an organic light emitting diode ("OLED") display, a flat panel display, a solid state display, etc.), and/or speakers.

The example network devices 2512 include any suitable communication device that facilitates communication with the end-user devices 106 over an external network. The external network(s) may be a public network, such as the Internet; a private network, such as an intranet; or combinations thereof, and may utilize a variety of networking protocols now available or later developed including, but not limited to, TCP/IP-based networking protocols.

FIG. 26 is a block diagram of electronic components 2600 of the end-user devices 106 that are capable of executing instructions to implement the method methods of FIGS. 16-22, and 24. The end-user devices 106 may include computers, smart phones, tablets, optical head-mounted displays, augmented reality smart glasses, and/or virtual reality headsets, etc. In the illustrated example, the electronic components 2600 include a processor 2602, memory 2604, storage 2606, input devices 2608, network modules 2610, a display 2612, a front-facing camera 2614, a back-facing camera 2616, speakers 2618, and/or a GPS receiver 2620. The end-user devices 106 may include other sensors (e.g., altimeter, magnetometer, accelerometer, LiDAR, RADAR, etc.) depending on the type of the end-user device 106.

The processor or controller 2602 may be any suitable processing device or set of processing devices such as, but not limited to: a microprocessor, a controller-based platform with multiple processing cores, a suitable integrated circuit, one or more field programmable gate arrays (FPGAs), and/or one or more application-specific integrated circuits (ASICs). In the illustrated example, the processor 2602 is structured to include the example query generator 1400.

The memory 2604 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and/or read-only memory. In some examples, the memory 2604 includes multiple kinds of memory, particularly volatile memory and non-volatile memory. The storage 2606 includes high-capacity storage devices, such as hard drives and/or solid state drives, etc. The memory 2604 and/or the storage 2606 may store information used by the ARPE 100 and the end-user device 106 to identify the user and maintain and/or establish a session.

The memory 2604 and storage are computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 2604, the storage 2606, and/or within the processor 2602 during execution of the instructions.

The input devices 2608 are any suitable devices to facilitate receiving input of queries 104, browse query results 102, and select of elements on the interfaces of FIGS. 6-11. The input devices 2608 include, for example, a microphone, the cameras 2614 and 2616, a keyboard, a button, a mouse, a touch screen, a controller, a gesture recognition device, a gaze detection device, and/or a voice recognition system.

The network modules 2610 include communication devices that facilitate wired or wireless communication to the ARPE 100 via the external network. The network modules 2610 may include communication controllers for mobile networks (e.g., Global System for Mobile Communications (GSM), Universal Mobile Telecommunications System (UMTS), Long Term Evolution (LTE), LTE Advanced, Code Division Multiple Access (CDMA), etc.), wireless networks (e.g., WiMAX (IEEE 802.16m); local area wireless network (including IEEE 802.11 a/b/g/n/ac or others) and/or Wireless Gigabit (IEEE 802.11ad), etc.), 5th generation (5G) wireless system, and/or wired networks (e.g., an Ethernet network, etc.).

The display 2612 is any suitable device to display the interfaces of FIGS. 6-11 to the user. The display 2612 may include a heads-up display, a monitor or screen display (e.g., a liquid crystal display ("LCD"), an organic light emitting diode ("OLED") display, a flat panel display, a solid state display, etc.), a virtual reality display (e.g., a monocular head mounted display or a binocular head mounted display), a waveguide display, a liquid crystal on silicon (LCOS), etc.

The cameras 2614 and 2616 capture still images and video. In the illustrated example, the electronic components 2600 include the front-facing camera 2614 and the back-facing camera 2616. The front-facing camera 2614 is positioned on the end-user device 106 on the same side as the display 2612 to capture images and video of, for example, the user. In some examples, the front-facing camera 2614 is used to track the location of the eyes of the user. The back-facing camera 2616 is positioned on the end-user device 106 on the opposite side as the display 2612. In some examples, the back-facing camera 2616 is used to track gestures of the users.

The GPS receiver 2620 provides the coordinates of the end-user device 106. In some examples, the GPS receiver 2620 includes an inertial navigation system. The GPS receiver 2620 may also include an accelerometer to determine the orientation of the end-user device 106. For example, the GPS receiver 2620 may provide the orientation of the end-user device relative to the direction the camera(s) 2414 and 2416 are pointing.

Figure 27:
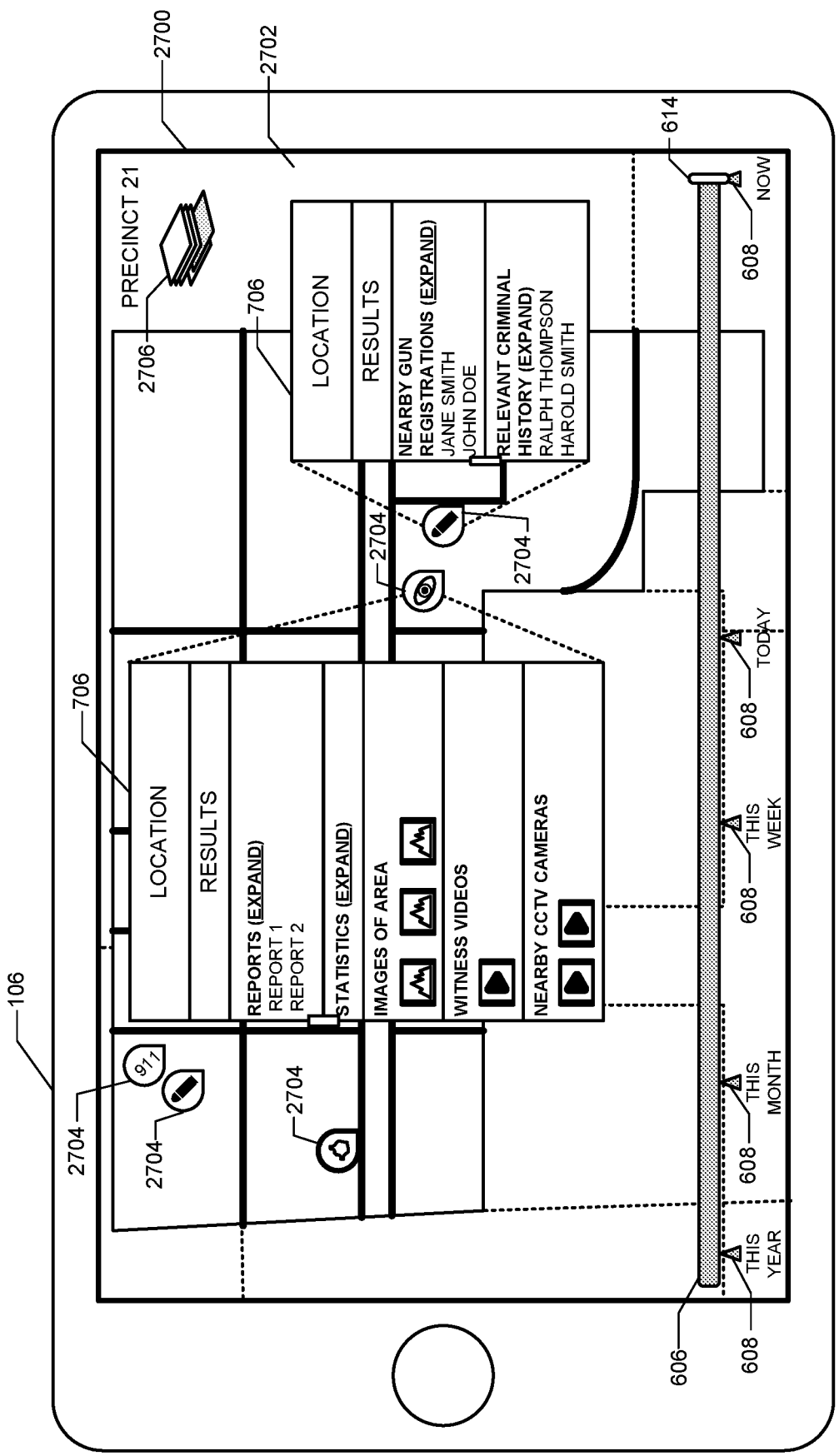
FIG. 27 depicts a law enforcement map interface presented by the end-user device of FIG. 1 to facilitate generating the query and presenting and interacting with the query results related to law enforcement and emergency services.

FIG. 27 depicts a law enforcement map interface 2700 presented by the end-user device 106 of FIG. 1 to facilitate generating the search query 104 and presenting and interacting with the query results 102 related to law enforcement and emergency services (e.g., federal, state, county and municipal law enforcement, fire departments, ambulance services, etc.). Additionally, in some examples, a law enforcement map interface 2700 facilitates generates event reports to be processed by the augmented reality platform entity (ARPE) 100 and entered into the augmented reality platform (ARP) database 112. In some such examples, a portion of the ARP database 112 used to populated the law enforcement map interface 2700 is segregated from the portion of the ARP database 112 used to populated other interfaces (e.g., the map interface 1000 of FIG. 10, etc.). In the illustrated example, the map query interface 520 displays a map 2702. The map may be selected via one of the result interfaces (e.g., interfaces 600, 700, and 800 of FIGS. 6, 7, and 8, above). The law enforcement map interface 2700 includes interactive indicia 2704 of events relating to law enforcement and/or emergency service activities. In the illustrated example, the law enforcement map interface 2700 also includes the scrubber track 606, the event points 608, and/or the position marker 614 to facilitate navigating though the events (e.g., as represented by the interactive indicia 2704) with different chronological time frames. The scrubber track 606, the event points 608, and/or the position marker 614 facilitate sorting and browsing the information chronologically in varying degrees of granularity. For example, the information may be browsed hourly, daily, monthly, and/or yearly, etc. The interactive indicia 2704 are chronologically sorted. Using the scrubber track 606, the event points 608, and/or the position marker 614, a user browses the interactive indicia 2704 chronologically. In such a manner, the user may reconstruct movements and/or visualize an order of events.

In some examples, the interactive indicia 2704 is displayed on the law enforcement map interface 2700 cumulatively by timestamp or discretely by timestamp. For example, when displayed cumulatively by timestamp, sliding the position marker 614 to a "TODAY" position may display all the interactive indicia 2704 that occurred that day and sliding the position marker 614 to a "THIS WEEK" position may display all the interactive indicia 2704 that occurred that week. As another example, when displayed discretely by timestamp, sliding the position marker 614 to a "now" position may only display the current interactive indicia 2704 and sliding the position marker 614 to a "10:00-10:00 AM" position may only display the interactive indicia 2704 that occurred from 10:00 AM to 10:10 AM.

The interactive indicia 2704 represent events of interest that become search query 104 when interacted with. For example, the interactive indicia 2704 may represent a person, place, or event relevant to law enforcement and/or emergency services activity. When a user interacts with (e.g., via a touch screen of the end-user device 106, etc.), the law enforcement map interface 2700 submits the search query 104 related to the interactive indicia 2704 to the ARPE 100. The law enforcement map interface 2700 provides the query results 102 in hierarchies (e.g., the hierarchies 702, 704, and 706 of FIG. 7 above) to facilitate the user interacting with the query results 102.

To process the search query 104, the ARPE 100 is communicatively coupled to content database providers 108 that are specialized in law enforcement and emergency service data. For example, the content database providers 108 may include gun registration databases, crime report databases, cell phone tracking databases, closed-circuit television (CCTV) video databases, license plate recognition (LPR) databases, vehicle registration databases, drivers license databases, shot identification databases (e.g., ShotSpotter® etc.), governmental alert databases (e.g., managed by the National Weather Service, etc.), police, fire, military, or other types of governmental report databases, body camera image databases, law databases, evidence databases, and/or personnel databases, etc. Additionally, in some examples, the ARPE 100 is communicatively coupled to live-updating data sources, such as real-time tip databases, emergency call databases (e.g., 911 calls, etc.), emergency alert databases (e.g., fire alerts, Amber alerts, etc.), vehicle and/or phone tracking databases, and/or police and/or emergency personnel dispatch databases, etc. Additionally, in some examples, the ARPE 100 is communicatively coupled to an emergency dispatch system to forward emergency alerts and/or eyewitness alerts when the alerts are received from the end-user devices 106.

In some examples, the interactive indicia 2704 represent moving objects, such as of police cars, cars, bicycles, individuals (e.g., via cell phone signal, etc.). This facilitates tracking objects of interest and/or knowing potential support resources before a user responds to an emergency call. Additionally or alternatively, in some examples, the interactive indicia 2704 represent crime reports. Additionally or alternatively, in some examples, the interactive indicia 2704 represent reports of gunshots. For example, using the position marker 614, an investigator may browse the history of a person, place, or event in connection with the interactive indicia 2704 representing a gunshot. As another example, by interacting with a particular interactive indicia 2704 representing a gunshot, a search query 104 is generated with a person, place and/or event connected with the gunshot as the query term(s). Additionally or alternatively, in some examples, the interactive indicia 2704 represent emergency calls (such as to 911, etc.) and emergency incidents (e.g., a fire, a traffic accident, etc.). For example, using the position marker 614, a user may chronologically browse persons, places, and/or events related to the emergency call or emergency incident related to the event represented by the interactive indicia 2704. Additionally or alternatively, in some examples, the interactive indicia 2704 represent license plate numbers of interest flagged in a database detected by a LPR reader. For example, using the position marker 614, a user may chronologically browse persons, places, and/or events related to the license plate represented by the interactive indicia 2704.

Additionally or alternatively, in some examples, the interactive indicia 2704 represent when body cameras equipped to law enforcement officers are turned off. For example, a precinct captain may used the law enforcement map interface 2700 to track the state of the body cameras equipped to police officers in the relevant precinct and navigate, using the position marker 614 to analyze, chronologically, places and events in connection with the state of the police officers' body cameras. Additionally or alternatively, in some examples, the interactive indicia 2704 represent social media posts regarding persons or events associated with a particular location. Additionally or alternatively, in some examples, the interactive indicia 2704 represent general alerts, such as road closures and protest locations, etc.

In some examples, when the ARPE 100 is communicatively coupled to a navigation and/or traffic database, the query result 102 includes directions to be displayed on the map 2702 to provide a safe and/or fast route to a destination (e.g., a location represented by the interactive indicia 2704).

In some examples, the law enforcement map interface 2700 facilitates a user generating, via the query generator 1400, report of accidents or emergencies. Additionally or alternatively, in some examples, via the law enforcement map interface 2700, the user provides crime tips (e.g., anonymously) and/or eye witness images and/or video. In some such examples, the GPS coordinates of the end-user device 106 and the current time are included in the report in order for the ARPE 100 to generate a corresponding interactive indicia 2704. In some examples, via the law enforcement map interface 2700, a user reports violations of municipal code (e.g., parking violations, etc.) in order for the ARPE 100 to generate a corresponding interactive indicia 2704. In some such examples, when the query generator 1400 generates the event to send to the ARPE 100, the query generator 1400 collects data from the input devices 2608 of the end-user device 106 to include in with the event report. For example, when the end-user device 106 includes a LiDAR or plenoptic camera, geometry, direction of camera, and/or viewing angle, etc. of the camera may be included in the event report.

In some examples, the law enforcement map interface 2700 includes an emergency mode that automatically generates emergency reports that include GPS coordinates and/or images and/or video from a camera of the end-user device 106. In such examples, the law enforcement map interface 2700 provides a notification when the emergency report is acknowledged by the recipient. Additionally or alternatively, in some examples, the law enforcement map interface 2700 provides an interface to live stream video and/or audio from the end-user device 106 that may be indexed so that other users can view/listen to the stream via interacting with a corresponding interactive indicia 2704.

In some examples, via the law enforcement map interface 2700, specific interactive indicia 2704 are creatable to assign specific law enforcement personnel, vehicles, support personnel and/or equipment to a location and/or event represented by another interactive indicia 2704.

In some examples, the ARPE 100 tracks the location of the end-user device 106 and provides an alert to the end-user device 106 when the end-user device 106 leaves a defined area (such as a precinct or a patrol route, etc.).

In some examples, via the law enforcement map interface 2700, using the input devices 2608 of the end-user device 106, the user provides data (e.g., dates, locations, events, persons, etc.) regarding evidence to be uploaded to the ARPE 100 and indexed into the ARP database 112.

In some examples, the law enforcement map interface 2700 facilitates using the input devices 2608 of the end-user device 106 to scan and verify an officer's ID (such as a badge with a badge number) to verify the identity of the officer.

In some examples, the law enforcement map interface 2700 is organized into layers. Each layer is associated with different types or groups of types of the interactive indicia 2704. For example, a first layer may be associated with interactive indicia 2704 representative of gunshots and a second layer may be associated with interactive indicia 2704 representative of 911 calls. In such examples, the law enforcement map interface 2700 includes a layer navigation interface 2706 to facilitate choosing which layer, and thus which interactive indicia 2704 are displayed on the law enforcement map interface 2700. In some such examples, multiple layers are selectable to display multiple types of interactive indicia 2704 on the law enforcement map interface 2700.

Figure 28:
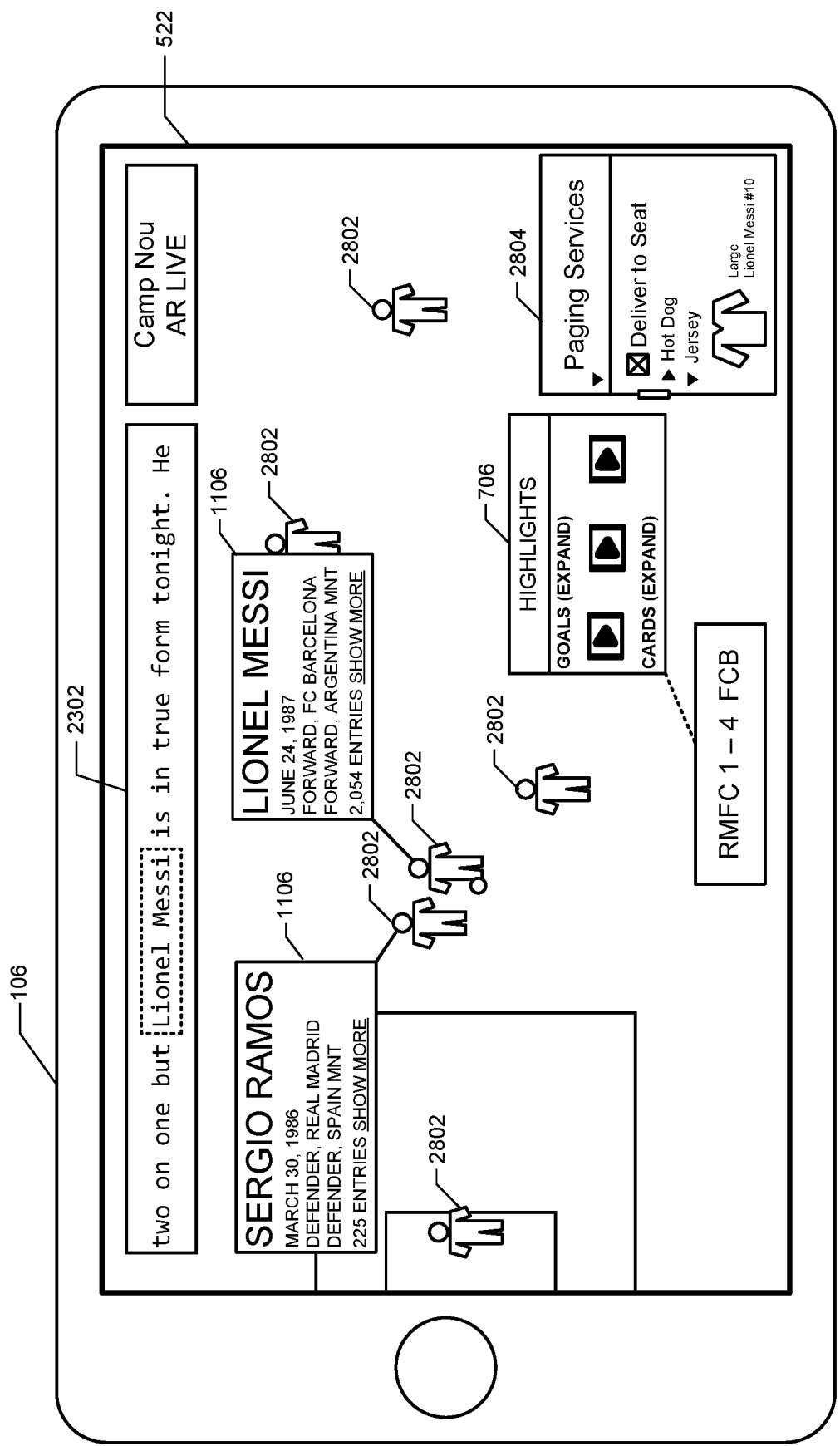
FIG. 28 illustrates the augmented reality interface of FIG. 11 providing location specific sporting event content superimposed on live images captured by the end-user device of FIG. 1.

FIG. 28 illustrates the augmented reality interface 1102 of FIG. 11 providing location specific sporting event content superimposed on live images captured by the end-user device 106 of FIG. 1. The end-user device 106 provides its location to the ARPE 100 (e.g., via the pre-query data 1408). The ARPE 100 determines whether one of the content database providers 108 associated with a stadium corresponding to the location of the end-user device 106 is providing location specific content 2302. The location specific content 2302 is content that is being generated in near real-time (e.g., there may be a delay between the creation of the content for processing and/or indexing, etc.) for users located at the venue. For example, the location specific content may be closed captioning of an announcer and/or athlete tracking data used to track the position of specific athletes 2802 on the field/court/pitch. In some examples, the ARPE 100 provides the location specific content 2302 via the pre-query response 1410. In some such examples, as long as enabled, the ARP 100 continuously pushes the location specific content 2302 to the end-user device 106 via the pre-query response 1410.

If enabled, the location specific content 2302 is displayed by the augmented reality query interface 522 by superimposing the location specific content 2302 on the image being captured by the camera(s) (e.g., the cameras 2614 and 2616 of FIG. 26 above) of the end-user device 106. In some examples, the location specific content 2302 is displayed on a specific highlighted and/or outlined object 1104. In the illustrated example, the location specific content 2302 includes closed captioning of announcements and/or commentary regarding the sporting event. Additionally, in the illustrated example, the augmented reality interface 1102 provides tracking of specific athletes 2802 and, upon interaction with one of the athletes 2802 via, for example, a touch screen of the end-user device 106, displays the abbreviated query panel 1106 for topics associated with that athlete 2802. To facilitate aligning the athlete tracking data with the location of the athlete on the screen of the end-user device 106, the end-user device provide camera field of view and orientation data to the ARPE 100. When the user interacts with the abbreviated query panels 1106, the augmented reality query interface 522 generates and sends the search query 104 regarding the corresponding topic to the ARPE 100.

In some example, the location specific content 2302 includes videos, images, and/or audio that is accessible to the user while the end-user device 106 is with a region defined by a geofence (e.g., with a radius of the stadium, etc.). This content may be timed and/or curated to provide relevant information to the user while the sporting event is not currently active (e.g., during pre-game and/or half-time, etc.). In some examples, this content is pushed to the end-user device 106 when such a feature is enabled.

In some examples, the augmented reality interface 1102 superimposes other information, such as the score, on the images captures by the cameras. In some such examples, the superimposed information becomes a search query 104 when the user interacts with the information. In some such examples, the query results 102 are presented in hierarchies (e.g., the hierarchies 702, 704, and 706 of FIG. 7 above) to facilitate the user interacting with the query results 102.

In some examples, the augmented reality interface 1102 provides directions to and from a venue superimposed on the images captures by the cameras. Additionally, in some examples, the augmented reality interface 1102 provides directions to a user's seat within the stadium and/or to various concession stands within the stadium.

In some examples, the augmented reality interface 1102 may superimpose user generated content onto the images captured by the camera based on a geotag in the content. For example, when a user in the stadium posts a public social media post that is tagged with coordinates within the stadium, the augmented reality interface 1102 displays the social media post proximate those coordinates.

In some examples, the augmented reality interface 1102 provides a catalogue 2804 of items or services available at the stadium. Using the seat assignment and/or GPS coordinates, the ARPE 100 associates orders and/or requests made via the catalogue 2804 to the location of the end-user device 106. In such a manner, the items and/or services ordered through the catalogue 2804 may be delivered to the user. Additionally or alternatively, through the augmented reality interface 1102, the user alerts the venue to an emergency and includes GPS coordinates, seat assignment, and/or data captured by the input devices 2608 of the end-user device 106 (e.g., video, images, audio, etc.). In some such examples, the ARPE 100 transforms the alert into an interactive indicia 2704 on a law enforcement map interface 2700 used by emergency responders at the venue.

In some examples, the ARPE 100 is communicatively coupled to a content database provider 108 that provides real estate information (e.g., purchase history, county recorder's history, crime statistics, relevant news pertaining to the location, shopping opportunities. school district, etc.). In some examples, the ARPE 100 is communicatively coupled to a content database provider 108 that provides ancestry information that associates locations (e.g., immigration locations, birth locations, death locations, grave locations, marriage locations, etc.) with people and dates. Additionally, the ancestry information associates people together in family trees. In some examples, the ARPE 100 is communicatively coupled to a content database provider 108 that provides traffic data to facilitate providing traffic information in augmented reality, virtual reality and/or mixed reality. In some examples, the ARPE 100 is communicatively coupled to a content database provider 108 that provides weather data to facilitate providing weather information in augmented reality, virtual reality and/or mixed reality. In some examples, the weather data includes geometry data that provides a three dimensional construct of the weather that can be incorporated into one of the interfaces discussed above.

In some examples, the ARPE 100 is communicatively coupled to a content database provider 108 that provides survey and/or election result data. In some examples, the ARPE 100 is communicatively coupled to a content database provider 108 that provides census data. In some examples, the ARPE 100 is communicatively coupled to a content database provider 108 that provides financial data (e.g., stock market data, etc.). In some examples, the ARPE 100 is communicatively coupled to a content database provider 108 that provides flight navigation data to track, for example, aircraft and/or unmanned aerial vehicles in the law enforcement map interface 2700. In some examples, the ARPE 100 is communicatively coupled to a content database provider 108 that provides academic data (e.g., published papers in journals, etc.), scientific data, and/or research data. In some examples, the ARPE 100 is communicatively coupled to a content database provider 108 that provides agricultural data (e.g., soil data, weather data, crop data, fertilizer use data, planting history data, etc.).

In some examples, the ARPE 100 is communicatively coupled to a content database provider 108 that provides medical data and/or hospital data (e.g., patient location and health data, patient geometry data, etc.) to facilitate patient care in a medical facility. For example, a hospital floor plan may the map in the map interface 1000. In such an example, the interactive indicia 2704 may be generated for patients and clinical events. As another example, medical data, such as X-rays or CAT scans can be superimposed onto images captured by the camera in the augmented reality query interface 522 using the patient geometry data to facilitate viewing the medical data on the patient.

In some examples, the map query interface 520 is used as a fleet management tool where locations and timestamps for vehicles are transformed into the interactive indicia 2704 to be displays and chronologically tracked. Additionally, the user may create specific events to direct vehicles to locations at certain times so that those planned events are displayed in the map query interface 520 of, for examples, drivers and/or other fleet management personnel.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method comprising:
    presenting, on a display of an end-user device, live image data being captured by a camera of the end-user device;
    determining a pose of the end-user device, the pose including a location of the user end-user device and an orientation of the camera;
    sending the pose of the end-user device to a server;
    receiving location specific data from the server, the location specific data based on the pose of the end-user device, the location specific data including a first topic;
    superimposing, on the live image data, based on the location specific data, (i) at least one highlighted area of an object associated with the first topic, and (ii) a query panel associated with the first topic superimposed proximate the object, the at least one highlighted area and the query panel being interactive elements associated with the first topic;
    in response to receiving a selection of one of the interactive elements, receiving query data from the server based on the first topic; and
    superimposing, on the live image data, a scrubber track, a scrubber and at least two event points; wherein manipulating the scrubber between the at least two event points changes content of the query panel related to the first topic.

2. The method of claim 1, further comprising continuously receiving the location specific data based on the pose of the end-user device when the end-user device is within predefined geofence.

3. The method of claim 1, further comprising:
    superimposing a catalogue of goods or services of a venue associated with the location of the end-user device into the live image data; and
    in response to a selection of one of the goods or services, transmitting an order to the server to be delivered to the location of the end-user device.

4. The method of claim 1, wherein manipulating the scrubber between the at least two event points changes the content of the query panel related to the first topic between a second topic related to the first topic and a third topic related to the first topic.

5. The method of claim 4, wherein in response receiving a selection of the second topic, receiving second query data from the server based on the second topic.

6. The method of claim 1, wherein each of the at least two event points is associated with a different period of time.

7. The method of claim 1, wherein the query panel includes a first hierarchy element associated with the first topic and multiple second hierarchy elements each associated with a different category of the query data.

8. The method of claim 7, where each of the multiple second hierarchy elements are additional interactive elements that, when selected, causes query results related to the first topic and the corresponding different category of the query data to be displayed in the query panel.

9. An end-user device comprising:
    memory storing an application; and
    a processor communicatively coupled to the memory, wherein the application, when executed, causing the processor to:
        present, on a display of the end-user device, live image data being captured by a camera of the end-user device;
        determine a pose of the end-user device, the pose including a location of the end-user device and an orientation of the camera;
        send the pose of the end-user device to a server;
        receive location specific data from the server, the location specific data based on the pose of the end-user device, the location specific data including a first topic;
        superimpose, on the live image data, based on the location specific data, (i) at least one highlighted area of an object associated with the first topic, and (ii) a query panel associated with the first topic superimposed proximate the object, the at least one highlighted area and the query panel being interactive elements associated with the first topic;

in response to receiving a selection of one of the interactive elements, receive query data from the server based on the first topic; and superimpose, on the live image data, a scrubber track, a scrubber and at least two event points; wherein manipulating the scrubber between the at least two event points changes content of the query panel related to the first topic.

10. The end-user device of claim 9, wherein the application, when executing, causes the processor to continuously receive the location specific data based on the pose of the end-user device when the end-user device is within predefined geofence.

11. The end-user device of claim 9, wherein the application, when executing, causes the processor to:
   superimpose a catalogue of goods or services of a venue associated with the location of the end-user device into the live image data; and
   in response to a selection of one of the goods or services, transmit an order to the server for the selected one of the goods or services to be delivered to the location of the end-user device.

12. The end-user device of claim 9, wherein manipulating the scrubber between the at least two event points changes the content of the query panel related to the first topic between a second topic related to the first topic and a third topic related to the first topic.

13. The end-user device of claim 12, wherein the application, when executing, causes the processor to, in response receiving a selection of the second topic, receive second query data from the server based on the second topic.

14. The end-user device of claim 9, wherein each of the at least two event points is associated with a different period of time.

15. The end-user device of claim 9, wherein the query panel includes a first hierarchy element associated with the first topic and multiple second hierarchy elements each associated with a different category of the query data.

16. The end-user device of claim 15, where each of the multiple second hierarchy elements are additional interactive elements that, when selected, causes query results related to the first topic and the corresponding different category of the query data to be displayed in the query panel.

17. A tangible computer readable medium comprising instructions that, when executed, cause an end-user device to:
   present, on a display of the end-user device, live image data being captured by a camera of the end-user device;
   determine a pose of the end-user device, the pose including a location of the end-user device and an orientation of the camera;
   send the pose of the end-user device to a server;
   receive location specific data from the server, the location specific data based on the pose of the end-user device, the location specific data including a first topic;
   superimpose, on the live image data, based on the location specific data, (i) at least one highlighted area of an object associated with the first topic, and (ii) a query panel associated with the first topic superimposed proximate the object, the at least one highlighted area and the query panel being interactive elements associated with the first topic;
   in response to receiving a selection of one of the interactive elements, receive query data from the server based on the first topic; and
   superimpose, on the live image data, an interface element that, when manipulated changes content of the query panel related to the first topic.

18. The computer readable medium of claim 17, wherein the instructions, when executed, cause the end-user device to continuously receive the location specific data based on the pose of the end-user device when the end-user device is within predefined geofence.

19. The computer readable medium of claim 17, wherein the instructions, when executed, cause the end-user device to:
   superimpose a catalogue of goods or services of a venue associated with the location of the end-user device into the live image data; and
   in response to a selection of one of the goods or services, transmit an order to the server for the selected one of the goods or services to be delivered to the location of the end-user device.

20. The computer readable medium of claim 17, wherein the interface element is a scrubber track with a scrubber and at least two event points, and wherein manipulating the scrubber between the at least two event points changes the content of the query panel related to the first topic between a second topic related to the first topic and a third topic related to the first topic.

* * * * *